United States Patent
Jaffe et al.

(10) Patent No.: US 10,479,712 B2
(45) Date of Patent: *Nov. 19, 2019

(54) METHODS AND COMPOSITIONS FOR NITROGEN REMOVAL USING FEAMMOX MICROORGANISMS

(71) Applicant: The Trustees of Princeton University, Princeton, NJ (US)

(72) Inventors: Peter R. Jaffe, Princeton, NJ (US); Shan Huang, Plainsboro, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/707,380

(22) Filed: Sep. 18, 2017

(65) Prior Publication Data
US 2018/0029909 A1    Feb. 1, 2018

Related U.S. Application Data

(63) Continuation of application No. 14/707,700, filed on May 8, 2015, now Pat. No. 9,815,723.

(60) Provisional application No. 61/990,525, filed on May 8, 2014, provisional application No. 62/058,453, filed on Oct. 1, 2014.

(51) Int. Cl.
| | |
|---|---|
| C02F 3/34 | (2006.01) |
| C02F 3/30 | (2006.01) |
| C02F 101/16 | (2006.01) |
| C02F 101/00 | (2006.01) |
| C02F 101/20 | (2006.01) |
| C02F 101/30 | (2006.01) |

(52) U.S. Cl.
CPC .............. *C02F 3/341* (2013.01); *C02F 3/301* (2013.01); *C02F 3/303* (2013.01); *C02F 3/307* (2013.01); *C02F 3/346* (2013.01); *C02F 2101/006* (2013.01); *C02F 2101/16* (2013.01); *C02F 2101/20* (2013.01); *C02F 2101/30* (2013.01)

(58) Field of Classification Search
None
See application file for complete search history.

(56) References Cited

U.S. PATENT DOCUMENTS

| | | |
|---|---|---|
| 5,705,072 A | 1/1998 | Haase |
| 2011/0207061 A1 | 8/2011 | Cantwell et al. |
| 2012/0309071 A1 | 12/2012 | Scherson et al. |

OTHER PUBLICATIONS

Huang et al. "A Newly Identified Microorganism Affecting the N Cycle: Ammonium Oxidation in Iron Reducing Soils" Mineralogical Magazine, 2013, vol. 77 (5) p. 1339.

Abbassi et al. "Laboratory Study of Nitrification, Denitrification and Anammox Processes in Membrane Bioreactors Considering Periodic Aeration" Journal of Environmental Management, 2014, vol. 142, p. 53-59.

Braker et al. "Development of PCR Primer Systems for Amplification of Nitrite Reductase Genes (nirK and nirS) to Detect Denitrifying Bacteria in Environmental Samples" Appl. and Environ. Microbio., Oct. 1998, vol. 64 (10) p. 3769-3775.

(Continued)

*Primary Examiner* — David W Berke-Schlessel
(74) *Attorney, Agent, or Firm* — J. Clinton Wimbish; Nexsen Pruet, PLLC

(57) ABSTRACT

Processes and compositions for removal nitrogen, organic and inorganic contaminants from wastewater using Feammox bacterium are provided.

20 Claims, 28 Drawing Sheets

Specification includes a Sequence Listing.

(56) References Cited

OTHER PUBLICATIONS

Schloss and Handelsman "Introducing DOTUR, a Computer Program for Defining Operational Taxonomic Units and Estimating Species Richness" Appl. and Environ. Microbio., Mar. 2005, vol. 71 (3) p. 1501-1506.

Stutts et al. "Application of the 5' Fluorogenic Exonuclease Assay (TaqMan) for Quantitative Ribosomal DNA and rRNA Analysis in Sediments" Appl. and Environ. Microbio., Jun. 2001, vol. 67 (6) p. 2781-2789.

Suzuki et al. "Quantitative Analysis of Small-Subunit rRNA Genes in Mixed Microbial Populations via 5'-Nuclease Assays" Appl. and Environ. Microbio., Nov. 2000, vol. 66 (11) p. 4605-4614.

Call and Logan "Hydrogen Production in a Single Chamber Microbial Electrolysis Cell Lacking a Membrane" Environ. Sci. Technol., 2008, vol. 42, p. 3401-3406.

Coupland and Johnson, "Evidence That the Potential for Dissimilatory Ferric Iron Reduction Is Widespread Among Acidophilic Heterotrophic Bacteria" Article in FEMS Microbiol Lett, Mar. 2008, vol. 279 p. 30-35.

Clément et al. "Ammonium Oxidation Coupled to Dissimilatory Reduction of Iron Under Anaerobic Conditions in Wetland Soils" Soil Biology & Biochemistry, 2005, vol. 37 p. 2323-2328.

Call and Logan "A Method for High Throughput Bioelectrochemical Research Based on Small Scale Microbial Electrolysis Cells" Biosensors and Bioelectronics, 2011, vol. 26 p. 4526-4531.

Gilch et al. "A Soluble Form of Ammonia Monooxygenase in Nitrosomonas Europaea" Biol. Chem., Sep. 2009, vol. 390 p. 863-873.

Francis et al. "Ubiquity and Diversity of Ammonia-Oxidizing Archaea in Water Columns and Sediments of the Ocean" PNAS, Oct. 11, 2005, vol. 102 (41), p. 14683-14688.

Harms et al. "Real-Time PCR Quantification of Nitrifying Bacteria in a Municipal Wastewater Treatment Plant" MiniManuscript, Sep. 2015.

Harms et al. "Real-Time PCR Quantification of Nitrifying Bacteria in a Municipal Wastewater Treatment Plant" Environ. Sci. Technol., 2003, vol. 37 p. 343-351.

Hua et al. "Kinetics of Uranium(VI) Reduction by Hydrogen Sulfide in Anoxic Aqueous Systems" Environ. Sci. Technol., 2006, vol. 40 p. 4666-4671.

Huang and Jaffe "Characterization of Incubation Experiments and Development of an Enrichment Culture Capable of Ammonium Oxidation Under Iron-Reducing Conditions" Biogeosciences, 2015, vol. 12 p. 769-779.

Huang et al. "Distribution of Typical Denitrifying Functional Genes and Diversity of the Nirs-Encoding Bacterial Community Related to Environmental Characteristics of River Sediments" Biogeosciences Discuss., 2011, vol. 8 p. 5251-5280.

Huang and Jaffe "Characterization of Incubation Experiments and Development of an Enrichment Culture Capable of Ammonium Oxidation Under Iron Reducing Conditions" Biogeosciences Discuss., 2014, vol. 11 p. 12295-12321.

Hyman and Wood "Suicidal Inactivation and Labelling of Ammonia Mono-Oxygenase by Acetylene" Biochem. J., 1985, vol. 227 p. 719-725.

Nylander et al. "Bayesian Phylogenetic Analysis of Combined Data" Syst. Biol., 2004, vol. 53 (1) p. 47-67.

Smith and Waterman "Identification of Common Molecular Subsequences" J. Mol. Biol., 1981, vol. 147 p. 195-197.

Hynes et al. "Production of Nitrous Oxide by Nitrosomonas Europaea: Effects of Acetylene, Ph, and Oxygen" Can. J. Microbiol., 1984, vol. 30 p. 1397-1404.

Jensen et al. "Diversity in Methane Enrichments From Agricultural Soil Revealed by DGGE Separation of PCR Amplified 16S rDNA Fragments" FEMS Microbiol. Ecol., 1998, vol. 26 p. 17-26.

Kartal et al. "Molecular Mechanism of Anaerobic Ammonium Oxidation" Macmillan Publishers Limited, Nov. 2011, vol. 479 p. 127-132.

Keeling et al. "Geology and Characterization of Two Hydrothermal Nontronites from Weathered Metamorphic Rocks at the Uley Graphite Mine, South Australia" Clays and Clay Minerals, 2000, vol. 48. (5) p. 537-548.

Komlos et al. "Biostimulation of Iron Reduction and Subsequent Oxidation of Sediment Containing Fe-Silicates and Fe-Oxides: Effect of Redox Cycling on Fe(III) Bioreduction" Water Research, 2007, vol. 41 p. 2996-3004.

Pankratov et al. "*Telmatobacter bradus* Gen. Nov., Sp. Nov., A Cellulolytic Facultative Anaerobe From Subdivision 1 of the Acidobacteria, and Emended Description of Acidobacterium Capsulatum Kishimoto et al. 1991" International Journal of Systematic and Evolutionary Microbiology, 2012, vol. 62 p. 430-437.

Laabroek et al., "Oxygen Consumption Kinetics of Nitrosomonas Europaea and Nitrobacter Hamburgensis Grown in Mixed Continuous Cultures at Different Oxygen Concentrations" Arch Microbiol, 1994, vol. 161 p. 156-162.

Komlos and Jaffe "Effect of Iron Bioavailability on Dissolved Hydrogen Concentrations During Microbial Iron Reduction" Biodegradation, 2004, vol. 15 p. 315-325.

Logan et al. "Microbial Fuel Cells: Methodology and Technology" Environmental Science & Technology, 2006, vol. 40 (17) p. 5181-5192.

Liu et al. "Reduction of Structural Fe(III) in Nontronite by Methanogen Methanosarcina Barkeri" Geochimica et Cosmochimica Acta, 2011, vol. 75 p. 1057-1071.

Madigan et al.; Appendix 1, Energy Caculations in Microbial Bioenergetics, 2002.

Margulies et al. "Genome Sequencing in Microfabricated High-Density Picolitre Reactors" Nature, Sep. 2005, vol. 437 p. 376-380.

Majzlan et al. "Thermodynamics of Iron Oxides: Part III. Enthalpies of Formation and Stability of Ferrihydrite (~Fe(OH)3), Schwertmannite (~FeO(OH)3/4(SO4)1/8), and $\epsilon$-Fe2O3" Geochimica et Cosmochimica Acta, 2004, vol. 68 (5) p. 1049-1059.

Morrison et al. "Adsorption of Uranium(VI) on Amorphous Ferric Oxyhydroxide at High Concentrations of Dissolved Carbon(IV) and Sulfur(V1)" Journal of Contaminant Hydrology, 1995, vol. 17 p. 333-346.

Pinto and Raskin "PCR Biases Distort Bacterial and Archaeal Community Structure in Pyrosequencing Datasets" PLOS ONE, Aug. 2012, vol. 7 (8) p. 1-16.

Petrie et al. "Enumeration and Characterization of Iron(III)-Reducing Microbial Communities from Acidic Subsurface Sediments Contaminated with Uranium(VI)" Applied and Environmental Microbiol, Dec. 2003, vol. 69 p. 7467-7479.

Ronquist and Huelsenbeck "MrBayes 3: Bayesian Phylogenetic Inference Under Mixed Models" Bioinformatics Applications Note, 2003, vol. 19 (12) p. 1572-1574.

Rowe et al. "Microbial Communities and Geochemical Dynamics in an Extremely Acidic, Metal-Rich Stream at an Abandoned Sulfide Mine (Huelva, Spain) Underpinned by Two Functional Primary Production Systems" Environ. Microbiol., 2007, vol. 9 (7) 1761-1771.

Rotthauwe et al. "The Ammonia Monooxygenase Structural Gene amoA as a Functional Marker: Molecular Fine-Scale Analysis of Natural Ammonia-Oxidizing Populations" Applied and Environmental Microbiology, Dec. 1997, vol. 63 (12) p. 4704-4712.

Shigeki Sawayama "Possibility of Anoxic Ferric Ammonium Oxidation" Journal of Bioscience and Bioengineering, 2006, vol. 101 (1) p. 70-72.

Schmid et al. "Molecular Evidence for Genus Level Diversity of Bacteria Capable of Catalyzing Anaerobic Ammonium Oxidation" System. Appl. Microbiol., 2000, vol. 23 p. 93-106.

Schmid et al. "Candidatus "*Scalindua brodae*", Sp. Nov., Candidatus "*Scalindua wagneri*", Sp. Nov., Two New Species of Anaerobic Ammonium Oxidizing Bacteria" System. Appl. Microbiol., 2003, vol. 26 p. 529-538.

Shrestha et al. "Algae of Itahari Municipality and Its Adjoining Area, Eastern Nepal" Int J Appl Sci Biotechnol, 2013, vol. 1 (1) p. 5-10.

Lawrence L. Stookey "Ferrozine—A New Spectrophotometric Reagent for Iron" Analytical Chemistry, Jun. 1970, vol. 42 (7) p. 779-781.

(56) References Cited

OTHER PUBLICATIONS

Smith et al. "Small-Scale, Hydrogen-Oxidizing-Denitrifying Bioreactor for Treatment of Nitrate-Contaminated Drinking Water" Water Research, 2005, vol. 39 p. 2014-2023.
Tourna et al. "Growth, Activity and Temperature Responses of Ammonia-Oxidizing Archaea and Bacteria in Soil Microcosms" Environmental Microbiology, 2008, vol. 10 (5) p. 1357-1364.
Yang et al. "Nitrogen Loss From Soil Through Anaerobic Ammonium Oxidation Coupled to Iron Reduction" Nature Geoscience, Jul. 2012, vol. 5 p. 538-541.
Van de Graaf et al. "Autotrophic Growth of Anaerobic Ammonium-Oxidizing Micro-Organisms in a Fluidized Bed Reactor" Microbiology, 1996, vol. 142 p. 2187-2196.
Yoshinari et al. "Acetylene Inhibition of Nitrous Oxide Reduction and Measurement of Denitrification and Nitrogen Fixation in Soil" Biochem., 1977, vol. 9 p. 177-183.
Zhang et al. "Microbial Reduction of Iron(III)-Rich Nontronite and Uranium(VI)" Geochimica et Cosmochimica Acta, 2009, vol. 73 p. 3523-3538.
Hsi et al. "Adsorption of Uranyl Onto Ferric Oxyhydroxides: Application of the Surface Complexation Site-Binding Model" Geochim. Cosmochim. Acta., 1985, vol. 49 p. 1931-1941.
International Search Report and Written Opinion for International Application No. PCT/US15/29961, filed May 8, 2015.
Clum, et al. "Complete genome sequence of Acidimicrobium forrooxidans type strain (ICP" Standards in Genomic Sciences, 1, 38-45, 2009.
Sawayama "Possibility of Anoxic Ferric Ammonium Oxidation" Journal of Bioscience and Bioengineering, 101, 70-72, 2006.
International Depositary Authority, American Type Culture Collection, Feb. 2019.

METHODS AND COMPOSITIONS FOR NITROGEN REMOVAL USING FEAMMOX MICROORGANISMS

CROSS REFERENCE TO RELATED APPLICATION

This application is a continuation of U.S. patent application Ser. No. 14/707,700, filed on May 8, 2015, which claims the benefit of U.S. provisional patent application No. 61/990,525, filed May 8, 2014, and U.S. provisional application No. 62/058,453, filed Oct. 1, 2014; all of which are incorporated herein by reference as if fully set forth.

The Sequence Listing titled "Sequence_Listing," having a file size of 2,817,971 bytes, created on Sep. 18, 2017 and filed herewith is incorporated herein by reference as if fully set forth.

GOVERNMENT SUPPORT

This invention was made with government support under Grant No. DE-SC0006847 awarded by the Department of Energy and Grant No. CBET-1433101 awarded by the National Science Foundation. The government has certain rights in this invention.

FIELD

The disclosure relates to processes and compositions for removal nitrogen and other contaminants from wastewater using Feammox bacteria.

BACKGROUND

The removal of nitrogen and other contaminants from water is an important environmental task. Wastewater treatment plants in the developed world and in many developing countries oxidize $NH_4^+$ to $NO_3^-$ before discharging the treated wastewater. This is done to decrease oxygen demand in the receiving waters. Additionally, nitrogen excess in near shore environments has been identified as a major environmental problem leading to eutrophication and anoxia. Legislations are being implemented requiring the conversion of $NO_3^-$ to $N_2$ in conventional waste water treatment plants. The nitrogen compounds that are present in contaminated water, such as ammonium $NH_4^+$, nitrite ($NO_2^-$) and nitrate ($NO_3^-$) will have to be converted to elemental nitrogen $N_2$, which can be released in the gaseous state into an open environment.

Nitrogen removal via nitrification and denitrification can be performed by microrganisms. Numerous studies have focused on the aerobic oxidation of ammonia or $NH_4^+$ to first nitrite ($NO_2^-$) and then nitrate ($NO_3^-$). Oxidation of $NH_4^+$ to $NO_2^+$ is the first and rate limiting biological step in the nitrification, and also a required step prior to anaerobic $NH_4^+$ oxidation (anammox), which is the biological conversion of $NH_4^+$ and $NO_2^-$ to nitrogen gas in the absence of oxygen. Anammox is the most common anaerobic $NH_4^+$ oxidation pathway in soils environments known so far, using $NO_2^-$ as the electron acceptor. Anaerobic $NH_4^+$ oxidation is performed by anammox bacteria. Aerobic $NH_4^+$ oxidation is performed by two groups of organisms, ammonia-oxidizing bacteria (AOB), and ammonia-oxidizing archaea (AOA).

In the wastewater treatment plants, biological ammonium oxidation is conducted by aerobic nitrifying bacteria and requires aeration in the step with the highest energy input. An alternative is the partial nitrification (nitritation) Anammox system, which has been implemented in some treatment plants, with the goal of saving energy costs, since only half of the $NH_4^+$ is converted to $NO_2^-$ aerobically. However, these Anammox based wastewater treatment systems need to operate between 28° C. and 35° C.

An $NH_4^+$ oxidation process coupled to iron (Fe) reduction called Feammox was identified (Clement J C et al. 2005 Soil Biol Biochem 37:2323-2328; Sawayama S. 2006; J Biosci Bioeng 101:70-72; Shrestha J et al. 2009 Soil Sci 174:156-164; Yang W H et al. 2012 Nat Geosc 5: 538-541, all of which are incorporated herein by reference as if fully set forth). Feammox is a process that can be described as the oxidation of $NH_4^+$ in the absence of molecular oxygen, with iron oxides [Ferric iron, Fe(III)] as the electron acceptor. In this reaction Fe(III) is reduced to Ferrous iron Fe(II), while $NH_4^+$ is transformed to $NO_2^-$, nitrogen gas ($N_2$), or other nitrogen forms. Feammox may provide benefits for development of an improved system that does not require aeration or heating of the wastewater in temperate climates.

SUMMARY

In an aspect, the invention relates to a composition. The composition includes Feammox bacteria and at least one of soil, wastewater, or a carrier. The Feammox bacteria are capable of oxidizing ammonium coupled with reduction of Fe(III) to Fe(II) and a carrier.

In an aspect, the invention relates to a system. The system includes a reactor and a composition that includes a Feammox bacterium and at least one of soil, wastewater or a carrier. The Feammox bacterium is capable of oxidizing ammonium coupled with reduction of Fe(III) to Fe(II).

In an aspect, the invention relates to a process for removing a nitrogen contaminant from wastewater. The process includes mixing the wastewater with Feammox bacteria.

In an aspect, the invention relates to a process for removing a nitrogen contaminant in a soil or groundwater system. The process includes adding Feammox bacteria to the soil or groundwater system.

BRIEF DESCRIPTION OF THE DRAWINGS

The following detailed description of the preferred embodiments of the present invention will be better understood when read in conjunction with the appended drawings. For the purpose of illustrating the invention, there are shown in the drawings particular embodiments. It is understood, however, that the invention is not limited to the precise arrangements and instrumentalities shown. In the drawings:

FIG. 12A illustrates the total variance in the bacterial abundance and the cumulative variance of the bacteria-environment relationship. FIG. 12B illustrates the total variance in the microbial composition and the cumulative variance of the bacteria-sampling location relationship.

FIG. 19A illustrates growth of the A6 bacterium in the liquid medium. FIG. 19B illustrates A6 growth on the solid inorganic NH$_4^+$-ferric iron medium. FIGS. 19C-19D show rod-shaped A6 cells.

DETAILED DESCRIPTION OF THE PREFERRED EMBODIMENTS

Figure 1A:
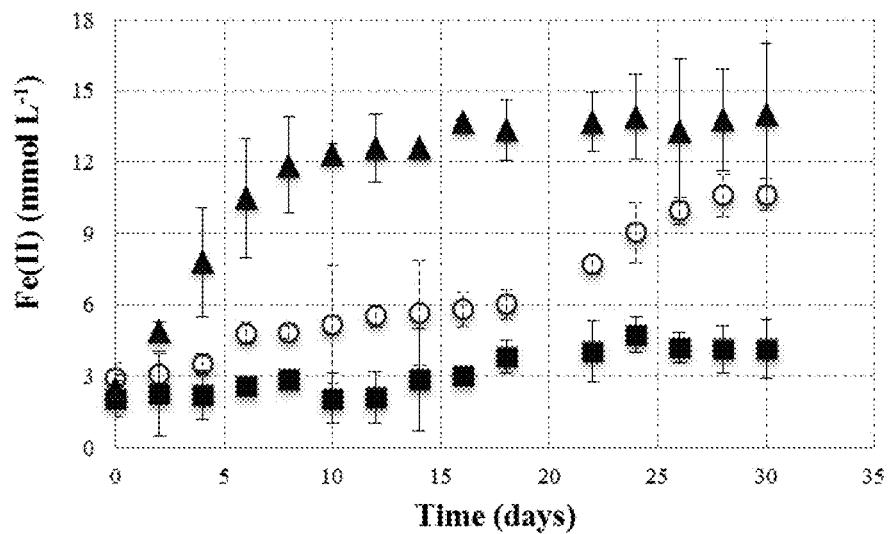
FIGS. 1A-1B illustrate concentration of Fe(II) (FIG. 1A) and $NH_4^+$ (FIG. 1B) in incubation with three different Fe(III) sources: ferrihydrite (open circle), ferric chloride (closed square), and ferric citrate (closed triangle).

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

"Synthetic nucleic acid sequence," "synthetic polynucleotide," "synthetic oligonucleotide," "synthetic DNA," or "synthetic RNA" as used herein refers to a nucleic acid, polynucleotide, oligonucleotide, DNA, or RNA that differs from one found in nature by having a different sequence than one found in nature or a chemical modification not found in nature. The definition of synthetic nucleic acid includes but is not limited to a DNA sequence created using biotechnology tools. Such tools include but are not limited to recombinant DNA technology, chemical synthesis, or directed use of nucleases (so called "genome editing" or "gene optimizing" technologies).

An embodiment provides a composition that comprises a Feammox bacterium. The composition may also include a carrier. The Feammox bacterium may be capable of oxidizing ammonium coupled with reduction of Fe(III) to Fe(II). The Feammox bacterium may be capable of conversion of ammonium to nitrite. The Feammox bacterium may be an Acidimicrobiaceae bacterium or a bacterium with a similar genetic composition. The Feammox bacterium may be a bacterial strain that was isolated from wetland soils collected in New Jersey after a series of enrichment incubations. The soil samples were collected at the location identified as 40° 15' N-74°30' W or within 100 m of the identified location. The Feammox bacterium may be the bacterial strain designated the Acidimicrobiaceae Feammox bacterium A6 and described herein. The Acidimicrobiaceae Feammox bacterium A6 was submitted for deposit with the American Type Culture Collection (ATCC; 10801 University Blvd. Manassas, Va. 20110-2209, USA) on Apr. 27, 2015, and the submission was supplemented on May 7, 2015. The Acidimicrobiaceae Feammox bacterium may have a genome comprising, consisting essentially of, or consisting of a nucleic acid sequence with at least 70, 72, 75, 80, 85, 90, 91, 92, 93, 94, 95, 96, 97, 98, 99, or 100% identity to SEQ ID NO: 1. The Feammox bacterium may have the genome size of 3.3 mega base pairs (Mb) and guanine-cytosine content 52%. The bacterial genome may further include a gene encoding a Feammox Ammonium Monooxygenase. As used herein, the term "Feammox Ammonium Monooxygenase" (FMO) refers to an enzyme that plays a key role in oxidizing ammonium coupled with ferric iron reduction. The gene may include a nucleic acid comprising, consisting essentially of, or consisting of a nucleic acid sequence with at least 70, 72, 75, 80, 85, 90, 91, 92, 93, 94, 95, 96, 97, 98, 99, or 100% identity to SEQ ID NO: 8. The Feammox bacterium may be live or lyophilized.

Determining percent identity of two nucleic acid sequences may include aligning and comparing the nucleotides at corresponding positions in the two sequences. If all positions in two sequences are occupied by identical nucleotides then the sequences are said to be 100% identical. Percent identity may be measured by the Smith Waterman algorithm (Smith T F, Waterman MS 1981 "Identification of Common Molecular Subsequences," J Mol Biol 147: 195-197, which is incorporated herein by reference as if fully set forth).

In an embodiment, the composition may include wastewater. As used herein, the term "wastewater" refers to any water that has been adversely affected in quality by anthropogenic influence. Wastewater may be municipal wastewater, industrial wastewater, agricultural wastewater, surface runoff, stormwater, or wastewater combining wastewater from multiple sources. Wastewater may be treated in a wastewater treatment plant. Wastewater may include nitrogen contaminants. As used herein, the term "contaminant" refers to compounds that are not occurring in water naturally, pose health or ecological risks and are subject to state and federal regulation. Nitrogen contaminants may be an ammonium containing contaminant. The ammonium containing contaminant may be but is not limited to an industrial, agricultural, or human municipal waste. The ammonium containing contaminants may be included but are not limited to fertilizers, domestic sewage, or industrial effluents. The ammonium containing contaminant may be ammonium chloride. The ammonium containing contaminant may be a nitrogen containing organic compound, wherein nitrogen may be hydrolyzed to ammonium.

Wastewater may include at least one more contaminant. The at least one more contaminant may be inorganic contaminants. Inorganic contaminants may be but are not limited to heavy metals, radionuclides or trace metals. Inorganic contaminants may be copper, uranium, ferric iron, lead, zinc, arsenic, chromium, mercury or silver. The at least one more contaminant may be organic contaminants. The organic contaminants may be but are not limited to chlorinated volatile organic compounds, perchloroethylene (PCE), trichloroethylene (TCE), trichloroethane, dichloroethane, vinyl chloride, polychlorinated biphenyls, fuel constituents, benzene, ethylbenzene, toluene, xylene, phenanthrene, methyl tert butyl ether, tertiary butyl alcohol, polyaromatic hydrocarbons, or ethylene dibromide.

In an embodiment, the ammonium containing contaminant may be added to a composition that would otherwise be low or deficient in ammonium when reactions in addition to or in place of ammonium oxidation are of interest.

The composition may further include a source of ferric iron. The source may be but is not limited to a ferrihydrite, a goethite, an elemental iron, a nontronite or an iron-rich clay. As used herein, the term "ferrihydrite," or hydrated ferric iron oxide, refers to a dark brown or yellow brown mineral composed of about 20% ($FeO_4$) and 80% ($FeO_6$) polyhedral. The term "goethite" refers to an iron oxyhydroxide containing ferric iron. The term "nontronite" refers to the Fe(III) rich clay mineral having a typical structural formula $Ca_{0.5}$ $(Si_7Al_{0.8}Fe_{0.2})(Fe_{3.5}Al_{0.4}Mg_{0.1})O_{20}(OH)_4$. The source may be scrap metal, or any other source of ferric iron.

In an embodiment, the composition may include a carrier. The carrier may support growth of the Feammox bacterium. The carrier may be but is not limited to a filter, beads, agarized medium, or any surface that allows bacterial attachment. The carrier may include media for culturing the Feammox bacterium. The media may be inorganic $NH_4^+$-ferric iron media. The inorganic $NH_4^+$-ferric iron media may be solid media or liquid media. The liquid media may include but not limited to the following components: $NH_4Cl$, $(NH_4)_2SO_4$, $NaHCO_3$, $KHCO_3$, $KH_2PO4$, 100 mg $MgSO_4.7H_2O$, and $CaCl_2.2H_2O$. The liquid media may further include ferrihydrite, AQDS, trace element solution or vitamins. Vitamins may be but are not limited to ATCC® vitamins. The liquid media may have a pH in a range from 4.0 to 5.0. The media may include traces of dissolved oxygen. The solid medium may have the same composition as the liquid media but include elements to solidify the mixture. The solid media may be solidified with 0.8% agar. The solid media may include ferrihydrite that is spread on the surface of the medium.

Figure 11:
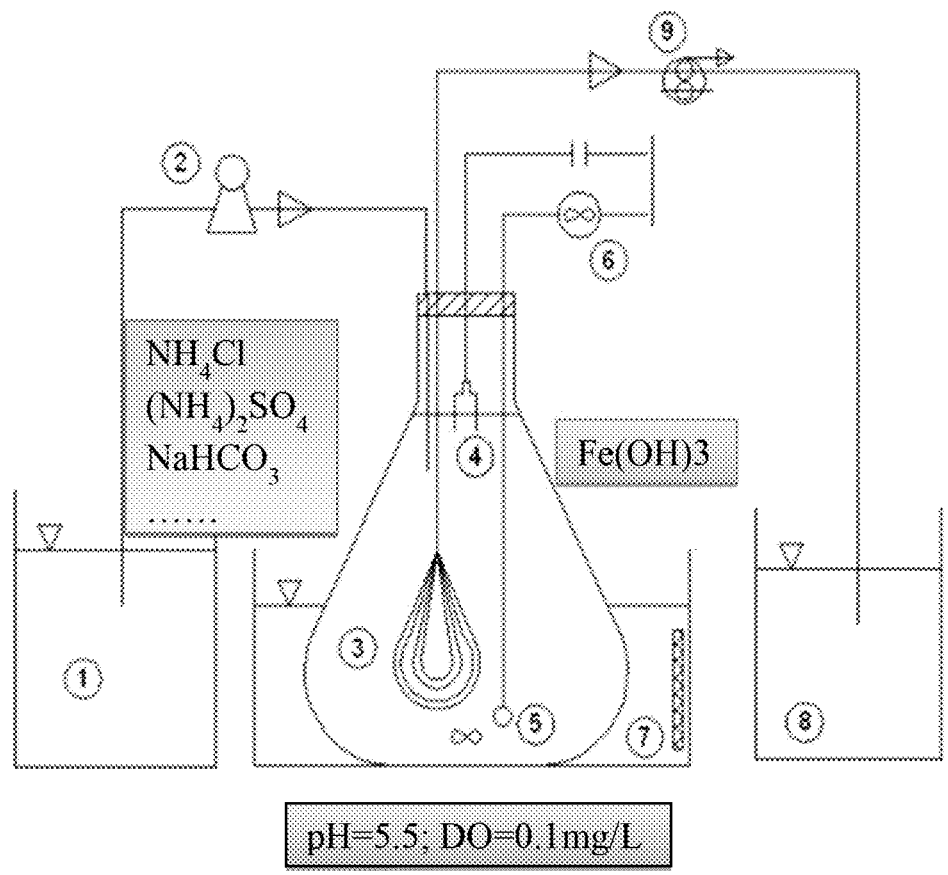
FIG. 11 illustrates a schematic representation of a membrane reactor for NH$_4^+$ oxidation via Feammox.
Figure 29:
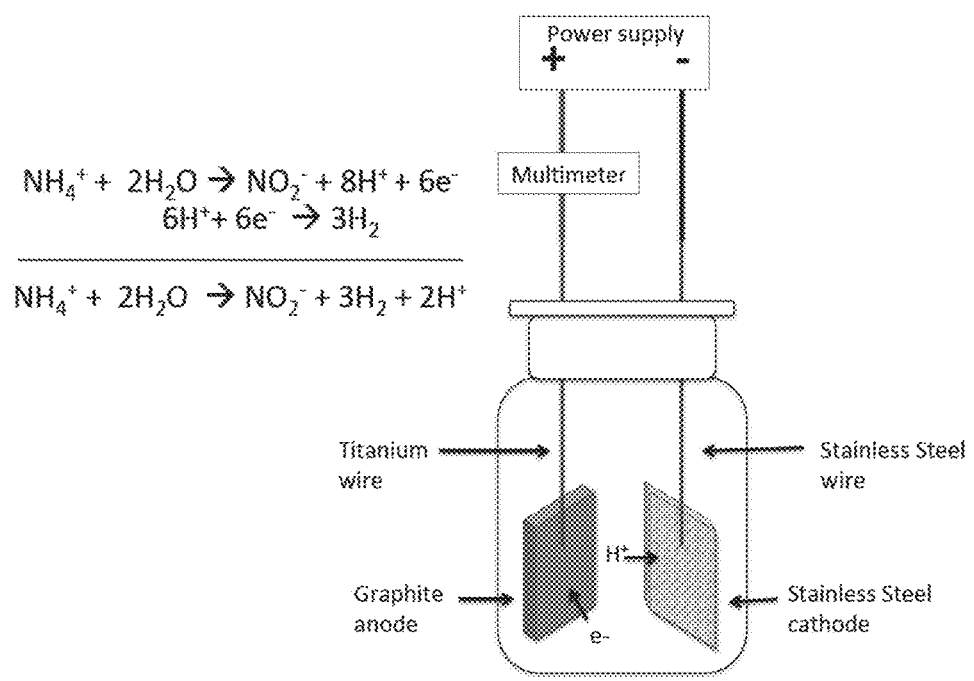
FIG. 29 illustrates a scheme of the electrogenic microbial reactor.

In embodiment, a system is provided. The system may include a reactor and any composition herein. The reactor may be a continuous membrane reactor or a sequential batch reactor. In a non-limiting example the continuous membrane reactor may be a reactor illustrated in FIG. 11. FIG. 11 illustrates a scheme of a membrane reactor for $NH_4^+$ oxidation via Feammox. Referring to FIG. 11, 1 refers to the feed solution, 2 refers to the feed pump, 3 refers to the membrane module, 4 refers to the floater connected to an electrical on/off switch, 5 refers to the ceramic diffuser, 6 refers to the $N_2$ supplier, 7 refers to the water bath, 8 refers to outflow, and 9 refers to the outflow pump. The reactor may be an electrogenic microbial reactor. The electrogenic microbial reactor may be any bioelectrochemical system that extracts energy from a substrate (Call and Logan 2011 *Biosen. Bioelectron.* 26(11): 4526-4531, which is incorporated herein by reference as if fully set forth). The electrogenic microbial reactor may be any bioelectrochemical system that extracts energy from a substrate (Call and Logan 2011 *Biosen. Bioelectron.* 26(11): 4526-4531, which is incorporated herein by reference as if fully set forth). In the bioelectrochemical system, electrons may be harvested biologically, and then transferred to the anode that functions as the terminal electron acceptor for the microorganisms in the system, and $H_2$ is produced at the anode. The electrogenic microbial reactor may be a Microbial Fuel Cell (MFC) or Microbial Electrolysis cell (MEC). A non-limiting example of the electrogenic microbial reactor is illustrated in FIG. 29. Referring to FIG. 29, the reactor includes a tank, a graphite anode connected via titanium wire to the positive terminal of the power supply, a stainless steel cathode connected via stainless steel wire to the negative terminal of the power supply. MECs require a small potential applied from an external power source ($E_{AP}$>0.25 V), resulting in $H_2$ production at the anode (Logan, Hamelers et al. 2006 *Environ. Sci. Technol.* 40(17):5181-5192; Call and Logan 2008 *Environ. Sci. Technol.* 42(9):3401-3406; Call and Logan 2011, all of which are incorporated by reference herein as if fully set forth).

In an embodiment, a reactor may be an industrial-type reactor. The reactor may operate within a water treatment plant. The reactor may be a treatment pond or a reservoir. The reactor may be a tank for wastewater storage.

An embodiment provides an isolated Feammox bacterium capable of oxidizing ammonium coupled with reduction of Fe(III) to Fe(II) and designated Acidimicrobioceae Feammox bacterium A6 (also referred to herein as Acidmicrobiaceae bacterium A6, Feammox bacterium, A6, isolate A6, or A6 isolate). The Acidimicrobiaceae Feammox bacterium A6 was submitted for deposit with the American Type Culture Collection (ATCC; 10801 University Blvd., Manassas, Va. 20110-2209, USA) on Apr. 27, 2015, and the submission was supplemented on May 7, 2015. The bacterium may have a genome comprising, consisting essentially of, or consisting of a nucleic acid sequence with at least 70, 72, 75, 80, 85, 90, 91, 92, 93, 94, 95, 96, 97, 98, 99, or 100% identity to a reference sequence selected from the group consisting of SEQ ID NO: 1. The bacterium may contain a gene comprising, consisting essentially of, or consisting of a nucleic acid sequence with at least 70, 72, 75, 80, 85, 90, 91, 92, 93, 94, 95, 96, 97, 98, 99, or 100% identity to a reference sequence selected from the group consisting of: SEQ ID NO: 8.

An embodiment provides a synthetic nucleic that encodes an enzyme capable of oxidizing ammonium coupled with iron reduction. The enzyme may be Feammox Ammonium Monooxygenase (FMO). The synthetic nucleic acid may comprise consists essentially of, or consists of a sequence with at least 70, 72, 75, 80, 85, 90, 91, 92, 93, 94, 95, 96, 97, 98, 99, or 100% identity to a reference sequence selected from the group consisting of: SEQ ID NO: 8.

An embodiment provides an expression cassette that includes any synthetic nucleic acid described herein. The expression cassette may include the synthetic nucleic acid encoding the FMO. The expression cassette may be introduced into a vector. Suitable vectors may be cloning vectors, transformation vectors, expression vectors, or virus-based vectors. The expression cassette portion of a vector may further include a regulatory element operably linked to a synthetic nucleic acid encoding the FMO. In this context, operably linked means that the regulatory element imparts its function on the synthetic nucleic acid. For example, a regulatory element may be a promoter, and the operably linked promoter would control expression of the synthetic nucleic acid.

The expression of a synthetic nucleic acid encoding the FMO from the expression cassette may be under the control of a promoter which provides for transcription of the synthetic nucleic acid in a host. The promoter may be a constitutive promoter or, tissue specific, or an inducible promoter. A constitutive promoter may provide transcription of the nucleic acid throughout most cells and tissues of the host and during many stages of development but not necessarily all stages. An inducible promoter may initiate transcription of the synthetic nucleic acid sequence only when exposed to a particular chemical or environmental stimulus. A tissue specific promoter may be capable of initiating transcription in a particular host tissue. The promoter may provide transcription of a synthetic nucleic acid having a sequence with at least 70, 72, 75, 80, 85, 90, 91, 92, 93, 94, 95, 96, 97, 98, 99, or 100% identity to a reference sequence of SEQ ID NO: 8 and expression of the FMO that is capable of oxidizing ammonium coupled with iron reduction.

In an embodiment, any one of the vectors or expression cassettes described herein may be introduced to a host. The host may be but is not limited to a bacterium, plant, algae, or yeast.

In an embodiment, a process for treating wastewater is provided. The process may be implemented to remove a nitrogen contaminant. The process may be implemented to remove at least one more contaminant from the wastewater. Removal may be reduction or complete removal of the nitrogen contaminant or the at least one more contaminant described herein. The process may include mixing the wastewater with Feammox bacteria. The mixing may occur in a reactor. The process may occur in the absence of oxygen. The process may include removing oxygen. As used herein, "absence of oxygen" may include a complete lack of oxygen, low levels of oxygen and oxygen levels below detection. Absence of oxygen may include low oxygen concentrations that allow for iron reduction. The process may be run at 2 mg/l of dissolved oxygen or less. The process may be run at 0.5 mg/l of dissolved oxygen. Absence of oxygen may be 2 mg/l of dissolved oxygen or less. Absence of oxygen may be 0.5 mg/l of dissolved oxygen or less. The process may include creating low levels of oxygen. Low levels of oxygen may be created by organisms degrading organic carbon when oxygen is consumed by organisms degrading organic carbon, and no or insufficient aeration is provided to compensate for low levels of oxygen. The process may include maintaining low levels of oxygen. The nitrogen contaminant may contain ammonium. The Feammox bacteria may oxidize ammonium under conditions suitable for oxidizing ammonium. The process of oxidizing ammonium may be coupled with reduction of Fe(III) to Fe(II). The process may include providing a source of ferric iron. The source of ferric iron may include 1 mM to 200 mM ferric iron. The concentration of ferric iron may be from 1 mM to 2 mM, from 2 mM to 3 mM, from 3 mM to 4 mM, from 4 mM to 5 mM, from 5 mM to 6 mM, from 6 mM to 7 mM, from 7 mM to 8 mM, from 8 mM to 9 mM, from 9 mM to 10 mM, from 10 mM to 20 mM, from 20 mM to 30 mM, from 30 mM to 40 mM, from 40 mM to 50 mM, from 50 mM to 60 mM, from 60 mM to 70 mM, from 70 mM to 80 mM, from 80 mM to 90 mM, from 90 mM to 100 mM, from 100 mM to 150 mM, or from 150 mM to 200 mM. The concentration of ferric iron may be any one integer value selected from those including and between 1 mM to 200 mM. The concentration of ferric iron may be less than 1 mM. The concentration of ferric iron may be up to 200 mM. The conditions may include a temperature in a range from 4° C. to 35° C. The temperature may be in a range between any two integer value temperatures selected from 4° C. to 35° C. The temperature may be in a range between and including 4° C. to 10° C., 10° C. to 15° C., 15° C. to 20° C., 20° C. and 25° C., 25° C. and 30° C., 30° C. and 35° C. The temperature may be any one integer value temperature selected from those including and between 4° C. and 35° C. or 15° C. to 35° C. Temperatures between room temperature and 35° C. may be used. The temperature may be any one temperature including and between room temperature and 35° C. Temperatures between 20° C. and 35° C. may be used. The temperature may be any temperature including and between 20° C. and 25° C. The temperature may be 25° C.

The process may be performed for a period of time ranging from 2 hours to 45 days. The time period may be 5 hours, 10 hours, 15 hours, 20 hours, 1 day, 2 days, 3 days, 4 days, 5 days, 10 days, 15 days, 20 days, 25 days, 30 days, 35 days, 40 days or 45 days. The time period may be any one integer value selected from those including and between value points, endpoints inclusive. The time period may be than 40 days. The time period may be than 45 days. The time period may be less than 1 day. In continuous flow reactors or in batches, the process may last from several hours to several months. For continuous flow reactors, the time period may depend on the bacterial concentration in the inoculum. Higher bacterial concentration in the inoculum may result in a shorter remediation time. The time period may depend on hydraulic retention capacity of a continuous flow reactor. Lower retention capacity of the continuous flow reactor may result in a shorter remediation time. Hydraulic residence time for the continuous flow reactors may be from 3 hours to 4 hours, from 3 hours to 5 hours, from 3 hours to 6 hours, from 3 hours to 7 hours, from 3 hours to 8 hours, from 3 hours to 10 hours, from 3 hours to 15 hours, from 3 hours to 20 hours, from 3 hours to 1 day, from 3 hours to 2 days, from 3 hours to 3 days. Hydraulic residence time may be any integer value selected from those including and between value points, endpoints inclusive.

The conditions may include a pH in a range from 2.0 to 7.5. The pH may be in a range between and including 2.0 and 3.0, 3.0 and 4.0, 4.0 and 5.0, 5.0 and 6.0, 6.0 to 7.0, 7.0 to 7.5. The pH may be any one integer value pH selected from those including and between 2.0 and 7.5. The pH may be any pH including and between 4.0 and 7.0. The pH may be 4.5.

In an embodiment, the at least one more contaminant that may be removed in the process described herein may be but is not limited to a metal, a heavy metal, a radionuclide, and a trace metal. The at least one more contaminant may be but is not limited to at least one of ferric iron, uranium, zinc, or copper. Ferric iron, Fe(III), may be converted to ferrous iron, Fe(II). Aqueous uranium, U(VI), may be converted to U(IV) solids. Copper, Cu(II), may be converted to Cu(I). The at least one more contaminant that may be removed in the process described herein may be but is not limited to trichloroethylene (TCE), perchloroethylene (PCE), benzene, ethylbenzene, toluene, phenanthrene, or a polyaromatic hydrocarbon.

In an embodiment, the process may include any reactor described herein. The process may include any other reactor suitable for growth of the Feammox bacterium.

In an embodiment, the process may have nitrification and denitrification phases. The process may include a nitrification phase followed by a denitrification phase. The nitrification and denitrification phases may be performed in parallel. The parallel performance of nitrification and denitrification phases may occur at low levels of oxygen. The nitrification and denitrification phases may be performed in the same location. The same location may be a reactor. The reactor utilized in the process may be configured to allow a nitrification phase and a denitrification phase. There may be two separate reactors for each of the nitrification and denitrification phases. The process may further include adding Anammox bacteria to the reactor. The nitrification phase may be performed by the Feammox bacteria. In the nitrification phase, ammonium may be converted to nitrite. The denitrification phase may be performed by denitrifying bacteria. In the denitrification phase, nitrite may be converted to gaseous nitrogen ($N_2$). The denitrification phase may be performed by the Anammox bacteria.

In an embodiment, a process for treating a soil or groundwater system is provided. The process may be implemented to remove a nitrogen contaminant from a soil or groundwater systems. The process may be implemented to remove at least one more contaminant from a soil or groundwater system. The process may include adding Feammox bacteria to the soil or groundwater system. The process may be performed in the absence or low level of oxygen. The contaminant may include ammonium. The process may include providing conditions suitable for the Feammox bacterium to oxidize ammonium. Conditions may include a source of ferric iron. Ferric iron may be added at any concentration described herein. The conditions may include any pH described herein that is suitable for growth of the Feammox bacterium. The conditions may include any temperature described herein that is suitable for growth of the Feammox bacterium. The at least one contaminant may be any inorganic or organic contaminant described herein.

Embodiments

The following list includes particular embodiments. The list, however, is not limiting and does not exclude the embodiments otherwise described herein or alternate embodiments.

An embodiment provides a composition comprising: a Feammox bacterium and at least one of soil, wastewater, or a carrier, wherein the Feammox bacterium is capable of oxidizing ammonium coupled with reduction of Fe(III) to Fe(II). The Feammox bacterium may have a genome comprising a nucleic acid sequence with at least 90% identity to a reference sequence of SEQ ID NO: 1. The nucleic acid sequence may have 100% identity to the reference sequence of SEQ ID NO: 1. The Feammox bacterium may include a nucleic acid encoding at least one enzyme capable of oxidizing ammonium into nitrite. The nucleic acid may include a sequence with at least 70% identity to SEQ ID NO: 8. The sequence may have 100% identity to SEQ ID NO: 8. The Feammox bacterium may be the bacterial strain designated as the Acidimicrobiaceae Feammox bacterium A6, which was submitted to be deposited with the American Type Culture Collection (ATCC; 10801 University Blvd., Manassas, Va. 20110-2209, USA) on Apr. 27, 2015, and the submission was supplemented on May 7, 2015. The composition may comprise the wastewater and the wastewater comprises an ammonium containing contaminant. The composition may comprise at least one more contaminant. The at least one more contaminant may be one or more inorganic contaminants. The inorganic contaminants may be selected from the group consisting of: a heavy metal, a radionuclide, and a trace metal. The at least one more inorganic contaminants may be selected from the group consisting of: ferric iron, uranium, zinc, and copper. The at least one more contaminant may be one or more organic contaminants. The organic contaminants may be but are not limited to chlorinated volatile organic compounds, perchloroethylene (PCE), trichloroethylene (TCE), trichloroethane, dichloroethane, vinyl chloride, polychlorinated biphenyls, fuel constituents, benzene, ethylbenzene, toluene, xylene, phenanthrene, methyl tert butyl ether, tertiary butyl alcohol, polyaromatic hydrocarbons, or ethylene dibromide. The composition may further comprise a source of ferric iron. The source may be selected from the group consisting of: a ferrihydrite, a goethite, an elemental iron, a nontronite, and an iron-rich clay. The composition may comprise the soil.

An embodiment provides a system comprising a reactor and a composition comprising a Feammox bacterium and at least one of soil, wastewater or a carrier, wherein the Feammox bacterium is capable of oxidizing ammonium coupled with reduction of Fe(III) to Fe(II). The Feammox bacterium may have a genome comprising a nucleic acid sequence with at least 90% identity to a reference sequence of SEQ ID NO: 1. The nucleic acid sequence may have 100% identity to the reference sequence of SEQ ID NO: 1. The Feammox bacterium may include a nucleic acid encoding at least one enzyme capable of oxidizing ammonium into nitrite. The nucleic acid may include a sequence with at least 70% identity to SEQ ID NO: 8. The sequence may have 100% identity to SEQ ID NO: 8. The Feammox bacterium may be the bacterial strain designated as the Acidimicrobiaceae Feammox bacterium A6, which was submitted to be deposited with the American Type Culture Collection (ATCC; 10801 University Blvd., Manassas, Va. 20110-2209, USA) on Apr. 27, 2015, and the submission was supplemented on May 7, 2015. The composition may comprise the wastewater and the wastewater comprises an ammonium containing contaminant. The composition may comprise at least one more contaminant. The at least one more contaminant may be one or more inorganic contaminants. The inorganic contaminants may be selected from the group consisting of: a heavy metal, a radionuclide, and a trace metal. Inorganic contaminants may be copper, uranium, ferric iron, lead, zinc, arsenic, chromium, mercury or silver. The at least one more contaminant may be organic contaminants. The organic contaminants may be but are not limited to chlorinated volatile organic compounds, perchloroethylene (PCE), trichloroethylene (TCE), trichloroethane, dichloroethane, vinyl chloride, polychlorinated biphenyls, fuel constituents, benzene, ethylbenzene, toluene, xylene, phenanthrene, methyl tert butyl ether, tertiary butyl alcohol, polyaromatic hydrocarbons, or ethylene dibromide. The composition may further comprise a source of ferric iron. The source may be selected from the group consisting of: a ferrihydrite, a goethite, an elemental iron, a nontronite, and an iron-rich clay.

An embodiment provides a process for removing a nitrogen contaminant from wastewater comprising mixing the wastewater with Feammox bacteria. The Feammox bacterium may be the bacterial strain designated as the Acidimicrobiaceae Feammox bacterium A6, which was submitted to be deposited with the American Type Culture Collection (ATCC; A10801 University Blvd., Manassas, Va. 20110-2209, USA) on Apr. 27, 2015, and the submission was supplemented on May 7, 2015. The nitrogen contaminant may be ammonium. The process may further comprise providing conditions suitable for the Feammox bacteria to oxidize ammonium. Providing conditions may comprise creating or maintaining an absence of oxygen. Providing conditions may comprise adding a source of ferric iron. Providing conditions may comprise establishing a temperature in a range from 4° C. to 35° C. Providing conditions may comprise establishing a pH in a range from 2.0 to 7.5. The mixing may occur in a reactor. The reactor may be configured to allow a nitrification phase and a denitrification phase. There may be two separate reactors for each of nitrification and denitrification phases. The nitrification phase may be performed by the Feammox bacterium. The Feammox bacterium may have a genome comprising a nucleic acid sequence with at least 90% identity to a reference sequence of SEQ ID NO: 1. The Feammox bacterium may include a nucleic acid sequence with at least 90% identity to a reference sequence of SEQ ID NO: 8. The denitrification phase may be performed by the Anammox bacterium. The reactor may be selected from the group consisting of: a continuous membrane reactor, a sequential batch reactor, an electrogenic microbial reactor, and an industrial-type reactor. The process may further comprise removing at least one more contaminant. The at least one more contaminant may be one or more inorganic contaminants. The inorganic contaminants may comprise at least one metal selected from the group consisting of: a heavy metal, a radionuclide, and a trace metal. The inorganic contaminants may be selected from the group consisting of: ferric iron, uranium, copper, lead, zinc, arsenic, chromium, mercury, and silver. The at least one more contaminant may be organic contaminants. The organic contaminants may be but are not limited to chlorinated volatile organic compounds, perchloroethylene (PCE), trichloroethylene (TCE), trichloroethane, dichloroethane, vinyl chloride, polychlorinated biphenyls, fuel constituents, benzene, ethylbenzene, toluene, xylene, phenanthrene, methyl tert butyl ether, tertiary butyl alcohol, polyaromatic hydrocarbons, or ethylene dibromide.

An embodiment provides a process for removing a nitrogen contaminant in a soil or groundwater system comprising: adding Feammox bacterium to the soil or groundwater system. The Feammox bacterium may be the bacterial strain designated as the Acidimicrobiaceae Feammox bacterium A6, which was submitted for deposit with the American Type Culture Collection (ATCC; 10801 University Blvd., Manassas, Va. 20110-2209, USA) on Apr. 27, 2015, and the submission was supplemented on May 7, 2015. The nitrogen contaminant may contain ammonium. The process may further comprise providing conditions suitable for the Feammox bacteria to oxidize ammonium. Providing conditions may comprise creating or maintain an absence of oxygen. Providing conditions may comprise adding a source of ferric iron. The source of ferric iron may be selected from the group consisting of: a ferrihydrite, a goethite, a scrap iron, a nontronite, and an iron-rich clay. Providing conditions may comprise establishing a temperature in a range from 4° C. to 35° C. Providing conditions may comprise establishing a pH in a range from 2.0 to 7.5. The process may further comprise removing at least one more contaminant. The at least one more contaminant may be one or more inorganic contaminants. The inorganic contaminants may comprise at least one metal selected from the group consisting of: a heavy metal, a radionuclide, and a trace metal. The inorganic contaminants may be selected from the group consisting of: ferric iron, uranium, a copper, lead, zinc, arsenic, chromium, mercury, and silver. The at least one more contaminant may be organic contaminants. The organic contaminants may be but are not limited to chlorinated volatile organic compounds, perchloroethylene (PCE), trichloroethylene (TCE), trichloroethane, dichloroethane, vinyl chloride, polychlorinated biphenyls, fuel constituents, benzene, ethylbenzene, toluene, xylene, phenanthrene, methyl tert butyl ether, tertiary butyl alcohol, polyaromatic hydrocarbons, or ethylene dibromide.

Further embodiments herein may be formed by supplementing an embodiment with one or more element from any one or more other embodiment herein, and/or substituting one or more element from one embodiment with one or more element from one or more other embodiment herein.

The following non-limiting examples are provided to illustrate particular embodiments. The embodiments throughout may be supplemented with one or more detail from one or more example below, and/or one or more element from an embodiment may be substituted with one or more detail from one or more example below.

EXAMPLE 1

Development Of An Enrichment Culture Capable Of Ammonium Oxidation Under Iron Reducing Conditions An anaerobic $NH_4^+$ oxidation process coupled to iron reduction was first noted in a forested riparian wetland in New Jersey. In this reaction, $NH_4^+$ is the electron donor, which is oxidized to nitrite ($NO_2^-$), and ferric iron [Fe(III)] is the electron acceptor, which is reduced to ferrous iron [Fe(II)]. The stoichiometry and change in free energy when ferrihydrite is the Fe(III) source is:

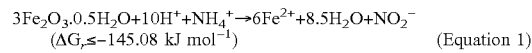
$3Fe_2O_3.0.5H_2O+10H^++NH_4^+ \rightarrow 6Fe^{2+}+8.5H_2O+NO_2^-$
($\Delta G_r \leq -145.08$ kJ mol$^{-1}$)     (Equation 1)

These pathways have been reported to oxidize $NH_4^+$ to $NO_2^-$, to $NO_3^-$, or directly to $N_2$, using Fe(III) as electron acceptor (Clement et al., 2005; Shrestha et al., 2009; Sawayama, 2006; Yang et al., 2012, all of which are incorporated by reference as if fully set forth).

Soil samples were collected from the same location and used for laboratory incubation experiments as well as to set up an enrichment system for Feammox in a continuous flow membrane reactor. Various incubation conditions [Fe(III) sources, inorganic carbon content, $NH_4^+$ concentration, $^{15}NH_4^+$, and acetylene gas ($C_2H_2$) as a selected inhibitor] were used to study the Feammox mechanism. Molecular biology methods, such as denaturing gradient gel electrophoresis (DGGE), 454 pyrosequencing, and real-time quantitative PCR (qPCR) analysis were used to investigate the bacterial community change during incubations. Production of both nitrite (NO2-) and ferrous iron were measured repeatedly during incubations when soil slurries were supplied with iron oxide (ferrihydrite or goethite) and ammonium chloride.

The Feammox process provided denitrifiers and anammox bacteria with the necessary NO2- under this anaerobic incubation, and achieved total nitrogen loss via denitrification and anammox pathways. Therefore, Feammox is an important process in the nitrogen cycle in soil environments under oxygen limited conditions, and reveals a new linkage between these two significant biogeochemical cycles (iron and nitrogen cycle).

EXAMPLE 2

Sample Collection and Processing

Soils for all the experiments described in examples herein were taken from a temperate forested riparian wetland at the Assunpink Wildlife Management Area, New Jersey. Ten soil cores were collected from 10 cm below the surface with polyethylene column containers (8 cm diameter and 30 cm long) and transported to the laboratory within 2 hours. The soil pH was between 3.5 and 4.5, and no manganese oxides were detected. The detailed physicochemical characteristic of these wetland soils have been described elsewhere (Clement et al., 2005 Soil Biol Biochem 37: 2323-2328, which is incorporated by reference as if fully set forth). Prior to all incubation experiments, soil slurry from the field site was aerated for a month to degrade much of the labile organic carbon. After a 30 days of aeration, the dissolved organic carbon (DOC) content was stable at 2.06±0.20 mg g$^{-1}$. Following the aeration treatment, the soil was divided into 400×10 g (air-dry equivalent) subsamples, and added into 50 mL serum vials, with 30 mL deionized water. The soil slurries were purged thoroughly with a $CO_2:N_2$ (80:20) mixture, resulting in a final pH of ~4 to 4.5. The vials were sealed tightly with rubber stoppers and were stored in an anaerobic glove box for 30 days at ambient temperature to allow for stabilization before starting the incubations.

EXAMPLE 3

Batch Incubation Experiments

All incubations, addition of reagents, and sampling were conducted in an anaerobic glove box with a solution of resazurin as the redox indicator. Soil samples were first incubated with different Fe(III) sources to determine which source would yield a more active Feammox process: 6-line ferrihydrite ($Fe_2O_3.0.5H_2O$) or goethite [FeO(OH)]+$NH_4^+$ addition; ferric chloride+$NH_4^+$ addition; ferric citrate+$NH_4^+$ addition; either only ferrihydrite or $NH_4^+$ addition; and autoclaved soil with ferrihydrite+$NH_4^+$ addition (n=30 per treatment). 6-line ferrihydrite ($Fe_2O_3.5H_2O$) or goethite [FeO(OH)] was prepared according to Cornell and Schwertmann, 2003 The Iron Oxides: Structure, Properties, Reactions, Occurrences, and Uses. John Wiley and Sons Ltd., which is incorporated herein by reference as if fully set forth. pH was adjusted to 4.5 in the ferrihydrite/goethite augmented samples, and to between 3.5~4.0 in the ferric chloride/citrate augmented samples. Soil-slurry samples, which were prepared to have an initial concentration of 12.0 mmol L$^{-1}$ Fe(III) and/or 2.00 mmol L$^{-1}$ $NH_4^+$ were incubated in a series of 50 ml vials with an oxygen-free headspace, created by purging with a $CO_2:N_2$ (80:20) mixture. Triplicate samples were collected destructively every two days to analyze iron and nitrogen species.

The second incubation was conducted to extend the anoxic incubation with ferrihydrite to 180 days, with repeated $NH_4Cl$ additions after the $NH_4^+$ in solution was exhausted. The initial concentration of Fe(III) was 25.0 mmol L$^{-1}$ and 1.00 mmol L$^{-1}$ $NH_4^+$ was added on days 4, 24, and 60, furthermore, 0.20 mmol L$^{-1}$ $NaHCO_3$ was added on day 50 and day 90 of the incubation. On day 125, incubation vials were divided into two sets to study the effect of different inorganic carbon contents on Feammox. Either 1.20 mmol L$^{-1}$ or 0.20 mmol L$^{-1}$ of $NaHCO_3$ plus 2 mmol L$^{-1}$ of $NH_4Cl$ were added to each set. $NaHCO_3$ was then added every 10 days, which increased the soil pH to ~5 in the samples amended with 1.20 mmol L$^{-1}$ of $NaHCO_3$. For this incubation, samples were collected every four days. Finally, soil samples collected on day 180 of the incubations were used to enrich the Feammox bacteria in a membrane reactor. To study how the organic carbon content affects the Feammox bacteria, 1.00 mmol L$^{-1}$ sodium citrate was also supplied on day 125 to four of the 1.20 mmol L$^{-1}$ $NaHCO_3$ amended samples.

In the third experiment, inorganic nitrogen species were quantified through incubations in the presence of $C_2H_2$. Soil slurries were first incubated for 90 days in eighty 50 mL vials. The Fe(III) concentration at the beginning of the incubations was 25 mmol L$^{-1}$. One mmol L$^{-1}$ $NH_4Cl$ and 0.20 mmol L$^{-1}$ $NaHCO_3$ was added on days 24, 60, and 90. After this incubation. 5 mL of pure $C_2H_2$ gas were added to 40 vials, which resulted in a finial $C_2H_2$ concentration of 100 L$^{-1}$. Samples with and without $C_2H_2$ were then incubated anaerobically for 20 days. The headspace gas was sampled every 24 hours for $N_2O$ analysis, and soil samples were analyzed every two days for Fe and N species.

EXAMPLE 4

Continuous Flow Membrane Feammox Reactor

Soil samples collected on day 180 from the incubation with ferrihydrite, $NH_4Cl$, and 1.20 mmol $L^{-1}$ $NaHCO_3$ additions were inoculated into a continuous flow membrane reactor, which was operated under anaerobic conditions by constantly purging $N_2$ through the reactor's headspace at a room temperature (25° C.), and with a 48 hour hydraulic retention time (Abbassi et al., 2014 *J. Environ. Management* 142: 53-59, which is incorporated herein by reference as if fully set forth).

The enrichment medium contained the following components per liter: 177 mg $NH_4Cl$, 77.9 mg $(NH_4)_2SO_4$, 19.8 mg $NaHCO_3$, 71.0 mg $KHCO_3$, 9.00 mg $KH_2PO4$, 100 mg $MgSO_4.7H_2O$, and 60.0 mg $CaCl_2.2H_2O$. After autoclaving, 1 mL trace element solution was added to the medium (Van de Graaf et al., 1996 *J. Microbiol.*, 142:2187-2196, which is incorporated herein by reference as if fully set forth). 50.0 mmol $L^{-1}$ ferrihydrite were added once every two weeks directly into the reactor. To aid in maintaining anaerobic conditions, 0.10-0.20 mmol $L^{-1}$ sodium citrate was fed to the reactor about twice per month, pH was controlled at around 4~5, and dissolved oxygen was <0.10 mg/L. Samples form the outflow were collected every two days, and sludge samples from reactor were collected and kept at −20° C. for molecular biology analysis.

Finally, $^{15}N$ isotope tracer incubations were conducted using slurries collected form the stable Feammox membrane reactor. Five treatments (n=3 per treatment) were conducted: (1) control with only anoxic deionized (DI) water; (2) $^{15}NH_4Cl$ addition; (3) $^{15}NH_4Cl+Fe(III)$ addition; (4) $^{15}NH_4Cl$ and $C_2H_2$ addition; (5) $^{15}NH_4Cl$, $C_2H_2$, and Fe(III) addition. The headspace gas of each 50 mL incubation vial was sampled every 24 hours for $^{15}N_2O$ analysis.

EXAMPLE 5

Chemical Analyses

For each sample collection during the incubations, a set of vials was destructively sampled in a glove box under oxygen-free conditions and the pH was measured immediately using a pH electrode. An extraction with 0.5N HCl was conducted for 24 hours at room temperature to determine acid-extractable Fe(II) and $NH_4^+$ concentrations in the soils. Fe(II) was analyzed using the ferrozine assay method (Stookey, 1970 Anal Chem 42: 779-781; Komlos et al., 2007 Water Res 41: 2996-3004, which are incorporated herein by reference as if fully set forth). Extraction efficiency of Fe(II) was affected by the HCl concentration and the extraction time. About 5-10% more Fe(II) could be extracted with either 1N HCl extraction over 24 hours or with 0.5 N HCl over 36 hours as opposed to 0.5 N HCl over 24 hours. Furthermore, after more Fe(II) was produced in the system with increasing incubation time, the Fe(II) extraction efficiency improved. Only a 1-2% difference was observed in the Fe(II) extracted over 24 hours using 0.5N vs. 1N HCl towards the end of the incubation period. Clays, present in the soil incubations, typically sorb Fe(II) more efficiently when the total Fe(II) is low, furthermore ferrihydrite is slowly converted to magnetite, resulting in relatively different associations to different phases of the Fe(II) over the duration of the incubation. All of which leads to incomplete Fe(II) extractions, especially when the Fe(II) is low. Fe(II) data obtained herein via 0.5N HCl extractions over 24 hours to ensure that the methods and hence data are comparable to those reported by other researchers focusing on iron reduction and iron bioavailability.

$NH_4^+$ was analyzed using a Dionex™ Ion Chromatograph (LC3000) with a CS-16 Column and a CS-16 guard column (flow rate=1.00 mL $min^{-1}$, detection limit=0.012 ppm). $NO_3^-$ and $NO_2^-$ were extracted with DI water for 1 hour anaerobically, and measured via Ion Chromatography, using an AS-22 Column along with an AG-22 guard column (flow rate=1.20 mL $min^{-1}$, detection limit=0.016 ppm). For the total organic carbon (TOC) and total nitrogen (TN) analyses a Shimadzu TOC-5000(A) was used. $N_2O$ concentrations were determined on a gas chromatograph Shimadzu 2014 equipped with an electron capture detector.

EXAMPLE 6

DNA and RNA Isolation

DNA and RNA samples were extracted from soils collected at the wetland prior to any laboratory incubation, from the samples taken at different time points during the incubation experiments and from the reactor. DNA was extracted from 500 mg soil or sludge samples using the FastDNA® spin kit for soil (MP Biomedicals, USA) as described by the manufacturer, and RNA using the FastRNA® pro Soil Direct Kit. The concentrations were measured using a Nanodrop 2000 spectrophotometer (Thermo Scientific, USA).

EXAMPLE 7

PCR-DGGE and 454 Pyrosequencing Analysis

Bacterial universal 16S rRNA gene primer sets V3-2/V3-3 were used for PCR amplification (Jensen et al., 1998 FEMS Microbiol Ecol 26: 17-26, which is incorporated herein by reference as if fully set forth). DGGE was performed with an 8% polyacrylamide gel containing a gradient from 40% to 80% denaturant using the gradient gel electrophoresis system (C.B.S. SCIENTIFIC, USA). The electrophoresis was carried out at 60 V for 15 hours. After that the gel was stained with 0.1 μL $mL^{-1}$ SYBR Green I and visualized with an UV transilluminator. All visible bands were excised from the gel and used as templates for re-amplification, using the primer set V3-1/V3-2 and followed by cloning (Jensen et al., 1998, which is incorporated herein by reference as if fully set forth). PCR products were purified via agarose gel extraction and cloned into a pGEM-T vector (Promega). A total of 10 to 30 positive recombinant clones for each band were identified by colony PCR, and were sent for sequencing to avoid erroneous interpretations. DNA sequencing was then conducted by Genewiz, Inc. Bacteria were classified and the phylogenetic tree of Acidimicrobiaceae-related sequences was constructed using the Bayesian inference (Huelsenbeck et al., 2001 Science, 294:2310-2314, which is incorporated herein by reference as if fully set forth). Sequences obtained in this study were submitted to the GanBank database on Feb. 4, 2013, and are available therein under accession numbers KC581755-KC581779. See also Huang S and Jaffe P R, *Characterization of incubation experiments and development of an enrichment culture capable of ammonium oxidation under iron reducing conditions,* 2014, Biogensciences Discuss, 11, 12295-12321, which is incorporated herein by reference as if fully set forth. To further confirm the changes in the bacterial community, 454 pyrosequencing was performed with samples collected from the incubation on days 0, 30, 90, 160 and from the membrane reactor after 150 days of reactor operation. Domain-specific primers Bact-338F1/909R, targeting the V3-V5 region of the 16S rDNA of bacteria were amplified and sequenced according to Pinto et al. (2012, PLoS One 7: 43093, which is incorporated herein by reference as if fully set forth).

EXAMPLE 8

Quantitative PCR (qPCR) Assay qPCR experiments were carried using a StepOnePlus™ Real-Time PCR System (Life Technologies, USA), represented by 16S rRNA genes, using primer sets 1055f/1392r for total bacteria (Harms et al., 2003), Amx368f/Amx820r for anammox bacteria (Schmid et al., 2000; Schmid et al., 2003), acd320f-432r which were developed for Acidobacteriaceae bacteria, and acm342f-439r which were developed for Acidimicrobiaceae bacteria. See Harms et alt. 2003 Environ Sci Technol 37: 343-351, for total bacteria; a Schmid et al., 2000 Syst Appl Microbiol 23:93-106, and Schmid et al., 2003 Syst Appl Microbiol 26:529-538 for anammox bacteria. For the detection of denitrifiers, AOB and AOA, denitrifying functional genes (nirS and nirk), ammonia monooxygenase structural gene (amoA) were quantified with primer sets NirS3F/NirS5R, NirK1F/NirK5R, amoA-1F/amoA-2R for AOB-amoA and Arch amoA-F/amoA-R for AOA-amoA (Braker et al., 1998 Appl Environ Microbiol 64:3769-3775; Rotthauwe et al., 1997 Environ Microbiol 9:1761-1771; Francis et al., 2005 Proc. Natl. Acad. Sci. 102:14683-14688, all of which are incorporated by reference herein as if fully set forth). Primer pairs CrenamoA23f/616r, was also used to quantify the thaumarchaeal amoA genes which represented acidophilic ammonia oxidizers (Tourna et al., 2008 Environ Microbiol 10:1357-1364, which is incorporated herein by reference as if fully set forth). For DNA quantification, each qPCR mixture (20 μL) was composed of 10 μL of SYBR Premix Ex Taq® II (Takara, Japan), 0.8 μL 10 μM of each primer, and ~10 ng DNA template. RNA quantification was conducted through a real-time quantitative reverse transcription-PCR (RT-qPCR) analysis, by using the One Step SYBR® PrimeScript® RT-PCR Kit (Takara, Japan) according to the manufacturer's recommendations. Thermal cycling conditions for total 16S rDNA, nirS and AOB-amoA gene numbers was initiated for 30 s at 94° C., followed by 40 cycles of 5 s at 94° C., 30 s at 57° C., and 30 s at 70° C. 16S rDNA numbers of anammox, Acidobacteriaceae and Acidimicrobiaceae bacteria were performed at 56° C., 55° C., and 58° C. as annealing temperature respectively, with the same program. For AOB-amoA gene and thaumarchaeal amoA genes, annealing temperature was 53° C. and 55° C., and the annealing time was adjusted to 45 s. For RNA quantification, the cycling conditions were identical to those described for measuring gene numbers, with the exception that an initial incubation was conducted for 5 min at 42° C. to facilitate reverse transcriptase activity. Each assay contained a standard using a serial dilution of plasmids containing specific target genes, independent triplicate templates for each soil sample, and triplicate no template controls (NTC).

EXAMPLE 9

Thermodynamic Consideration of Feammox

The change in Gibbs free energy of Equation 1 was calculated to determine the thermodynamic feasibility of the Feammox reactions using the following equation $$aA + bB \rightarrow cC + dD$$

$$\Delta G_r = \Delta G_r^0 + RT \ln \frac{(C)^c (D)^d}{(A)^a (B)^b}$$

and:

$$\Delta G_f^0 = c\Delta G_{jC}^0 + d\Delta G_{jD}^0 - a\Delta G_{jA}^0 - b\Delta G_{jB}^0$$

R is the gas constant, which equals 0.008314 kJ mol$^{-1}$. K, and T is the absolute temperature in ° Kelvin (297.15 K). Free energies of formation were obtained from Stumm and Morgan (1996): $\Delta G_f^0$ (NH$_4^+$)=-79.37 kJ mol$^{-1}$, $\Delta G_f^0$ (NO$_2^-$)=-37.2 kJ mol$^{-1}$, $\Delta G_f^0$(H$_2$O)=-237. 18 kJ mol$^{-1}$, $\Delta G_f^0$ (Fe$^{2+}$)=-78.87 kJ mol$^{-1}$. $\Delta G_f^0$ (Fe$_2$O$_3$.0.5H$_2$O)=-711 kJ mol$^{-1}$ (Stumm and Morgan 1996 Aquatic Chemistry: Chemical Equilibria and Rates in Natural Waters (John Wiley, New York); Majzlan et al., 2004 Geochim. Cosmochim. Acta. 68, 1049-1059, which are incorporated herein by reference as if fully set forth). For biogeochemical reactions involving H$^+$, requires converting from standard condition (pH=0) to biochemical conditions: $\Delta G^0 = \Delta G^0 + m\Delta G_f(H^+)$, where m is the net number of H$^+$ in the reaction and $\Delta G_f'(H^+)$ is calculated as -5.69 kJ mol$^{-1}$ per pH unit (Madigan et al., 2002 Brock Biology of Microorganisms, 10$^{th}$ ed. Appendix1: energy calculations in microbial bioenergetics, which is incorporated by reference herein as if fully set fort). The chemical activity values used in the calculation are based on our incubation experiments. $C_{NH}$=2 mmol L$^{-1}$, $C_{NO_2}$=10 μmol L$^{-1}$, $C_{Fe_2}$≤0.01 μmol L (detection limit), respectively, and pH=4.0. The dissolved Fe(II) was below the ferrozinemethod detection limit in the solution due to its sorption onto the Fe(III) oxides. Measurable dissolved Fe was only present in the samples extracted with 0.5M HCl. An activity of 1 was used for the solid-phase Fe(III) oxide minerals, and water.

$$3Fe_2O_3 \cdot 0.5H_2O + 10H^+ + NH_4^+ \rightarrow 6Fe^{2+} + 8.5H_2O + NO_2^- \quad \text{(Equation 1)}$$

$$\Delta G_r \leq \left[ 6\Delta G_{jFe^{2+}}^0 + 8.5\Delta G_{jH_2O}^0 + 1\Delta G_{jNO_2^-}^0 - 3\Delta G_{jFe_2O_3 \cdot 0.5H_2O}^0 - 10\Delta G_{jH^+}^0 - 1\Delta G_{jNH_4^+}^0 \right] +$$

$$(0.008314 \text{ kJ mol}^{-1})(297.15 \text{ K}) \ln \frac{(C_{Fe^{2+}})^6 (C_{H_2O})^{8.5} (C_{NO_2^-})^1}{(C_{Fe_2O_2 \cdot 0.5H_2O})^3 (C_{H^+})^{10} (C_{NH_4^+})^1}$$

$$\Delta G_r \leq [6(-78.87) + 8.5(-237.18) + 1(37.2) - 3(-711) - 10(4 \times -5.69) - 1(-79.37)] + (0.008314 \text{ kJ mol}^{-1})$$

$$(297.15 \text{ K}) \ln \frac{(10^{-8})^6 (1)^{8.5} (10^{-5})^1}{(1)^3 (10^{-4})^{10} (2 \times 10^{-3})^1}$$

$$\Delta G_r \leq -145.08 \text{ kJ mol}^{-1}$$

The ≤ sign is because an upper limit (detection limit) was used for the Fe(II) concentration.

Figure 10:
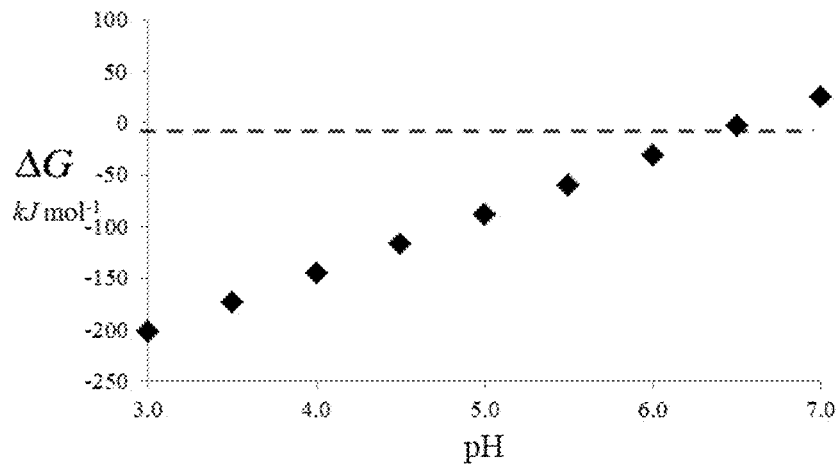
FIG. 10 illustrates a graph of ΔG vs. pH.

FIG. 10 illustrates a graph of ΔG vs. pH. Referring to this figure, pH shows that when maintaining all species concentrations constant except H$^+$. Feammox should not be feasible when the pH is above 6.5. Hence, Feammox is expected to occur in acidic environments.

EXAMPLE 10

PCR Amplification, DGGE Analysis and Pyrosequencing

Bacterial universal 16S rRNA gene primer sets V3-2/V3-3 and 27f/519r were used for PCR amplification (Jensen et al., 1998; Lane, 1991, both of which are incorporated herein by reference as if fully set forth). Each 25 µL reaction mixture contained 2.5 µL 10×PCR Buffer (500 mM KCl, 25 mM MgCl2, 200 mM Tris-HCl [pH 8.4], 0.1% Triton X-100), 2.0 µL 2.5 mM DNTP mixture (Takara, Japan), 0.3 µL of 10 µM V3-2 and V3-3, 0.13 µL 5U Taq polymerase, 1 µL of template DNA, and 18.77 µL sterilized ddH$_2$O. The PCR protocol was as follows: 30 s initial denaturation at 94° C.; 10 cycles with each cycle consisting of 30 s of denaturation at 94° C., 30 s of annealing at 61° C. (the temperature of anneal decreased 0.5° C. after each cycle), and 40 s extension at 72° C.; 25 cycle with each cycle included 30 s denaturation at 94° C., 30 s annealing at 55° C., and 40 s extension at 72° C.; followed by a final 5 min extension at 72° C. PCR products stained with 0.02 µL mL$^{-1}$ Genefinder were visualized on 1% (w/v) agarose gel at 120 V for 20 min, and visualized under SYNGENE Genesnap. A much higher degree of diversity was observed with primer sets V3-2/V3-3, hence its DGGE products were used for the following analysis.

After the DGGE was performed, all visible bands were excised from the gel and used as templates for re-amplification, using primer set V3-1/V3-2 (Jensen et al., 1998, which is incorporated herein by reference as if fully set forth). The PCR program was initiated with 30 s at 94° C., followed by 40 cycles of 5 s at 94° C., 30 s at annealing at 56° C., and 30 s at 70° C. The PCR products were purified using Qiaquick PCR preps (Qiagen, Valencia, Calif.) and cloned into a pGEM-T vector (Promega, USA). Positive recombinant clones were identified by PCR, and the PCR products were cleaned with ExoSap treatment and sequences were conducted by Genewiz, Inc., USA. Clone libraries from 12 samples resulted in 721 sequences of partial 16S rRNA gene fragments and the sequences were grouped into operational taxonomic units (OTUs) based on a 5% sequence distance cutoff calculated using the DOTUR program (Schloss and Handelsman, 2005 *Appl. Environ. Microbl.* 71, 1501-1506, which is incorporated herein by reference as if fully set forth). Six groups of bacteria were classified via a phylogenetic analysis using the Bayesian inference (BI), implemented with MrBayes version 3.1.2 (Huelsenbeck et al., 2001; Ronquist et al., 2003 *Bioinformatics.* 19, 1572-1574, which are incorporated herein by reference as if fully set forth). A best fit model of nucleotide substitution was identified using the Akaike information criterion (AIC) (Akaike, 1973) as implemented in MrModelTest 2.3 (Nylander, 2004). Bayesian analysis was carried out using GTR+I+G model selected by MrModelTest 2.3, in which model parameters were treated as unknown and estimated through the BI. The following settings were applied: implementing two Markov chain Monte Carlo (MCMC) runs, running four simultaneous Markov chains for 19 million generations, and sampling the Markov chains every 100 generations. Tracer V1.5 (Rambaut and Drummond, 2009) was used to judge convergence of the Bayesian Markov chain Monte Carlo runs. The first 10,000 sampled trees were discarded as burn-in. A consensus tree was constructed from the remaining sampled trees. Sequences obtained in this study were submitted to the GanBank database on Feb. 4, 2013, and are available therein under accession numbers KC581755-KC581779. See also Huang S and Jaffe P R, *Characterization of incubation experiments and development of an enrichment culture capable of ammonium oxidation under iron reducing conditions,* 2014, Biogensciences Discuss, 11, 12295-12321, which is incorporated herein by reference as if fully set forth. Approximately 2.5 ng of each DNA extract from samples collected from the incubation on days 0, 30, 90, 160 and from the membrane reactor after 150 days of reactor operation were used for 454 pyrosequencing analysis. To amplify a 16S rRNA gene fragment of the appropriate size and sequence variability for the 454 pyrosequencing, specific primers Bact-338F1 (CCTACG GGRGGCAGCAG) (SEQ ID NO: 2)/909R (CCGTCAATTYHTTRAGT) (SEQ ID NO: 3), targeting the V3-V5 region of the 16S rRNA gene of bacteria were chosen (Pinto and Raskin 2012, which is incorporated herein by reference as if fully set forth). The PCR conditions used were 94° C. for 2 min, 20 cycles of 94° C., 45 s denaturation; 55° C., 45 s annealing and 72° C., 1 min extension; followed by 72° C., 6 min. After 20 rounds of amplification, another 3 rounds of amplification were done to add the A and B adapters required for 454 pyrosequencing to specific ends of the amplified 168 rRNA fragment for library construction (Margulies et al., 2005 Nature, 437, 376-380, which is incorporated herein by reference as if fully set forth). Approximately 4 ng/µl of 16S rRNA gene fragment from each soil samples was required to construct the five libraries for 454 sequencing. Polymerase chain reaction products were cleaned using the QIAquick PCR Purification Kit (Qiagen) following the manufacturer's instructions, quantified using a Qubit Fluorometer (Invitrogen), and then sent for 454-pyrosequencing using a Roche/454 GS FLX sequencer.

A total of 19,021 partial 16S rRNA sequences were obtained from the five soil samples. The sequences were then passed through the DOTUR program to further reduce errors as outlined previously (Schloss and Handelsman, 2005, which is incorporated herein by reference as if fully set forth). Briefly, after trimming, pre-clustering, removal of chloroplast sequences and alignments, a total of 10172 sequences remained. These were clustered with the average neighbor algorithm with a 3% dissimilarity cutoff, which resulted in 1015 OTUs (Pinto and Raskin 2012, which is incorporated herein by reference as if fully set forth).

EXAMPLE 11

Primer Design for Real-time PCR Assay

Two sets of primers, acd320f (5'-CGG TCC AGA CTC CTA CGG GA-3') (SEQ ID NO: 4)-432r (5'-GAC AGG GTT TTA CAG TCC GAA GA-3') (SEQ ID NO: 5) and acm342f (5'-GCA ATG GGG GAA ACC CTG AC-3) (SEQ ID NO: 6)-439r (5'-ACC GTC AAT TTC GTC CCT GC-3') (SEQ ID NO: 7) were designed for Acidobacteriaceae bacteria A8 and Acidimicrobiaceae bacterium A6 respectively from clone libraries in this study, using an NCBI Primer-Blast program (http://www.ncbi.nlm.nih.gov/tools/primer-blast). This program did not show any putative sequences deposited in the GenBank, that amplified with the selected primers, could interfere with the experiment. The sequences of Acidobacteriaceae bacteria and Acidimicrobiaceae bacterium A6 acquired from this study did not exhibit any mismatches with the above primer sequences. Primers were then used for real-time PCR amplification in the soil samples from the incubation experiments.

EXAMPLE 12

Isotope Tracer Incubations

After 270 days of operation, Feammox enrichment slurries collected form the Feammox membrane reactor were used for isotope tracer incubations. Slurries were first incubated for 20 days in 50 mL vials under anaerobic conditions. Five treatments (n=3 per treatment) were conducted as follows: (1) control treatment with only anoxic DI water; (2) $^{15}NH_4Cl$ addition; (3) $^{15}NH_4Cl+Fe(III)$; (4) $^{15}NH_4Cl$ and $C_2H_2$ addition; (5) $^{15}NH_4Cl$, $C_2H_2$ and Fe(III) addition. The final concentration of $^{15}NH_4Cl$ was 1 mmol $L^{-1}$, and 5 mmol $L^{-1}$ of ferrihydrite was add as the Fe(III) source. 5 mL of pure $C_2H_2$ gas was added to the vials, which resulted in a finial $C_2H_2$ concentration of 100 μmol $L^{-1}$. Samples were then incubated anaerobically for 7 days. The headspace gas was sampled every 24 hours for $^{15}N_2O$ analysis. All these processes were conducted in an anaerobic glove box. $N_2O$ was determined by isotope ratio mass spectrometry (IRMS, Thermo Finnigan Delta V Advantage, Bremen, Germany). $^{15}N_2O$ concentration was also calculated as $^{15}N_2O$ atom % excess above its natural abundance, following methods described by Ding et al. 2014 Environ Sci Technol. 48(1.8):10641-7, which is incorporated herein by reference as if fully set forth. 15N$_2$O production rates were calculated from the linear change in $^{15}N_2$ concentrations in the vial headspace between two given time points.

EXAMPLE 13

Change in Fe and N Species Under Different Operational Conditions

Figure 1B:
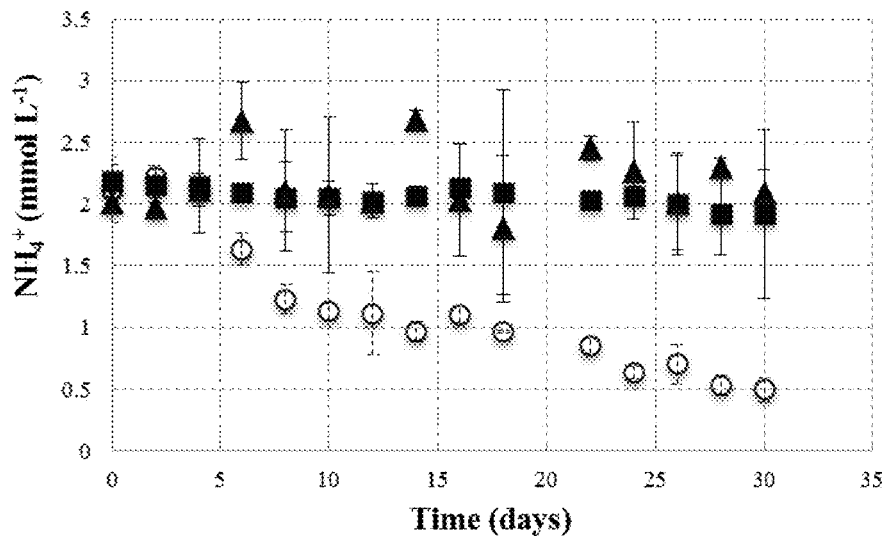
Figure 2A:
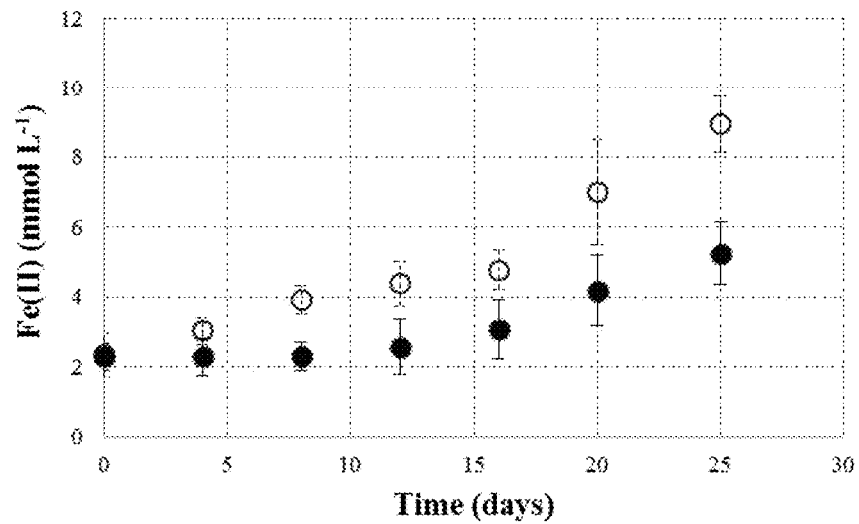
FIGS. 2A-2B illustrate concentration of Fe(II) (FIG. 2A) and $NH_4^+$ (FIG. 2B) in 25-day incubation with $NH_4Cl$ and ferrihydrite (open circle), $NH_4Cl$ and goethite (closed circle).
Figure 2B:
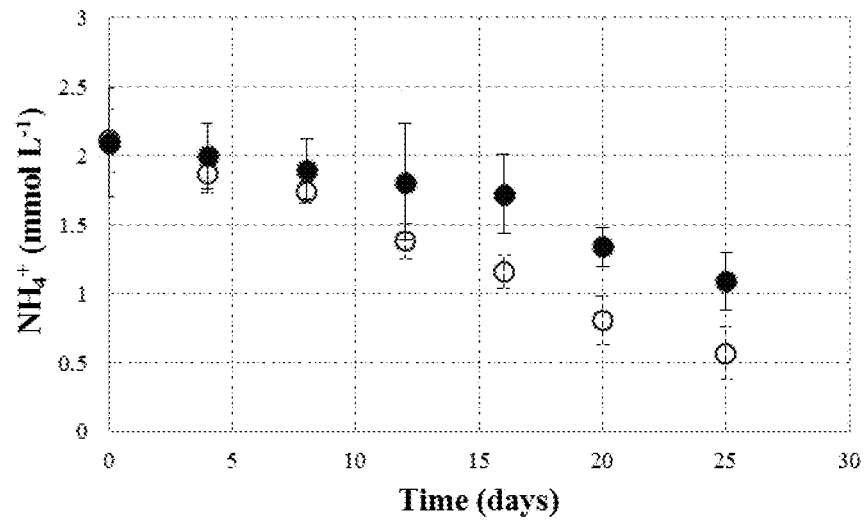
Figure 3A:
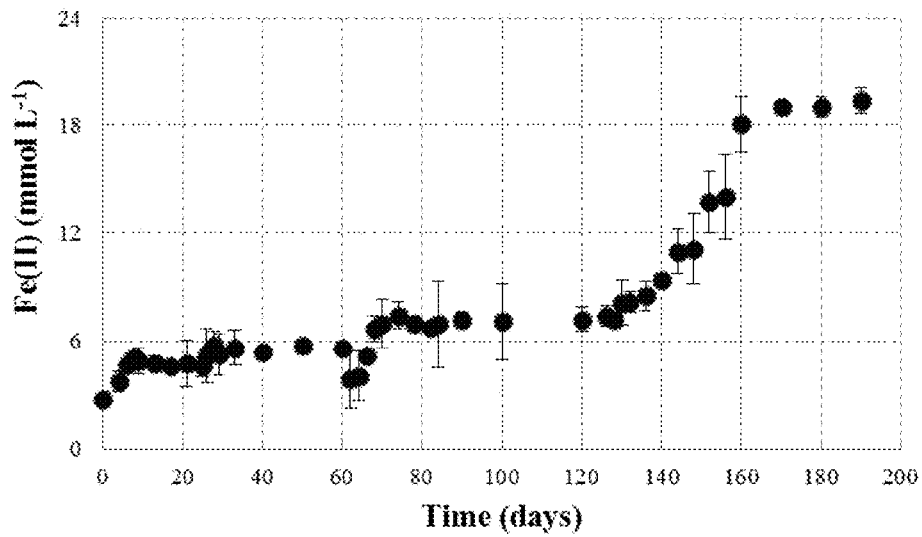
FIGS. 3A-3B illustrate concentration of Fe(II) (FIG. 3A) and $NH_4^+$ (FIG. 3B) during the 180 day incubation.
Figure 3B:
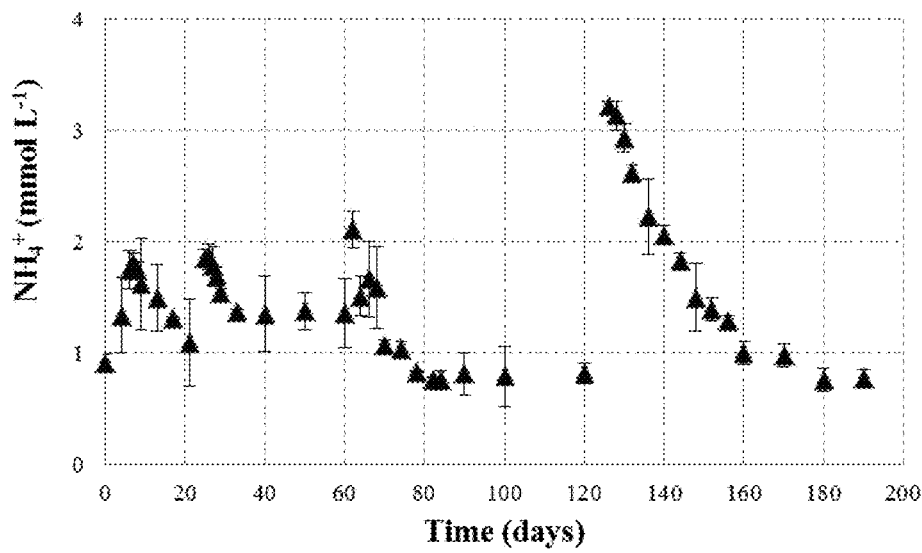
Figure 4A:
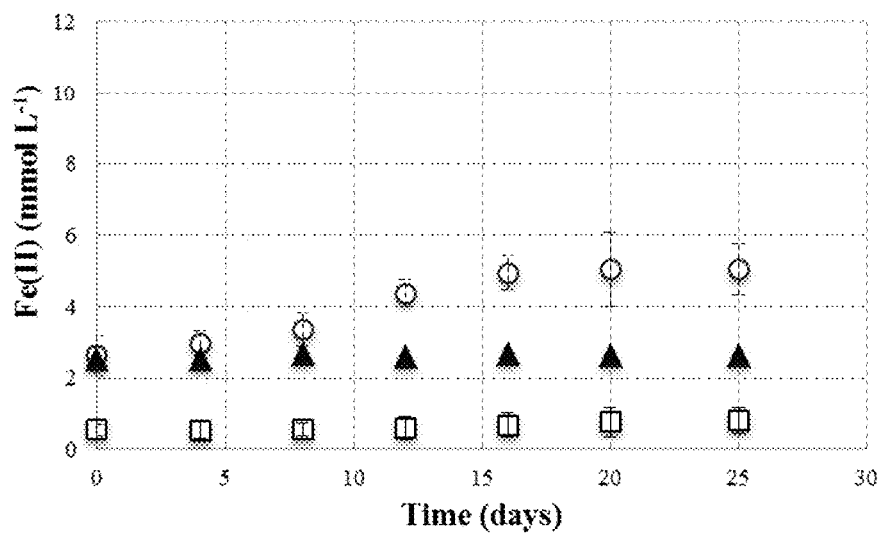
FIGS. 4A-4B illustrate concentration of Fe(II) (FIG. 4A) and $NH_4^+$ (FIG. 4B) in 25-day incubations in samples with $NH_4Cl$ (open square), ferrihydrite (open circle), sterilized soil with $NH_4Cl$ and ferrihydrite (closed triangle).
Figure 4B:
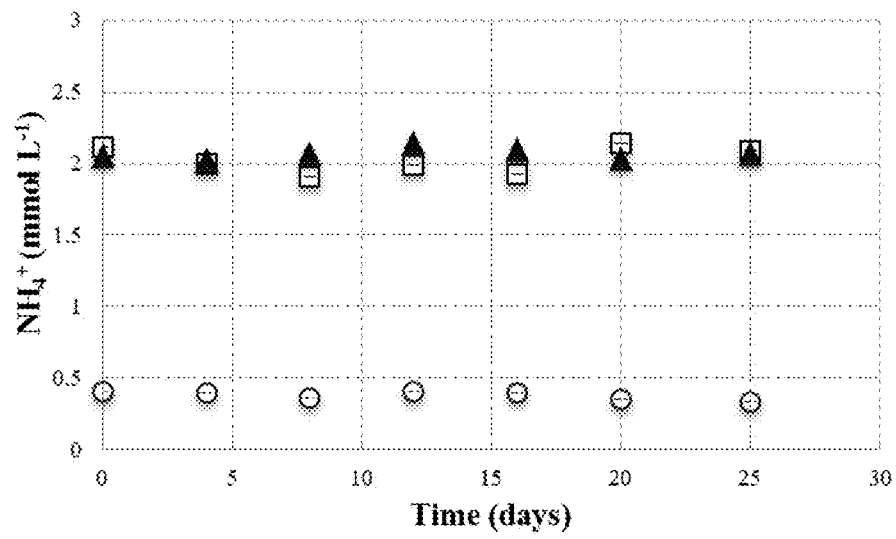

Batch incubation experiments were conducted. Batches included soil slurry included with three different Fe(III) sources. FIGS. 1A-1B illustrate concentration of Fe(II) (FIG. 1A) and $NH_4^+$ (FIG. 1B) in incubation with three different Fe(III) sources: ferrihydrite (open circle), ferric chloride (closed square), and ferric citrate (closed triangle). Referring to these figures, the values represent the mean and standard error (n=3). After incubating the pre-treated soil slurry with the three different Fe(III) sources for 30 days, only samples to which either ferrihydrite or goethite had been added showed measurable $NH_4^+$ oxidation. Referring to FIGS. 1A-1B, in samples incubated with ferric citrate and $NH_4Cl$, Fe(III) reduction was much faster than in those supplied with Fe(III) oxides, but the $NH_4^+$ concentration remained fairly constant. FIGS. 2A-2B illustrate concentration of Fe(II) (FIG. 2A) and $NH_4^+$ (FIG. 2B) in 25-day incubation with $NH_4Cl$ and ferrihydrite (open circle), $NH_4Cl$ and goethite (closed circle). The values represent the mean and standard error (n=3). FIGS. 3A-3B illustrate concentration of Fe(II) (FIG. 3A) and $NH_4^+$ (FIG. 3B) during the 180 day incubation. 25 mmol $L^{-1}$ Fe(III) was added on day 0. 1.0 mmol $L^{-1}$ $NH_4^+$ was added on days 4, 24, and 60. 0.2 mmol $L^{-1}$ NaHCO$_3$ was added on day 50 and day 90. 1.2 mmol $L^{-1}$+2 mmol $L^{-1}$ of $NH_4Cl$ were added on day 125. The values represent the mean and standard error (n=3). FIGS. 4A-4B illustrate concentration of Fe(II) (FIG. 4A) and $NH_4^+$(FIG. 4B) in 25-day incubations in samples with $NH_4Cl$ (open square), ferrihydrite (open circle), sterilized soil with $NH_4Cl$ and ferrihydrite (closed triangle). Referring to these figures, the values represent the mean and standard error (n=3). Still referring to FIGS. 4A-4B, no detectable Fe(II) reduction or $NH_4^+$ oxidation was found in the sterilized soils amended with ferrihydrite and $NH_4Cl$. Referring to FIGS. 2A-2B, faster iron reduction and $NH_4^+$ removal was observed in ferrihydrite than in goethite-amended sediments.

Figure 9:
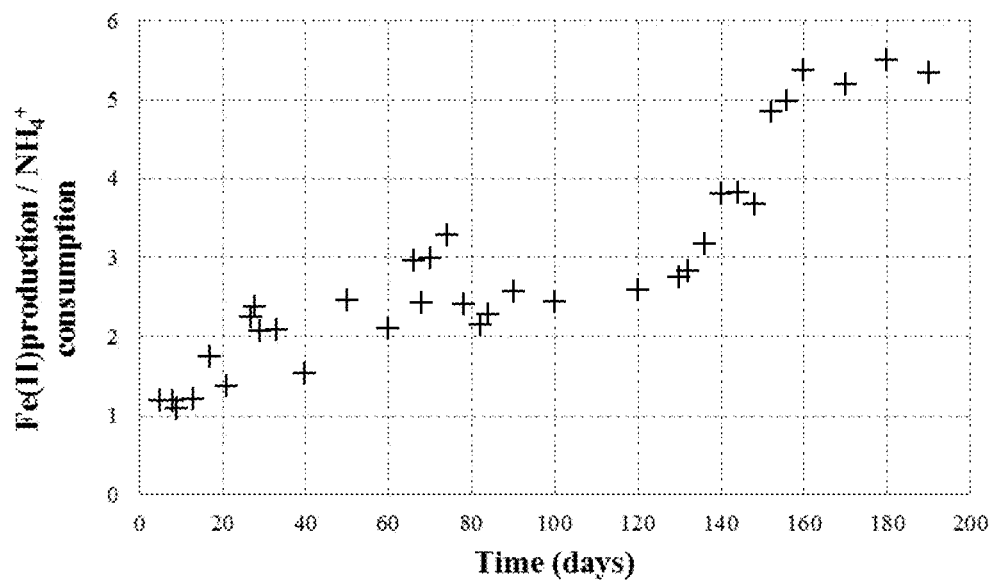
FIG. 9 illustrates stoichiometry between the Fe(II) production and NH$_4^+$ consumption during 180 day incubation.

Since samples incubated with ferrihydrite and $NH_4Cl$ resulted in the fastest $NH_4^+$ oxidation, the anaerobic incubation with ferrihydrite was extended to 180 days. Ferrihydrite as the Fe(III) source results in a larger negative AG value than goethite. The $NH_4^+$ oxidation rate increased as $NH_4Cl$ was supplied repeatedly, especially after 125 days of incubation when the NaHCO$_3$ additions were increased from 0.20 to 1.20 mmol $L^{-1}$ in addition to the 2.00 mmol $L^{-1}$ $NH_4^+$ added. Referring to FIGS. 4A-4B, the increased NaHCO$_3$ dosing also increased the generation of Fe(II). FIG. 9 illustrates stoichiometry between the Fe(II) production and $NH_4^+$ consumption during 180 day incubation. Referring to FIG. 9, 25 mmol $L^{-1}$ Fe(III) was added on day 0; 1.0 mmol $L^{-1}$ $NH_4^+$ was added on days 4, 24, and 60; 0.2 mmol $L^{-1}$ NaHCO$_3$ was added on day 50 and day 90 of the incubation. 1.20 mmol $L^{-1}$+2 mmol $L^{-1}$ of $NH_4Cl$ were added on day 125. The values represent the mean ratio (n=3). During the 180-day incubation, the ratio of Fe(II) produced to $NH_4^+$ removed gradually increased until it reached 5.3:1 by day 160 after which it remained stable.

Figure 5A:
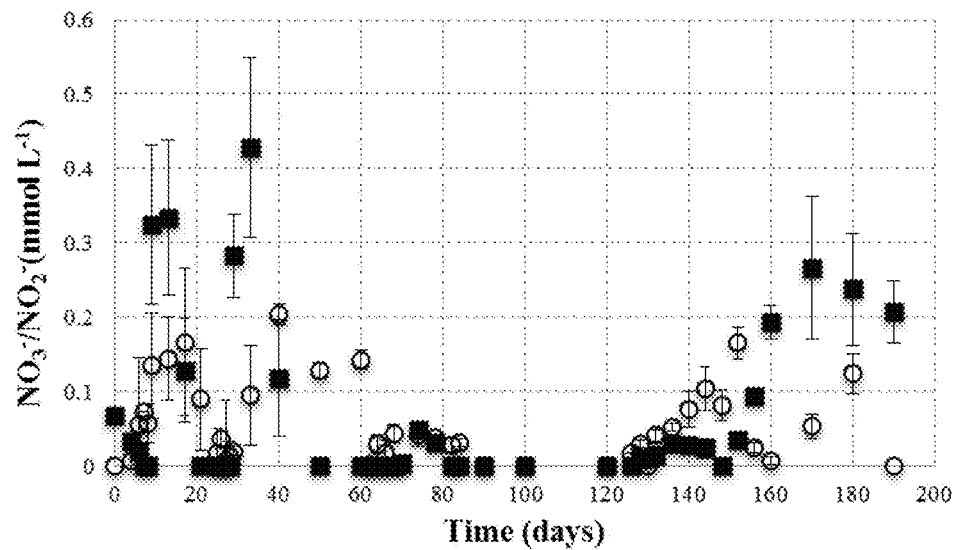
FIGS. 5A-5B illustrate concentration of $NO_3^-$ (open circle) and $NO_2^-$ (closed square) (FIG. 5A) and DOC (open triangle) and TN (open square) (FIG. 5B) during the 180 day incubation.
Figure 5B:
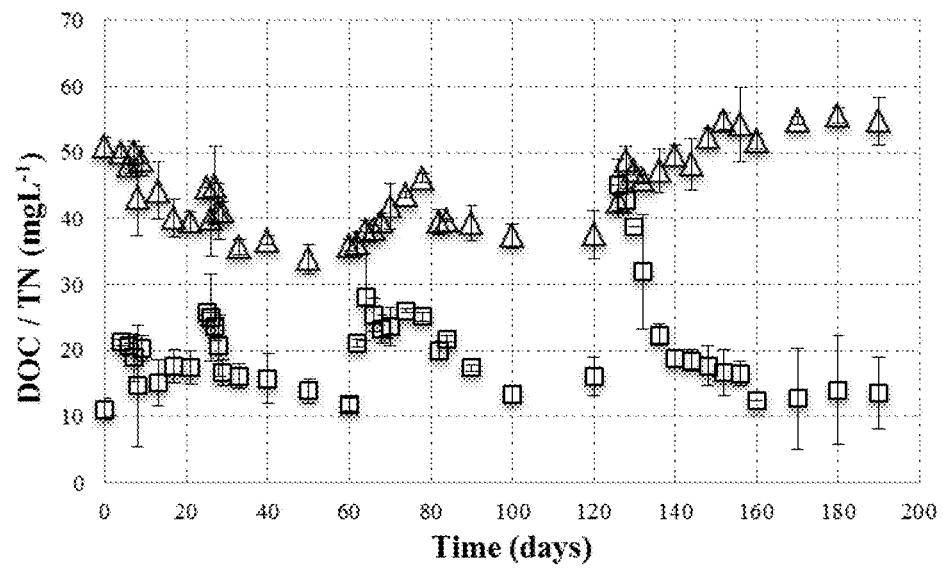

FIGS. 5A-5B illustrate concentration of $NO_{3-}$ (open circle) and $NO_2^-$ (closed square) (FIG. 5A) and DOC (open triangle) and TN (open square) (FIG. 5B) during the 180 day incubation. Referring to these figures, 25 mmol $L^{-1}$ Fe(III) was added on day 0. 1.0 mmol $L^{-1}$ $NH_4^+$ was added on days 4, 24, and 60. 0.2 mmol $L^{-1}$ NaHCO$_3$ was added on day 50 and day 90 of the incubation; 1.20 mmol $L^{-1}$+2 mmol $L^{-1}$ of $NH_4Cl$ were added on day 125. The values represent the mean and standard error (n=3).

Referring to FIGS. 5A-5B, $NO_2^-$ appeared within a few days after the addition of $NH_4^+$, with a maximum concentration 0.44±0.17 mmol $L^{-1}$ in the second $NH_4^+$ oxidation cycle. Referring to FIG. 5A, $NO_2^-$ did not accumulate in the system and was immediately consumed after generation. Referring to FIGS. 5A-5B, $NO_3^-$ production showed a similar pattern to that of $NO_2^-$ (FIG. 5A), and TN loss similar to the decrease in $NH_{4+}$ (FIG. 5B). During 180 days of incubation, the system experienced a loss of TN of 57.2±3.13 mg $L^{-1}$. Referring to FIG. 5B, the DOC content fluctuated slightly in the early stage of incubation, but overall, the DOC concentration was relatively stable at around 45~50 mg $L^{-1}$.

A 64.5% $NH_4^+$ removal, between inflow and outflow was achieved in the membrane reactor after 150-days of operation.

EXAMPLE 14

Phylogenetic Analysis of the Microbial Community Based on 16S rRNA Gene

Figure 6:
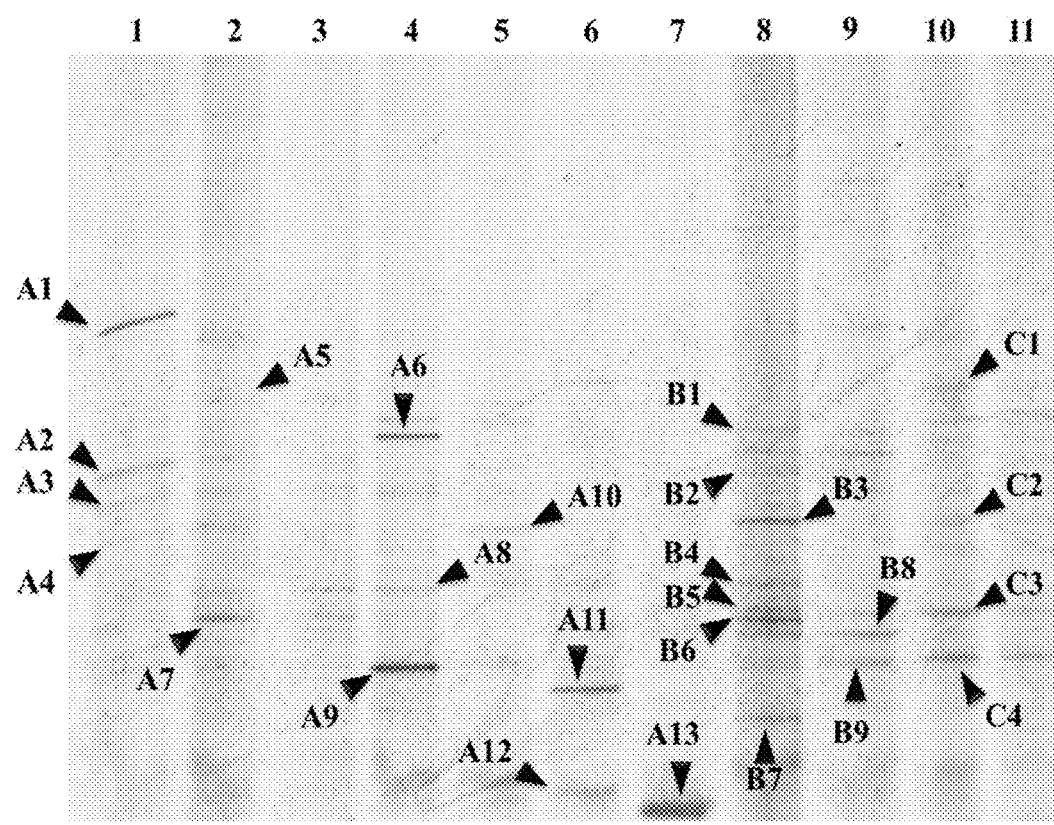
FIG. 6 illustrates comparison of DGGE analysis profiles of soil communities during anaerobic incubations.

FIG. 6 illustrates comparison of denaturing gradient gel electrophoresis (DGGE) analysis profiles of soil communities during anaerobic incubations. Samples from 0, 30, 90 and 160 days of incubation with ferrihydrite+$NH_4Cl$+NaHCO$_3$ (lane 1-4); 160 days of incubation with only ferrihydrite (lane 5); ferric chloride+$NH_4Cl$ (lane 6); ferric citrate+$NH_4Cl$ (lane 7); 120 days incubation with ferrihydrite+$NH_4Cl$+NaHCO$_3$+organic carbon (band 8); ferrihydrite+$NH_4Cl$+organic carbon (lane 9). Still referring to FIG.

6, samples from 6 and 1.20 days of incubation without any addition (lanes 10 and 11) were used as controls.

Still referring to FIG. 6, all visible bands observed in the DGGE analysis (significant bands were marked) were excised from the gel and sequenced after cloning. Clone libraries from 12 samples resulted in 721 sequences of partial 16S rRNA gene fragments, and six groups of bacteria were classified via a phylogenetic analysis. During this 180-day anaerobic incubation with ferrihydrite and NH$_4$Cl, the microbial communities shifted dramatically and the microbial diversity decreased with time. See FIG. 6, lanes 1-4. Some DGGE bands disappeared gradually with time, such as band A5 and band A7. Band A5, represents a dissimilatory iron-reducing bacteria, *Geobacter* sp., which existed in this Fe(II)-rich wetland soil and reappeared for a short time during the initial anaerobic incubation. Band A7, represents an ammonia-oxidizing bacterium, *Nitrosomonas* sp., which showed a strong presence in the samples at 30 days of incubation and was attenuated after longer incubation times. In contrast, DGGE bands A6, A8 and A9 became more significant as the incubation time increased, showing that there were three groups of bacteria dominating in the system after 160 days of incubation. Band A6 represents a group of bacteria belonging to the Acidimicrobiaceae family. Bacteria from the Acidobacteriaceae family are represented by band A8. Some species in this family have been described as iron reducers and obligate heterotrophs (Kishimoto et al, 1991 Water Res 41: 2996-3004; Rowe et al., 2007 Environ Microbiol 9:1761-1771; Coupland and Johnson, 2008 FEMS Microbiol Lett 279:30-35). DGGE band A9 represents bacteria of the Rhodocyclaceae family. This family contains mainly denitrifying bacteria, which exhibit very versatile metabolic capabilities (Smith et al, 2005 Water Res 39: 2014-2023; Huang et al., 2011 Biogeosciences 8: 5251-5280).

Microbial communities also differed between samples incubated with various Fe(III) sources, and between samples with or without the addition of inorganic carbon. Samples supplied with either ferric chloride or ferric citrate as the Fe(III) source plus NH$_4^+$, and samples supplied with just ferrihydrite and no NH$_4^+$, had a decreased diversity in their bacterial communities. See FIG. 6, lanes 5-7. Samples supplied with both organic carbon (1.00 mmol L$^{-1}$ sodium citrate) and inorganic carbon (1.20 mmol L$^{-1}$ NaHCO$_3$) had a higher bacterial diversity. See FIG. 6, lane 8.

Changes in the microbial community after 180 days of incubation were also confirmed via 454-pyrosequencing, and the obvious growth of Actinobacteria, Acidobacteria and β-Proteobacteria groups (which band A6, A8 and A9 belong to) was consistent with the DGGE results, where the Actinobacteria cell number increased the most. Planctomycetes phylum, with which anammox bacteria are affiliated, was detected in the first 90 days of incubation, but disappeared or was below detection on day 160. Actinobacteria were also the dominant species in the Feammox enrichment reactor based on the results of the 168 rDNA library obtained via pyrosequencing.

The Acidimicrobiaceae bacterium, represented by band A6, which belongs to the Actinobacteria phylum, was the dominant species in the incubation experiments after 180 days of incubation (14.8% in total 16S rRNA gene sequences) as well as in the membrane reactor after 150 days of operation (40.2% in total 168 rRNA gene sequences). Its similarity to other Acidimicrobiaceae-related sequences was shown using a phylogenetic tree. The tree was constructed using the Bayesian inference (BI) method with 16S rRNA gene sequences from DGGE band A6 and bacteria from the Acidimicrobiaceae family from other studies. Unlike the bacteria represented by band A8 and A9, which were also found in samples that did not show Feammox transformations, this Acidimicrobiaceae bacterium was only detected in incubations (or reactor) that were augmented simultaneously with ferrihydrite, NH$_4$Cl, and NaHCO$_3$ and have shown Feammox activity.

EXAMPLE 15

Figure 7:
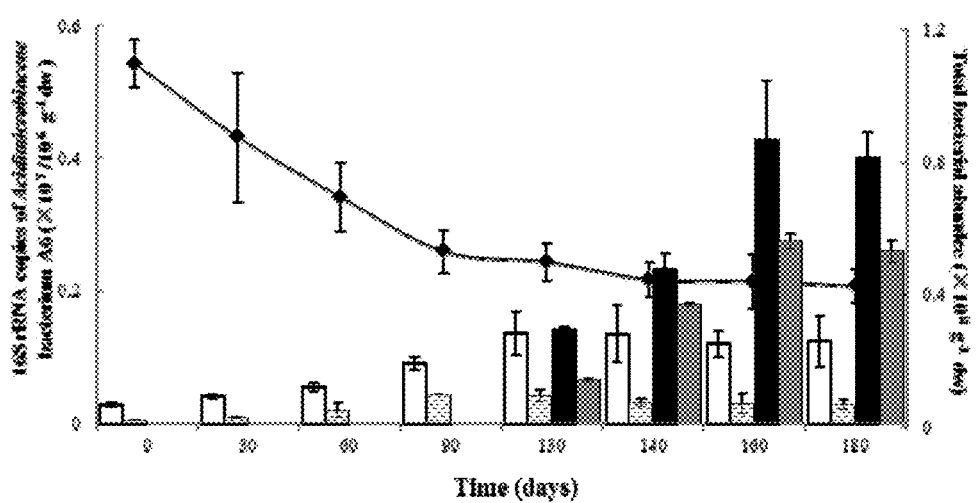
FIG. 7 illustrates abundance of total bacteria (closed rhombus) during 180 days of anaerobic incubation, 16S rRNA gene (black bars) and RNA copy numbers (gray bars) of Acidimicrobiaceae bacterium A6 in soil samples with 1.20 mmol L$^{-1}$ NaHCO$_3$ addition, 16S rRNA gene (white bars) and RNA copy numbers (dotted bars) of bacterium A6 with 0.20 mmol L$^{-1}$ NaHCO$_3$ addition.

Changes of Bacterial Abundance and Activity During Incubations and in the Reactor The total bacterial abundance determined via the 16S rRNA gene copy number, decreased during the 180-day incubation. FIG. 7 illustrates abundance of total bacteria (closed rhombus) during 180 days of anaerobic incubation. 16S rRNA gene (black bars) and RNA copy numbers (gray bars) of Acidimicrobiaceae bacterium A6 in soil samples with 1.20 mmol L$^{-1}$ NaHCO$_3$ addition. 16S rRNA gene (white bars) and RNA copy numbers (dotted bars) of bacterium A6 with 0.20 mmol L$^{-1}$ NaHCO$_3$ addition. Referring to FIG. 7, both, 16S rRNA gene and rRNA fragment copies of Acidimicrobiaceae bacteria (DGGE band A6) increased during the incubation, particularly after 90 days. Still referring to FIG. 7, the rRNA numbers increased slowly during the first 3 months and doubled between day 130 and day 140 of the incubation period. rRNA as a biomarker for changes of protein level, even though not as specific as mRNA, is a good indicator for bacterial activity (Poulsen et al., 1993 Appl Environ Microbiol 59: 1354-1360; Park et al., 2010 Environ Sci Technol 44: 6110-6116), both of which are incorporated by reference herein as if fully set forth. Increase in the denitrifier activity was most likely stimulated by the NO$_2^-$ generated via Feammox. The number of the amoA gene, representing the abundance of ammonia-oxidizing bacteria, decreased sharply with time and was hardly detected after 90 days of incubation. Through quantification of thaumarchaeal amoA genes, none of the acidophilic ammonia oxidizers were detected in the system.

In the Feammox reactor, the copy number of Acidimicrobiaceae bacterium A6, Anammox bacteria and nirS gene were 0.37×10$^7$, 0.13×10$^6$, and 0.92×10$^6$ copies g$^{-1}$ dw, respectively, while the amoA gene was not detected.

EXAMPLE 16

Changes of Bacterial Abundance and Activities with NaHCO$_3$ Amendment

Abundance and activity of Acidimicrobiaceae bacteria, represented by band A6, were compared between samples incubated under the same conditions except the amounts of NaHCO$_3$ added (0.20 mmol L$^{-1}$ vs. 1.20 mmol L$^{-1}$). From day 125 to day 180 of the incubation, both 16S rRNA gene and rRNA fragment numbers of Acidimicrobiaceae bacteria were higher in the soils with the higher inorganic carbon content. Referring to FIG. 7, the 16S rRNA gene copies of samples augmented with 1.20 mmol L$^{-1}$ NaHCO$_3$ were four times higher than those in samples that had been augmented with only 0.20 mmol L$^{-1}$ NaHCO$_3$. The rRNA copies of the Acidimicrobiaceae bacteria, showed even larger differences in response to the amounts of NaHCO$_3$ added. In the samples augmented with 1.20 mmol L$^{-1}$ NaHCO$_3$, the rRNA copy number increased from 0.04±0.06×10$^6$ to 0.19±0.09×10$^6$ copies g$^{-1}$ dw over 50 days of incubation (day 130 to day 180). Still referring to FIG. 7, however, in the samples to which only 0.2 mmol $L^{-1}$ $NaHCO_3$ were added on day 125, the rRNA number gradually deceased from $0.29\pm0.10\times10^5$ to $0.19\pm0.05\times10^6$ copies $g^{-1}$ dw during the same 50 days incubation.

EXAMPLE 17

Figure 8A:
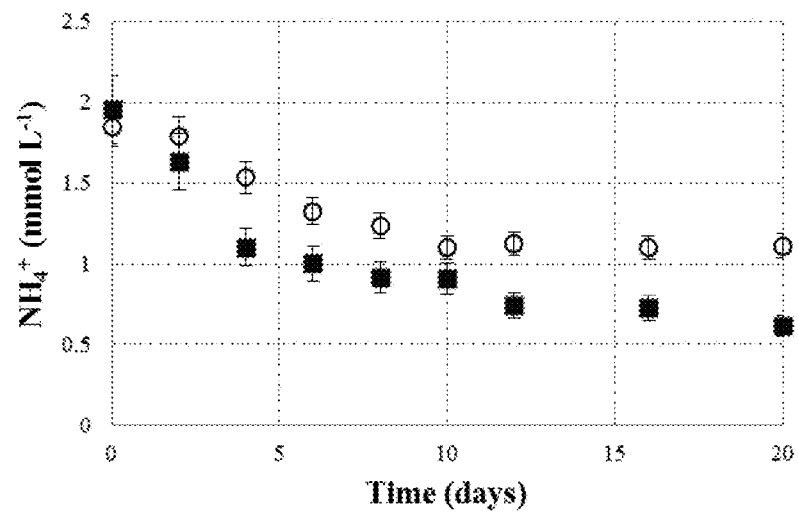
FIGS. 8A-8D illustrate concentration of NH$_4^+$ (FIG. 8A), NO$_2^-$ (FIG. 8B), NO$_3^-$ (FIG. 8C), and N$_2$O (FIG. 8D) in the samples incubated with (open circle) or without (closed square) C$_2$H$_2$.
Figure 8B:
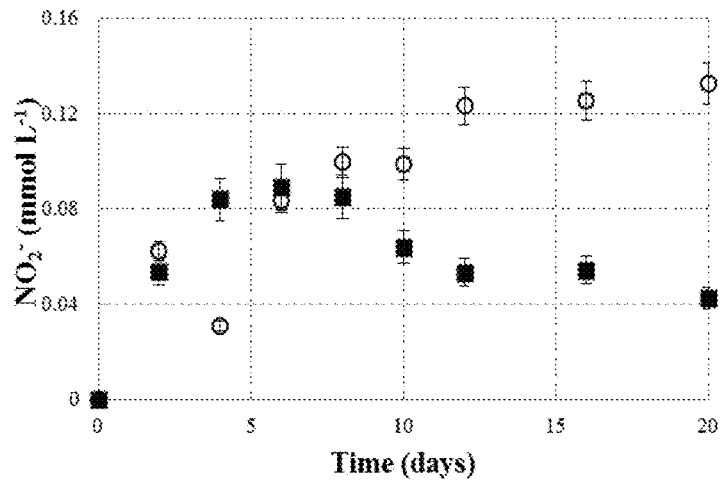
Figure 8C:
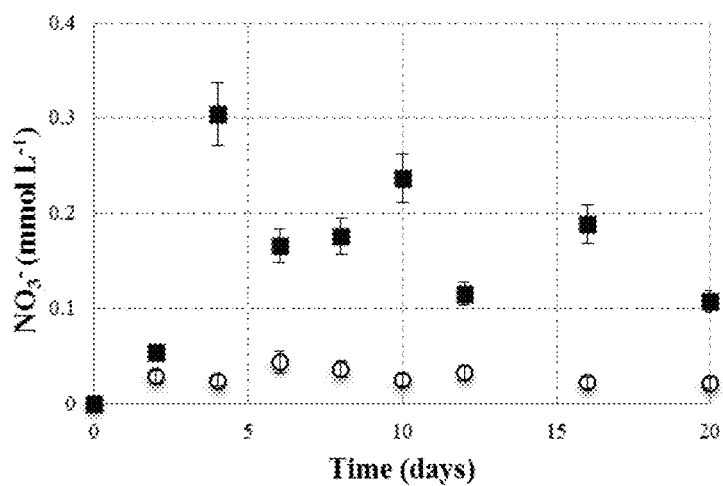
Figure 8D:
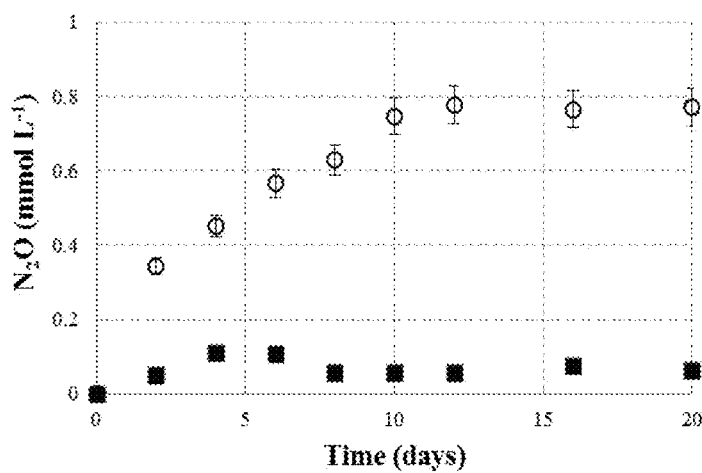

Nitrogen Species Changes in Samples Incubated in the Presence of $C_2H_2$ $C_2H_2$ can inhibit the oxidation of $NH_4^+$ to $NO_2^-$ under aerobic conditions, and the reduction of $N_2O$ to $N_2$ as well as the anammox pathway under anaerobic conditions (Yoshinari et al., 1977 Soil Biol Biochem 9: 177-183; Jensen et al., 2007 FEMS Microbiol Ecol 26: 17-26; Kartal et al., 2011 Nature 479:127-130, all of which are incorporated by reference herein as if fully set forth). To gain further insights into the nitrogen removal process observed, incubations with $C_2H_2$ were conducted. FIGS. 8A-8D illustrate concentration of $NH_4^+$ (FIG. 8A), $NO_2^-$ (FIG. 8B), $NO_3^-$ (FIG. 8C), and $N_2O$ (FIG. 8D) in the samples incubated with (open circle) or without (closed square) $C_2H_2$. The values represent the mean and standard error (n=3). After 20 days of incubation, less $NH_4^+$ was oxidized in the samples amended with $C_2H_2$, compared to those incubated without $C_2H_2$. Referring to FIG. 8A, $NO_2^-$, which is postulated to be the direct product of the $NH_4^+$ oxidation, accumulated slowly in samples incubated with $C_2H_2$. Referring to FIG. 8B, $NO_3^-$ reached a higher concentration in samples without $C_2H_2$ than in samples incubated with $C_2H_2$. Referring to FIG. 8C, $N_2O$, a product of $NO_2^-$ reduction, accumulated in samples incubated with $C_2H_2$, which inhibits the reduction of $N_2O$ to $N_2$. Fe(II) production was not much affected by the presence of $C_2H_2$, and after 20 days incubation was $4.36\pm0.72$ and $5.71\pm0.67$ mmol $L^{-1}$ in sample incubated with and without $C_2H_2$, respectively.

In $^{15}N$ isotope tracer incubations, detectable $^{15}N$—$N_2O$ was only found in samples amended with both, $^{15}NH_4Cl$ and Fe(III), with $^{15}N$—$N_2O$ production rates $2.14\pm0.059$ or $0.072\pm0.023$ µg $g^{-1}$ $d^{-1}$ in samples incubated with or without $C_2H_2$ treatment.

Referring to FIG. 6, DGGE band A5 represents dissimilatory iron-reducing bacteria, which appeared for a short time at the beginning of the anaerobic incubation. For longer incubation times these heterotrophic bacteria decreased rapidly. Referring to FIG. 2A and FIG. 4A, over a 25 day incubation period, more than three times the mass of Fe(II) was produced in samples amended with ferrihydrite and $NH_4^+$ as compared to the samples amended only with ferrihydrite, indicating that most of the Fe(III) reduction came from the Feammox reaction, and not from dissimilatory Fe(III) reduction.

Referring to FIG. 6, AOB represented by DGGE band A7, as well as the amoA gene, decreased after 30 days of incubation. Also, no AOA or acidophilic ammonia oxidizers were detected although the pH condition seems suitable for them in these incubations. Oxygen deficiency was the most likely reason for the decline in AOB in this system over time (Laanbroek et al., 1994 rch Microbiol 161:156-162). Referring to FIGS. 4A-4B, even though a small amount of AOB would be enough for $NH_4^+$ oxidation, in control samples to which no Fe(III) was added, and which AOB do not require, no $NH_4^+$ consumption was detected. Moreover, the decrease in amoA gene at a time of increasing $NH_4^+$ oxidation also indicates that neither AOB nor acidophilic ammonia oxidizers were the drivers of the $NH_4^+$ oxidation in the later incubation times.

An uncultured Acidimicrobiaceae bacterium became the dominant species during the 180-day anaerobic incubation period, increasing from 0.92% on day 0 in terms of cell numbers to 14.8% on day 160. Referring to FIGS. 1A-1B, FIGS. 2A-2B, and FIG. 6, in the incubation experiments conducted (which included controls with only $NH_4^+$, only iron, autoclaved, and various Fe(III) sources), this Acidimicrobiaceae bacterium was only detected and growing in samples to which $NH_4^+$ was supplied as an electron donor, ferrihydrite was supplied as electron acceptor, and $NaHCO_3$ was supplied as a carbon source. The abundance and activity of this Acidimicrobiaceae bacterium increased along with the Feammox activity during the incubations. Referring to FIG. 7, during the incubation period its rRNA changed from $(0.22\pm0.01)\times10^5$ copies $g^{-1}$ dw to $(0.28\pm0.07)\times10^6$ copies $g^{-1}$ dw, indicating a substantial increase in its activity. In the continuous flow membrane reactor, which had a high $NH_4^+$ removal and Fe(III) reduction rate, this Acidimicrobiaceae bacterium was enriched from an initial 14.8% to 40.2% after 150 days operation, and no other known $NH_4^+$ oxidizers (AOB or anammox) were detected. These results indicated that this Acidimicrobiaceae bacterium might play an important role in the Feammox reactions described in this study. According to a phylogenetic analysis, this bacterium has a 92% identity with *Ferrimicrobium acidiphilum* sp. *F. acidiphilum*, which belongs to the Acidimicrobiaceae family, and was first isolated from mine environments, and *F. acidiphilum* strain T23 is the only pure strain with a comprehensive characterization. Uncultured *Ferrimicrobium* sp. has been detected in mine water, but so far not in wetland soils. *Ferrimicrobium* sp. is an acidophilic heterotrophic ferrous iron oxidizing bacterium, which can also reduce Fe(III) under anoxic conditions (Johnson et al., 2009). The uncultured Acidimicrobiaceae bacterium, also has a 90% identity with *Acidimicrobium ferrooxidans*, a facultative autotroph in the same family that can reduce Fe(III) in anaerobic environments while oxidizing sulfide to sulfur and exists widely in soil environments.

According to a phylogenetic comparison with similar clones from studies reported in the GenBank, and taking into account its special growth characteristics (stimulated by inorganic carbon, oxidizing $NH_4^+$ coupled to Fe(III) reduction), also its gradual activity increase with increased Feammox activity, as well as a strong link with a Feammox enrichment reactor, this uncultured Acidimicrobiaceae bacterium A6 is probably a previously unreported species in the Acidimicrobiaceae family that might be either responsible or play a key role in the Feammox process described here. Referring to FIGS. 3A-3B and FIG. 7, Acidimicrobiaceae bacterium A6 was more active and the Feammox pathway was faster in samples with higher $NaHCO_3$ amendments, which, in addition to the fact that ΔG in Equation 1 is negative, indicates that if this Acidimicrobiaceae bacterium is actually responsible for conducting the Feammox reaction as depicted in equation 1, it may be an autotroph. Growth of nirS gene suggested that denitrification pathways were also active in the incubations described here. $NO_2^-$ that was being produced during the anaerobic $NH_4^+$ oxidation was reduced to $N_2$ by denitrifiers, and $N_2^-$ did not accumulate in the system.

Referring to FIGS. 1A-1B and FIGS. 2A-2B, the Feammox reaction studied here proceeded only when iron oxides (ferrihydrite or goethite) were supplied as electron acceptor, whereas samples incubated with ferric chloride or ferric citrate as the Fe(III) source showed no measurable $NH_4^+$ oxidation. In the incubations to which ferric citrate was added as the Fe(III) source, Fe(III) was reduced rapidly by dissimilatory iron reducers, using organic carbon as electron donor. Referring to FIG. 6, the DGGE results for incubations with ferric citrate (lane 7) show that the most dominant species was an Actinobacterium, known to reduce iron under anaerobic conditions. Acidimicrobiaceae bacterium A6 was not detected in these incubations. Since acidic conditions as well as minimal dissolved Fe(II) and $NO_2^-$ concentrations are required to make the Feammox reaction energetically favorable as shown in Equation 1, the presence of iron oxides as the main Fe(III) source may have helped to maintain the concentrations of Fe(II) in solution below the detection limit through the incubation since iron oxides can sorb Fe(II) and/or incorporate it into their structure.

Various $NH_4^+$ oxidation products, i.e. $NO_3^-$, $NO_2^-$ and $N_2$, generated through the Feammox process are thermodynamically feasible, and were reported in different Feammox studies (Sawayama, 2006; Shrestha et al., 2009; Yang et al., 2012, which are incorporated by reference herein as if fully set forth). Because there was no initial nitrate or nitrite in the system, because all experiments were conducted under strict oxygen free conditions, and because of the rapid decrease of amoA genes, neither $NO_3^-$ reduction nor aerobic $NH_4^+$ oxidation could be the reason for the formation of $NO_2^-$ during the incubations. In all incubations where $NH_4^+$ was removed, the production of $NO_2^-$ was observed, although $NO_2^-$ did not accumulate. Most of the $NO_2^-$ produced from the $NH_4^+$ oxidation was reduced rapidly by denitrifiers, which were present in the incubations.

When $C_2H_2$ was used to stop the reduction of $N_2O$ to $N_2$, the total $N_2O$ (0.72±0.23 mmol $L^{-1}$) plus $NO_2^-$ produced (0.13±0.07 mmol $L^{-1}$) was equal to the $NH_4^+$ consumed, showing that $NH_4^+$ was not oxidized directly to $N_2$ in the samples. $^{15}N$—$NH_4^+$ incubations, as an extension of $C_2H_2$ treatment, showed that $^{15}N$—$N_2O$ built up when $^{15}NH_4Cl$ was added as the $NH_4^+$ source, demonstrating that $NH_4^+$ was oxidized during the Feammox process rather than be adsorbed or taken uptake by microorganisms in the system.

Although nitrification might happen in suboxic environments (oxygen <5 μM, Lam et al., 2007), $NH_4^+$ oxidation in the presence of $C_2H_2$ has never been reported. $C_2H_2$ is an inhibitor of ammonia monooxygenase (AMO), and can restrain aerobic $NH_4^+$ oxidizers from using oxygen by binding covalently to AMO (Hynes and Knowles, 1982; Hyman and Wood, 1985; Gilch et al., 2009). $C_2H_2$ can also inhibit the $NH_4^+$ activation step of anammox cells, which use $NO_2^-$ as the oxidant (Kartal et al., 2011). Therefore these Feammox bacteria might differ from common $NH_4^+$ oxidizers, by using an alternative $NH_4^+$ oxidation pathway that is not inhibited by $C_2H_2$, and AMO might not play a role in Feammox. The fact that $NH_4^+$ oxidation was not affected by the presence of acetylene is a further indication that AOB are not responsible for this process since they would be affected by acetylene. Furthermore, in the isotope tracer incubations, $^{15}N$—$N_2O$ was below the detection limit in samples to which Fe(III) was not supplied, showing again that $NH_4^+$ oxidation proceeded only when iron was being reduced.

Referring to FIG. 9, the role of anammox during the incubations was also evaluated. During the incubations the ratio of $NH_4^+$ oxidized to Fe(III) reduced increased gradually from 1:1.9 to 1:5.3, which is close to the stoichiometry of 1:6, shown in Equation 1. Although the discrepancies in the Feammox stoichiometry between iron and $NH_4^+$ are attributed in part to incompletely Fe(II) extraction, the influence of anammox activity in the earlier incubations would have contributed to a lower Fe(II) produced to $NH_4^+$ removed ratio than the theoretical value of 1:6.

The Feammox reaction became more dominant in terms of $NH_4^+$ oxidation after 125 days of incubation due to a relative increase in the activity of the Feammox bacteria. A parallel pathway to Feammox, such as anammox, could as mentioned above, explain the lower stoichiometric ratio, especially at earlier incubation times. In the samples taken before the incubation, 0.1.7±0.05×10$^6$ copies g$^{-1}$ dw of anammox rRNA gene were found, which decreased to 0.09±0.06×10$^5$ on day 130. It was postulated that anammox was responsible for some initial $NH_4^+$ and $NO_2^-$ removal, and denitrification became more dominant for $NO_2^-$ removal later during the incubation period. $NH_4^+$ removal via Anammox in the early incubations may also explain why the observed $NH_4^+$ oxidation rates and the abundance of Acidimicrobiaceae A6 did not change proportionally over the full incubation period.

EXAMPLE 18

Influence of Environmental Factors on Feammox Pathway in Soil Environments

Sample collection. Soils for all the experiments described in this study were taken from a series of local wetland-, upland-, as well as storm-water detention pond-sediment at New Jersey and labeled according to the samples location as L, A, P, C, B, V and W. Three soil cores were collected from 0 cm to 20 cm soil from each sample location, and transported to the laboratory within 2 hours for further analysis.

Analysis of chemical properties. Physicochemical characteristic of these soils such as soil pH; Fe content [Fe (II) and Fe(II)]; nitrogen species ($NO_3^-$, $NO_2^-$ and $NH_4^+$); sulfate ($SO_4^{2-}$); phosphate ($PO_4^{3-}$); dissolve organic carbon (DOC) were determined. pH was measured immediately using a pH electrode. A 0.5N HCl extraction was conducted for 24 hour at room temperature to determine acid-extractable Fe(II) and $NH_4^+$ concentrations in the soils. Fe(II) was analyzed using the ferrozine assay method (39), and $NH_4^+$ was analyzed using a Dionex™ Ion Chromatograph (LC3000) with a CS-16 Column and a CS-16 guard column (flow rate=1.0 mL min$^{-1}$, detection limit=0.012 ppm). $NO_3^-$, $NO_2^-$, $SO_4^{2-}$ and $PO_4^{3-}$ concentrations were measured from anaerobic DI water extraction for 1 hour, via Ion Chromatography, using an AS-22 Column along with an AG-22 guard column (flow rate=1.2 mL min$^{-1}$ detection limit=0.016 ppm). For the DOC analyses a Shimadzu TOC-5000(A) was used.

Batch incubation. A series of incubation experiments were conducted. Soil samples from each location were divided into 12×10 g (air-dry equivalent) subsamples, and added into 50 mL serum vials, with 30 mL deionized water. The soil slurries were purged thoroughly with a $CO_2$:$N_2$ (80:20) mixture, and then incubated under anaerobic condition in glove box.

In the first incubation experiment, Feammox activities of each sample were checked. In day 0 to 15, no $NH_4^+$ or Fe(III) was added to the incubations. On day 16, samples were amended with 5 mmol·L$^{-1}$ $NH_4Cl$ and 30 mmol·L$^{-1}$ ferrihydrite, and continue incubated under anaerobic condition. On day 45, 2 mmol·L$^{-1}$ $NH_4Cl$ and 5 mmol·L$^{-1}$ ferrihydrite were added again after $NH_4^+$ was exhausted. Autoclaved sterilized soils were incubated as controls. Triplicate samples were collected from two vials every four days to analyze iron and nitrogen species.

The second incubation was conducted to check how pH and $NO_2^-$ concentration control Feammox reaction. For pH incubation, enrichment culture with Acidimicrobiaceae bacterium A6 were exposed to different pH gradients, pH=2, 4.5, 6.5, 8 (adjusted with HCl and NaOH). For $NO_2^-$ incubation, enrichment cultures were added with different concentration of $NO_2^-$ (0.02, 0.2, 1.0, 2.0 mmol·L$^{-1}$ as final concentrations). The initial concentrations of Ferrihydrite were 25 mmol·L$^{-1}$ and 2 mmol·L$^{-1}$ $NH_4^+$ was added. Triplicate samples were collected every two days to analyze iron, nitrogen species, and also the copy number of Acidimicrobiaceae bacterium A6.

DNA was Isolated as Described in Example 6.

QPCR was carried out for total bacteria, anammox bacteria and Acidimicrobiaceae bacteria, represented by 16S rRNA genes, using primer sets 1055f/1392r, Amx368f/Amx820r and acm342f1439r, respectively. (Harms et al. 2003; Schmid et al, 200, 2003 and Huang and Jaffe, 2013, all of which are incorporated by reference as if fully set forth) For the detection of denitrifiers, denitrifying functional genes (nirS) were quantified with primer sets NirS3/NirS5 (Braker et al., 1998, which is incorporated by reference herein as if fully set forth). Thermal cycling conditions for total 16S rDNA and nirS gene numbers were essentially as described in Example 7.

Statistical analysis. Correlations between the bacterial distributions vs. the environmental factors were analyzed with the canonical correspondence analysis (CCA) using R (22). Analyses of Spearman rank, multivariate and stepwise linear regressions of environmental and bacterial abundance variables were carried out using SPSS v12 on both raw and log-transformed data. All data were analyzed using one-way analysis of variance (ANOVA) with the significant level P<0.05.

It has been shown that anammox activity is optimal at a pH of 7.8-8.0 and temperatures between 28° C.-35° C. In anammox reactors, the DO concentration is usually maintained between 0.2 mg/L$^{-1}$ mg/L to allow for partial nitritation, which is required to achieve satisfactory $NH_4^+$ removal. In soils environments, anammox bacteria are usually present under slightly oxic conditions, which again, ensures that AOB are able to provide adequate $NO_2^-$ levels. Both AOB and anammox bacteria are autotrophic, therefore the organic carbon content in soils does not affect their $NH_4^+$ oxidation rate, except for Nitrosopumilis maritimus (an AOB species) which was reported to be inhibited by organic substrates even at very low concentrations.

AOB and anammox bacteria usually coexist in hypoxic environments, since AOB provide the $NO_2^-$ for the anammox reaction. Hence, Feammox bacteria, which also produce $NO_2^-$ while oxidizing $NH_4^+$, may enhance anammox in environments where AOB are not active. Batch incubations of soil samples at sites where Feammox activity was observed have shown that after $NH_4^+$ was oxidized to $NO_2^-$ by the Feammox process, nitrogen loss proceeded via denitrification and/or anammox. Since, as shown by equation 1, removal of $NO_2^-$ makes the reaction more favorable, the coexistence of Feammox with denitrifiers and/or anammox may be key for anaerobic ammonium oxidation in soil environments.

Therefore, influence of the different environment factors on the Feammox presence/activity in soil environments was investigated, the relationships between Feammox bacteria and other microorganisms responsible for nitrogen transformations in soils were determined.

Chemical properties of samples collected from different locations soil and sediment samples collected for this study cover a wide range of chemical properties: pH from 4.26 to 7.21; Fe(III) from 120 to 1243 mg kg$^{-1}$; Fe(II) from 7.92 to 356 mg kg$^{-1}$; $NH_4^+$ from 6.02 to 86.0 mg kg$^{-1}$; $NO_3^-$ from 6.71 to 274.8 mg kg$^{-1}$; $NO_2^-$ from 4.74 to 152.8 mg kg$^{-1}$; $SO_4^{2-}$ from 4.89 to 128.6 mg kg$^{-1}$; $PO_4^{3-}$ from 2.97 to 28.5 mg kg$^{-1}$; DOC from 9.37 to 28.09 g kg$^{-1}$.

Most of the soil and sediment samples selected for this study were acidic. pH value of surface soil samples (top 5 cm of soil,) was higher than that of soil below 10 cm. Concentrations of $NO_3^-$ and DOC were also higher in the surface soils. $NO_3^-$ were only showed in samples from 0 to 5 cm of soil, but hardly detected in soils collected from 10 to 20 cm in L7. On the contrary, $NO_2^-$ was found more rich below 10 cm than the upper soil samples in most of the locations.

All of these soil samples were iron rich, compared to the total iron levels usually reported for wetland soils (100 mg·kg$^{-1}$ to 620 mg·kg$^{-1}$) and sediment environments (30 to 120 mg·kg$^{-1}$). Fe(III) concentrations in vegetation-covered soil samples were obvious higher than the other samples. In additional, Fe(III) concentrations in soil collected from rhizosphere, were much higher than that from non-rooting zone at the same location. Fe (II) abundance shown a different trend, and was found negatively correlated (r=−0.61 p=0.001) with Fe(III) in the same sample locations.

Among these samples, samples originated from a forested riparian wetland area that was 0.5 km near some agricultural lands, have higher $NH_4^+$ and $PO_4^{3-}$ contents. The distribution of $SO_4^{2-}$ in samples of this study was similar to that of $NO_3^-$ between different sample locations but shown no obvious discrepancy with sample depth.

Feammox activity and abundance of Acidimicrobiaceae bacterium A6 Fe (II) production and $NH_4^+$ consumption were checked after two weeks anaerobic incubation to monitor the Feammox activity in different samples. After 15 days of anaerobic incubation without the addition of extra $NH_4^+$ and Fe(III), all samples showed clearly iron reduction, form 2.10 to 8.86 mmol·L$^{-1}$.

The existence and abundance of the Feammox Acidimicrobiaceae bacterium A6 in soil and sediment samples were determined via qPCR analysis. Abundance of Acidimicrobiaceae bacterium A6 in the field samples shown consistent with the anaerobic $NH_4^+$ consumption in incubations, and a positively correlation (r =0.58 p=0.012) were revealed between them.

Feammox activity in incubation with different pH and $NO_2^-$ concentrations. The Feammox reaction was most active in samples with pH 4.5. When pH increased or decreased, $NH_4^+$ oxidation and Fe reduction slow down, and Feammox reaction seem to stop at a pH 2.0 or 8.0. Abundance of Feammox Acidimicrobiaceae bacterium A6 increased after 14 days anaerobic incubation in samples with pH 2, 4.5, or 6.5 and slightly decreased in alkaline conditions. There was no significant difference between number of Acidimicrobiaceae bacterium A6 in samples incubated with pH 4.5 and 6.5, which is 2.37×10$^4$ and 2.41×10$^4$ copies mL$^{-1}$, respectively.

Feammox activity was sensitive to $NO_2^-$ concentration in the samples. Feammox reaction processed when $NO_2^-$ concentrations were 0.02 and 0.2 mmol·L$^{-1}$, but it was inhibited when $NO_2^-$ reached to 1.0 mmol·L$^{-1}$. Changes of Acidimicrobiaceae bacterium A6 abundance were consistent with Feammox activities with different concentration of $NO_2^-$ were added. In samples with 1.0 and 2.0 mmol·L$^{-1}$ $NO_2^-$ were added, the numbers of Acidimicrobiaceae bacterium A6 were decreased after incubation.

CCA Analysis of Feammox distributions in soil samples.

Figure 12A:
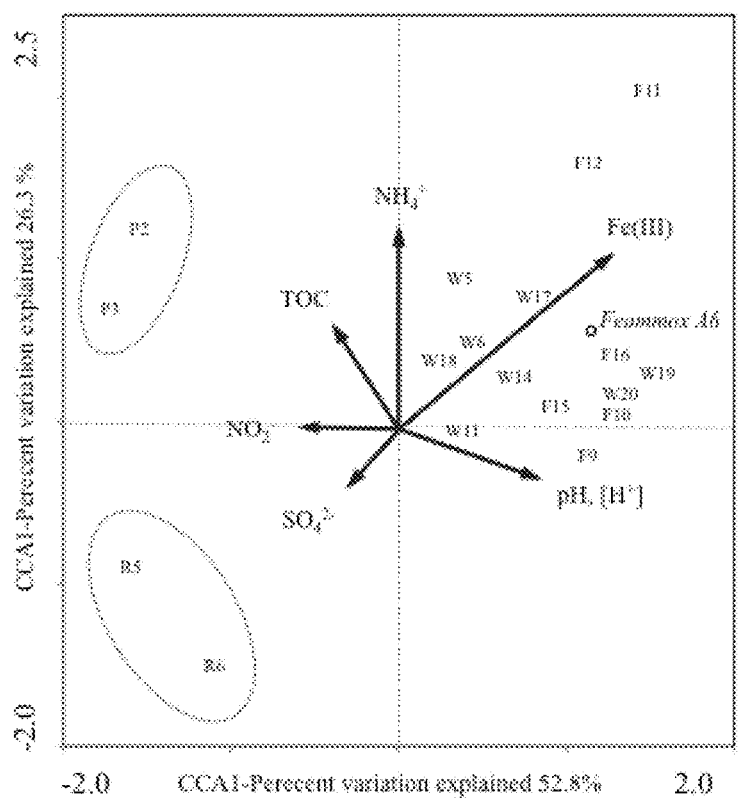
FIGS. 12A-12B illustrate ordination plots of the canonical correspondence analysis (CCA) for the first two dimensions of CCA of the relationship between the environmental factors and Feammox bacteria vs. environment factor of soil analysis and relation of Feammox to other bacterial communities affecting the nitrogen cycle.
Figure 12B:
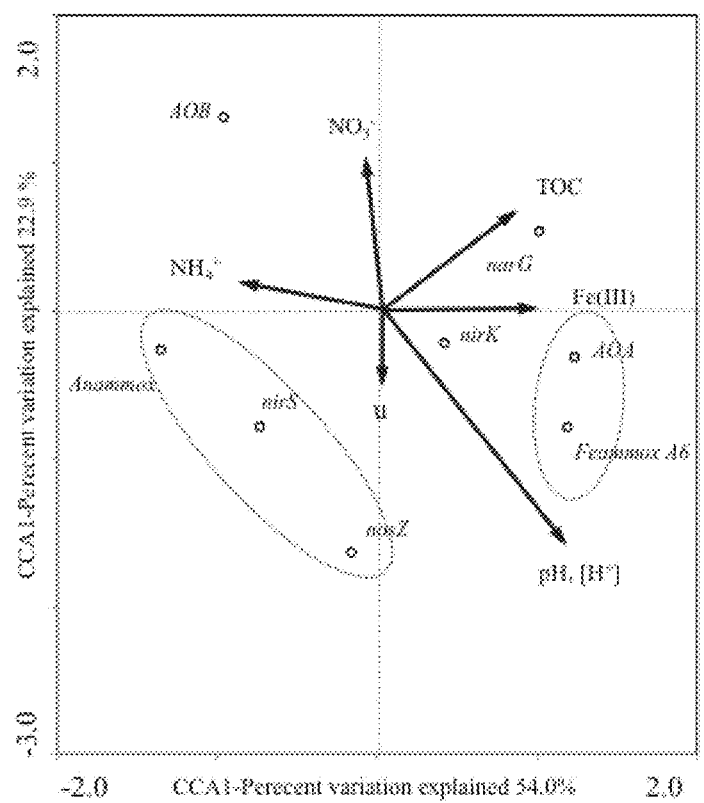

Soils for all the experiments described in this study were taken from three areas: New Jersey and South Carolina in United States, Guangdong province in China. A total of 52 locations were selected and cover 4 different types of soil samples, which are wetland soils (W), river sediments (R), forest soils (F), paddy soils (P). FIGS. 12A-12B illustrate ordination plots of the canonical correspondence analysis (CCA) for the first two dimensions of CCA of the relationship between the environmental factors and Feammox bacteria vs. environment factor of soil analysis and relation of Feammox to other bacterial communities affecting the nitrogen cycle. FIG. 12A illustrates the total variance in the bacterial abundance and the cumulative variance of the bacteria-environment relationship. FIG. 12B illustrates the total variance in the microbial composition and the cumulative variance of the bacteria-sampling location relationship.

Referring to FIG. 12A, the CCA analysis of Feammox bacteria and nitrogen microorganisms in response to environmental variables confirmed the influence shown in this figure. The first two CCA axes (CCA1 and CCA2) explained 73.2% of the total variance in the bacterial abundance and 80.6% of the cumulative variance of the bacteria-environment relationship. pH value ($p=0.030$) and Fe(III) content ($p=0.021$) had significant effects on the distributions of Acidimicrobiaceae bacterium A6, and $NO_2^-$ seemed to inhibit this bacteria by showing a negatively correlation. Concentrations of $NO_2^-$ were supporting anammox bacterial existence ($p=0.025$), and the combined effects of $SO_4^{2-}$ and $NO_2^-$ affects the distribution of nirS genes. $NH_4^+$ content was not limited for either Feammox or aerobic/anaerobic $NH_4^+$ oxidation bacteria. Referring to FIG. 12B, the first two CCA axes (CCA1 and CCA2) explained 71% of the total variance in the microbial composition and 81% of the cumulative variance of the bacteria-sampling location relationship. The CCA analysis showed that CCA1 represented the pH level of the soils. Referring to FIG. 12B, sample with Feammox activity assembled in a low pH area, while other soil samples distributed in the opposite pH area showed no Feammox reaction. CCA2 represents the vertical distributions of soil samples, soils collected from similar depth gathered together. More aerobic or anaerobic $NH_4^+$ oxidation bacteria were found in surface soil samples. It was observed that Feammox bacteria and denitrifiers tended to be active at depths below 10 cm of the soil environments.

EXAMPLE 19

Reduction of Uranium by Acidimicrobiaceae Bacteria A6 with Ferrihydrite as the Iron Source Acidimicrobiaceae bacteria A6 from a pure culture were prepared for uranium (U) bioreduction experiments. Twelve 15-mL vials of bacteria in their normal growth medium were centrifuged after which the bacteria were resuspended in a modified anaerobic growth medium. Of the twelve vials, three contained bacteria that had been autoclaved to establish a control condition with dead bacteria. The centrifugation and washing was repeated twice. The modified anaerobic growth medium consisted of $NaHCO_3$, $KHCO_3$, $MgSO_4 \cdot 7H_2O$, $CaCl_2$, and AQDS. It differed from the normal growth medium in that it did not contain $KH_2PO_4$, which was removed due to its high sorption of U, or $NH_4Cl$, which was added separately. Uranyl acetate was added to all vials such that the initial concentration of U was approximately 64 µM.

The twelve vials were divided into four groups: three different control conditions and the experimental condition as shown in Table 1. Ammonium ($NH_4$) in the form of $NH_4Cl$ was added to the three experimental vials as an electron source for the bacteria. In the first control condition, $NH_4Cl$ was also added, but the microbial monoxygenase enzyme was inhibited by the addition of $Na_2S$. The second control condition, mentioned earlier, contained bacteria that had been killed in an autoclave. $NH_4Cl$ was added to this condition, as well. No $NH_4Cl$ was added to the third control condition to establish an electron donor-limited control. No iron (Fe) was added to any vials, but some ferrihydrite, a common ferric oxyhydroxide, which acted as the Fe source in the original pure culture medium remained with the bacteria through the washing process.

TABLE 1

Experimental and control conditions in U bioreduction experiment with ferrihydrite as Fe source

|  | Experimental | Control 1: Enzyme Inhibited | Control 2: Autoclaved Bacteria | Control 3: No $NH_4^+$ |
|---|---|---|---|---|
| $NH_4^+$, mM | 3.98 ± 0.01 | 3.96 ± 0.01 | 4.01 ± 0.02 | 0.03 ± 0.01 |
| Initial total U, µM | 64.8 ± 15.6 | 65.5 ± 6.3 | 65.4 ± 6.1 | 59.3 ± 17.0 |
| $Na_2S$, µM | 0 | 20 | 0 | 0 |
| Acidimicrobiaceae bacteria A6 | Live | Live | Dead | Live |

In Table 1, values given for $NH_4^+$ and U concentrations are the averages of three vials±one standard deviation The extent of Acidimicrobiaceae bacteria A6 activity in each condition was monitored by measuring concentrations of U and $NH_4^+$ on the day the experiment started and again six days later. Samples for $NH_4^+$ analysis were filtered using 0.2 µm nylon filters and stored at 4° C. until they were analyzed using a Dionex™ Ion Chromatograph ICS3000 with a CS-16 column, a CS-16 guard column, and a CERS 500 (4 mm) suppressor. Samples for U(VI) analysis were also filtered at 0.2 µm to remove reduced U(IV) precipitates and were preserved in 2% $HNO_3$. Unfiltered samples for total U analysis were mixed in a 1:1 ratio with 0.2 M $NaHCO_3$ to dissolve any U(IV) that had been reduced by the bacteria. After a 24-hour extraction at room temperature, these samples were also preserved in 2% $HNO_3$. U measurement in acidified samples was completed on a Thermo Scientific Element 2 inductively-coupled plasma mass spectrometer (ICP-MS).

Figure 13:
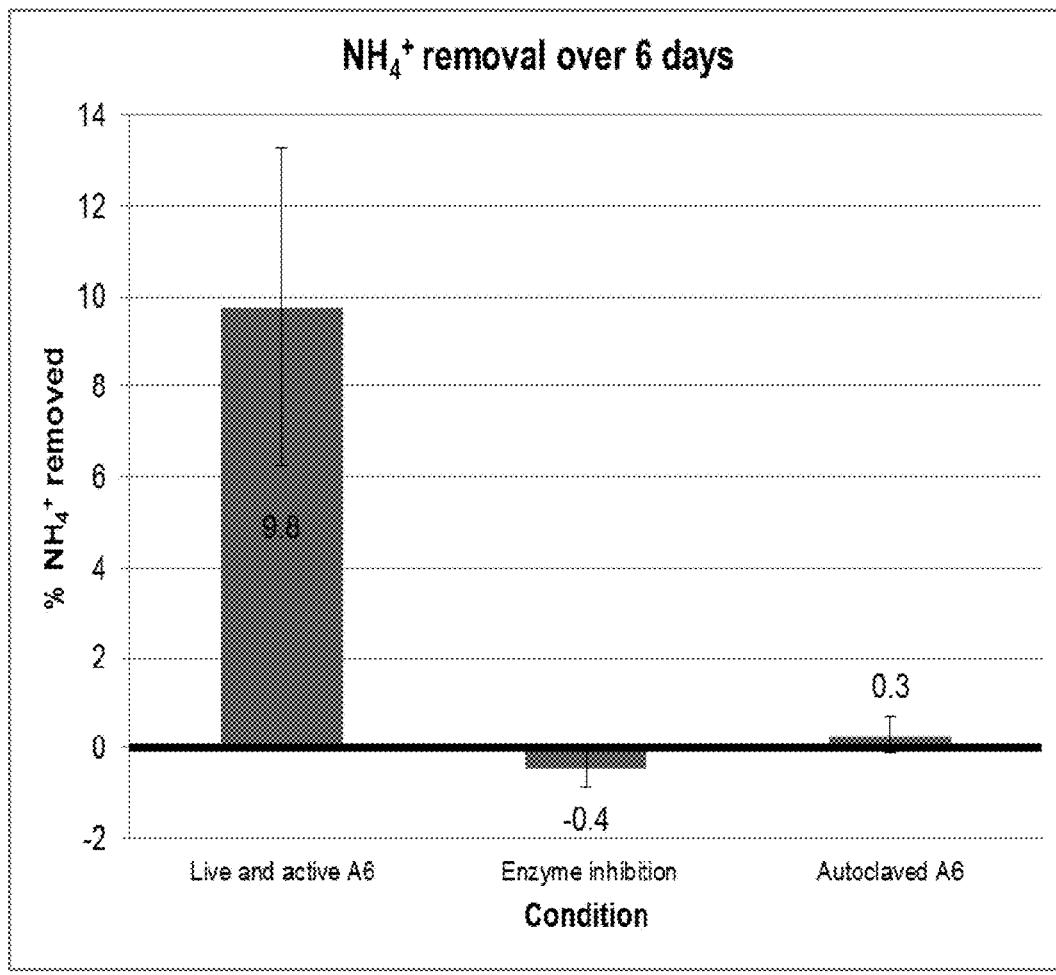
FIG. 13 illustrates NH$_4^+$ oxidized over 6 days by Acidimicrobiaceae bacteria A6.

Reduction of Uranium by Acidimicrobiaceae bacteria A6 with Ferrihydrite as the Iron Source. $NH_4^+$ analyses indicate that Acidimicrobiaceae bacteria A6 were only active in the experimental condition which contained live bacteria with $NH_4^+$ and U. FIG. 13 illustrates $NH_4^+$ oxidized over 6 days by Acidimicrobiaceae bacteria A6. Uranium (U) was present in all conditions. Referring to FIG. 13, percentages shown are an average of three replicates. Error bars indicate one standard deviation. Referring to FIG. 13, over 6 days, bacteria in this condition oxidized an average of 7.0 mg $L^{-1}$ of $NH_4^+$ which is equivalent to the removal of 9.8% of the initial $NH_4^+$. $NH_4^+$ oxidation was not seen in any of the control conditions which suggests that Acidimicrobiaceae bacteria A6 were not active in these conditions. In the control conditions in which the relevant monoxygenase enzyme was inhibited, the average $NH_4^+$ concentration increased by 0.31 mg $L^{-1}$ indicating no $NH_4^+$ oxidation. Similarly, in the control condition containing autoclaved bacteria, the average $NH_4^+$ concentration decreased by 0.20 mg $L^{-1}$ indicating no significant $NH_4^+$ oxidation. In the control in which no $NH_4^+$ was added, the concentration of $NH_4^+$ actually increased from an average concentration of 0.52 mg $L^{-1}$ to 1.83 mg $L^{-1}$. This increase was seen in all three replicates and could indicate nitrogen release through the death and decay of Acidimicrobiaceae bacteria A6 that were deprived of their requisite electron donor $NH_4^+$.

Figure 14:
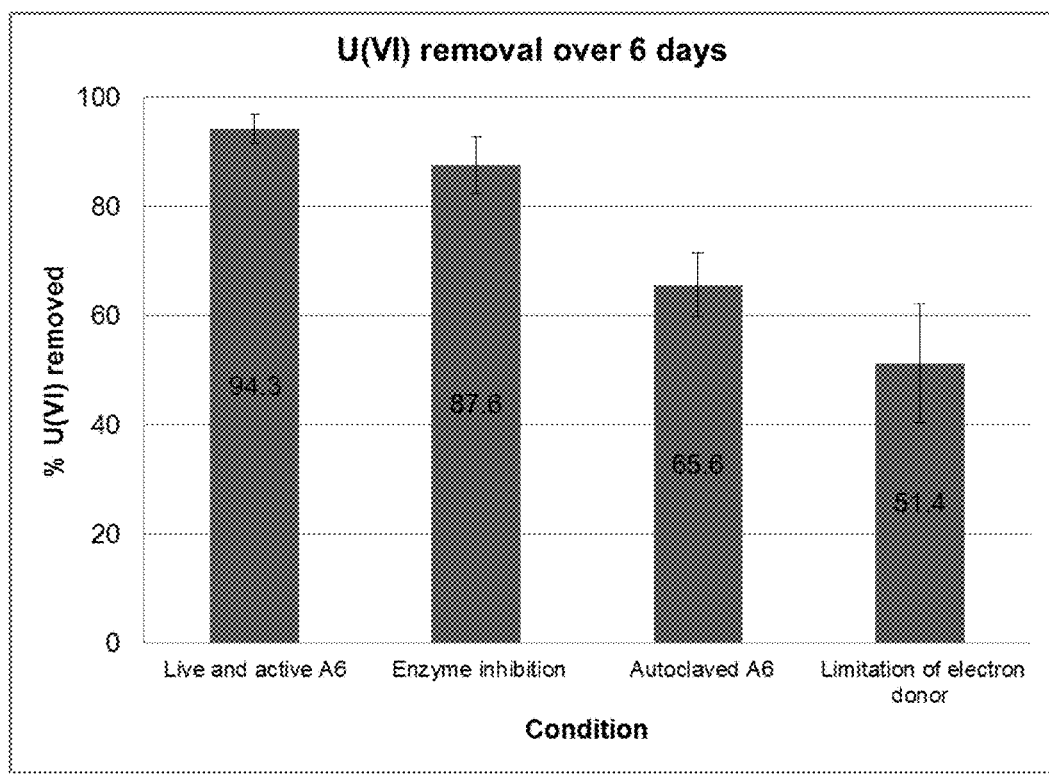
FIG. 14 illustrates uranium U(VI) removed from solution over 6 days.

Measurement of U concentrations indicates that biological reduction is one of multiple pathways by which U was removed from solution in these experiments. Across all experimental and control conditions, between 74% and 91% of the added U disappeared from solution within 2 hours of uranyl acetate addition. It is likely that this U(VI) sorbed to ferrihydrite which remained with the bacterial cells through the centrifugation and washing procedure. As a result, the effective initial aqueous U(VI) concentrations varied from 7.2 µM to 13.2 µM U(VI). FIG. 14 illustrates uranium U(VI) removed from solution over 6 days. Referring to FIG. 14, the difference between the "Live and active A6" condition and both the "Autoclaved A6" and the "Limitation of electron donor" conditions is attributable to U reduction by Acidimicrobiaceae bacteria A6. Percentages shown are an average of three replicates. Error bars indicate one standard deviation.

Referring to FIG. 14, significant U(VI) removal in all conditions continued after the initial removal by sorption. In the three control cases, the lack of $NH_4^+$ oxidation indicates that Acidimicrobiaceae bacteria A6 were inactive and thus the U(VI) removal in those cases must have been abiotic. It is likely that U diffusion into the matrix of ferrihydrite caused the removal of 51.4% and 65.6% of effective initial aqueous U(VI) over 6 days in the $NH_4^+$-limited and autoclaved controls, respectively. This two-step uranyl sorption to ferric oxyhydroxides is an established phenomenon (Hsi C K D and Langmuir D 1985 Geochim Cosmochim Ac 49, 1931-1941; Morrison, S J et al., 1995 J Contam Hydrol 17, 333-346, both of which are incorporated herein by reference as if fully set forth). In the enzyme inhibited control, even more U(VI) was abiotically removed over 6 days than in the autoclaved or $NH_4^+$-limited control. The additional U(VI) removal in this case is likely due to abiotic U(VI) reduction by the added enzyme inhibiting compound, $Na_2S$. The sulfide in $Na_2S$ is able to act as an electron donor for U(VI) reduction (Hua B et al. 2006 Environmental Science & Technology 40, 4666-4671, which is incorporated herein by reference as if fully set forth).

Referring to FIG. 14, comparison of U(VI) removal in the experimental condition and the controls with autoclaved bacteria and with $NH_4^+$ limitation suggests that biotic reduction of U(VI) by Acidimicrobiaceae bacteria A6 is significant. Without the help of reductants like $Na_2S$, the U(VI) removal in vials with live and active bacteria exceeds the highest removal in vials with dead bacteria by 25%. Since these conditions are identical except for the state of the bacteria, it is reasonable to conclude that the additional U(VI) reduction is performed by Acidimicrobiaceae bacteria A6.

EXAMPLE 20

Reduction of Uranium by Acidimicrobiaceae Bacteria A6 with Nontronite as the Iron Source Cell suspension experiments with nontronite, an Fe-rich clay, were performed to study U bioreduction by Acidimicrobiaceae bacteria A6 in an environment rich in electron accepting Fe(III) to promote Acidimicrobiaceae bacteria A6 activity. This experiment was similar to the cell suspension experiments without the addition of an Fe source as described above. Pure culture of Acidimicrobiaceae bacteria A6 in twelve 15-mL vials was washed by centrifugation and resuspension in anaerobic growth medium consisting of $NaHCO_3$, $KHCO_3$, $MgSO_4 \cdot 7H_2O$, $CaCl_2$, and AQDS.

Nontronite (NAu-2) from the Source Clay Repository of the Clay Minerals Society was selected as an electron acceptor for this experiment due to its inability to sorb significant amounts of U at slightly acidic pH. The structural formula of this clay is $M^+_{0.72}$ $[Si_{7.55}Al_{0.45}][Fe_{3.83}Mg_{0.05}]$ $O_{20}(OH_4)$ where $M^+$ represents monovalent interlayer cations (Keeling J L et al. 2000 Clay Clay Miner 48, 537-548, which is incorporated herein by reference as if fully set forth). This clay is 23.4% Fe by weight, of which 99.4% is Fe(III) (Liu D et al. 2011 Geochim Cosmochim Ac 75, 1057-1071, which is incorporated herein by reference as if fully set forth). A stock solution of 20 g $L^{-1}$ nontronite was prepared using a previously established protocol (Liu et al. 2011, which is incorporated herein by reference as if fully set forth). Briefly, the clay was ground by hand with mortar and pestle before it was soaked in 0.5 mM NaCl overnight. The solution was centrifuged to eliminate all but the 0.02-0.5 µm size fraction. These remaining particles were washed with deionized water and dried in an oven at 100° C. The clay was diluted to 20 g $L^{-1}$ in deionized water and autoclaved to create a sterile stock solution. This stock solution was added to all 12 vials so that the final concentration of nontronite in each vial was 5 g $L^{-1}$.

Again, the twelve vials were divided into four groups: one experimental group and three control groups as described in Table 2. To establish the experimental condition with live and active Acidimicrobiaceae bacteria A6, $NH_4Cl$ and uranyl acetate were added so that the initial concentrations of $NH_4^+$ and U were 3.726 mM and 12.5 µM, respectively. The first control condition contained bacteria that had been autoclaved, but $NH_4Cl$ and uranyl acetate were added to these control vials so that they were otherwise identical to the experimental condition. The second control condition contained live bacteria and U, but no $NH_4^+$ was added to these vials to distinguish the effects of live and active bacteria from live and inactive bacteria. The third control condition contained live bacteria and added $NH_4^+$, but did not contain any U in order to determine whether the presence of U altered the activity of Acidimicrobiaceae bacteria A6.

Fe(II) was measured at intervals of 24 to 48 hours throughout the experiment to gauge Fe-reducing activity of Acidimicrobiaceae bacteria A6. 20 µL of unfiltered samples were deposited in 1 mL of 0.5 N HCl. After 15 minutes, Fe(II) was measured using the well-established ferrozine method (Komlos J and Jaffe P R, 2004 Biodegradation 15, 315.325, which is incorporated herein by reference as if fully set forth). Briefly, Fe(II) was measured by adding 30 µL of HCl-extracted sample to 1.5 mL of ferrozine and measuring the absorbance after 30 minutes at a wavelength of 562 nm in a Spectronic Genesys 2 spectrophotometer. Absorbances were converted to molar concentrations of Fe(II) using a standard curve.

TABLE 2

Experimental and control conditions in U bioreduction experiment with nontronite as Fe source

|  | Experimental | Control 1: Autoclaved Bacteria | Control 2: No $NH_4^+$ | Control 3: No U |
|---|---|---|---|---|
| $NH_4^+$, mM | 3.726 mM | 3.726 mM | 0 mM | 3.726 mM |
| Initial total U, µM | 12.5 ± 2.3 | 11.8 ± 0.3 | 12.4 ± 0.5 | 0 |
| Nontronite, g $L^{-1}$ | 5 | 5 | 5 | 5 |
| Acidimicrobiaceae bacteria A6 | Live | Dead | Live | Live |

Concentrations of Fe(II) measured by the ferrozine method include aqueous Fe(II) and approximately 74% of the Fe(II) sorbed to nontronite surfaces (Zhang G X et al. 2009 *Geochim Cosmochim Ac* 73, 3523-3538, which is incorporated herein by reference as if fully set forth). Therefore, these measurements were used only in relation to each other to track bacterial Fe(II) production indicating Acidimicrobiaceae bacteria A6 activity. U, $NH_4^+$, nitrate ($NO_3^-$), and nitrite ($NO_2^-$) concentrations were measured after 0, 7, and 11 days to determine activity of Acidimicrobiaceae bacteria A6. Total U and U(VI) concentrations were measured by ICP-MS as described above. $NH_4^+$, $NO_3^-$, and $NO_2^-$ concentrations were measured on a Dionex™ Ion Chromatograph ICS3000. Columns used for $NH_4^+$ were identical to those described above. $NO_3^-$ and $NO_2^-$ analysis was carried out with an AS-22 column, an AG-22 guard column, and an ASRS 300 (4 mm) suppressor. It had previously been determined that $NH_4^+$ could sorb to nontronite, so total $NH_4^+$ was also measured. Sorbed $NH_4^+$ was extracted from nontronite by adding 20 µL samples from each vial to 1 mL of 0.5 N HCl. After 20 hours, the acid extractions were filtered on 0.2 µm nylon filters and preserved at 4° C. until the $NH_4^+$ concentrations were measured on a Dionex™ Ion Chromatograph.

Purity of bacterial cultures was confirmed after the experiment using DNA isolation and quantitative polymerase chain reaction (qPCR) assay. 1 mL samples of the slurry containing bacteria, growth medium, and nontronite were centrifuged at 1000 rpm for 10 minutes before DNA was extracted from the pellets using the FastDNA® spin kit for soil (MP Biomedicals, USA) as described by the manufacturer. Total bacterial abundance was represented by the number of copies of 16S rRNA genes quantified by qPCR with primers BACT1369F-PROK1492R and the TaqMan probe1389F (Suzuki M T et al. 2000 *Appl Environ Microb* 66, 4605-4614, which is incorporated herein as if fully set forth). Acidimicrobiaceae bacteria A6 bacteria were enumerated with the primer set acm342f-439r (Huang S and Jaffe P R 2015 *Biogeosciences* 12, 769-779, which is incorporated herein by reference as if fully set forth). Several other U-reducing species were also targeted to check the samples for contamination. To investigate the presence of sulfate and Fe reducing bacteria, δ-Proteobacteria was enumerated by qPCR using primer set 361F-685R and the TaqMan probe 1839F (Stults J R et al. 2001 *Appl Environ Microb* 67, 2781-2789, which is incorporated herein by reference as if fully set forth). *Geobacter*, the dominant Fe-reducing microorganisms in sediment environments, was enumerated by qPCR primer set 561F-825R and TaqMan probe Gbc2 (Stults et al. 2001, which is incorporated herein by reference as if fully set forth). *Anaeromyxobacter* spp., a metal-reducing group of bacteria, was enumerated with the 60F-461R primer pair (Petrie L et al. 2003 *Appl Environ Microb* 69, 7467-7479, which is incorporated herein by reference as if fully set forth). All qPCR experiments were carried out using a StepOnePlus™ Real-Time PCR System (Life Technologies, USA). For DNA quantification, each qPCR mixture (20 µL) was composed of 10 µL of SYBR Premix Ex Taq® II (Takara, Japan), 0.8 µL of 10 µM of each primer, and ~10 ng DNA template. Each assay contained a set of standards produced by serial dilution of plasmids containing specific target genes, independent triplicate templates for each slurry sample, and triplicate no template controls (NTC).

Figure 15:
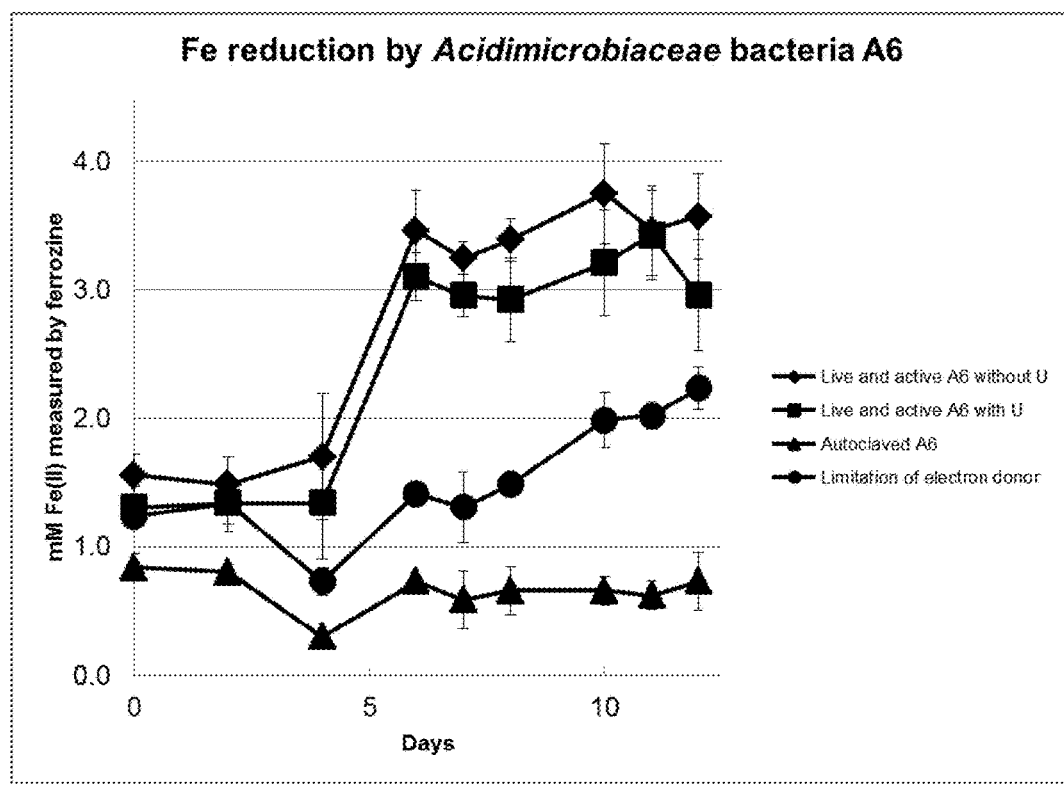
FIG. 15 illustrates reduction of Fe in nontronite over 12 days.

Reduction of Uranium by Acidimicrobiaceae bacteria a 6 with Nontronite as the Iron Source. Measurements of Fe(II) confirm that Acidimicrobiaceae bacteria A6 remain active in the presence of U and nontronite. FIG. 15 illustrates reduction of Fe in nontronite over 12 days. Values shown are averages of three replicates. Error bars indicate one standard deviation. Referring to FIG. 15, Fe(II) production was similar in rate and extent in conditions with and without U, indicating that the addition of 10 µM uranyl acetate is not toxic to Acidimicrobiaceae bacteria A6. In cases with and without added U, Acidimicrobiaceae bacteria A6 were able to use the Fe(III) in nontronite as an electron acceptor for $NH_4^+$ oxidation. Still referring to FIG. 15, in the condition with autoclaved Acidimicrobiaceae bacteria A6, the Fe(II) remained constant throughout the 12-day experiment. This result indicates that there was no abiotic Fe cycling occurring in the vials.

Figure 16:
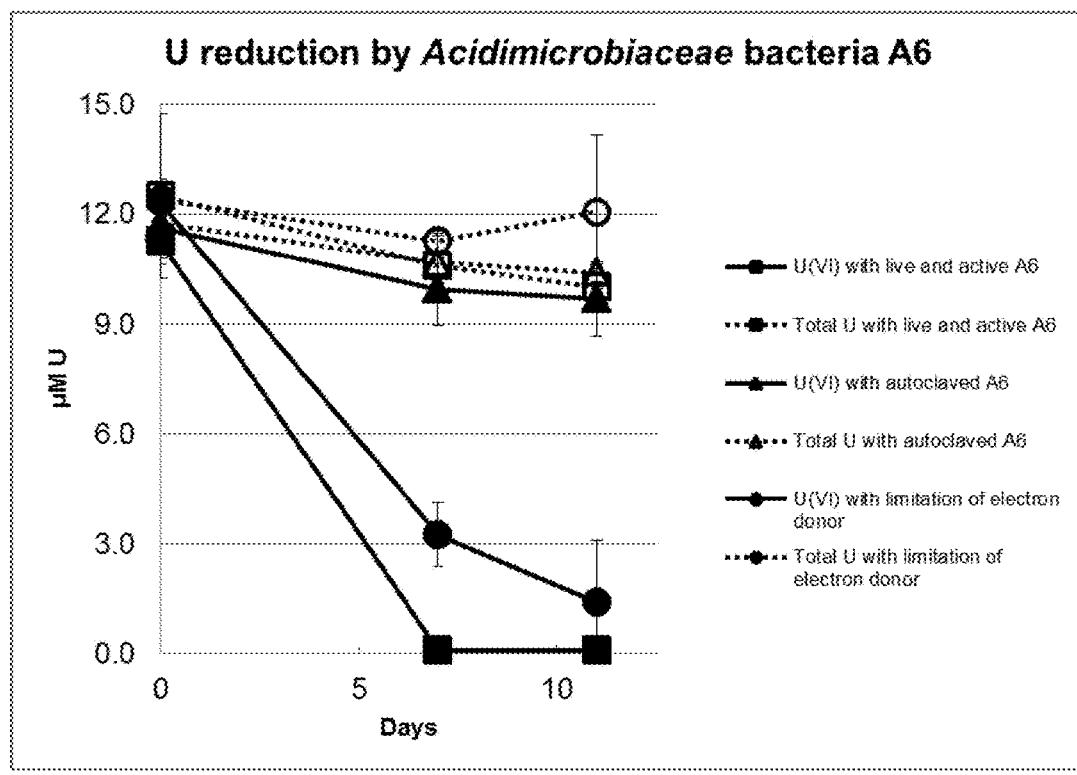
FIG. 16 illustrates total U and U(VI) concentrations over 11 days.

Results indicate that Acidimicrobiaceae bacteria A6 can reduce U in addition to Fe. FIG. 16 illustrates total U and U(VI) concentrations over 11 days. Values shown are averages of three replicates. Error bars indicate one standard deviation. Referring to FIG. 16, essentially all of the U(VI) disappeared from solution in 7 days in the condition with live Acidimicrobiaceae bacteria A6, $NH_4^+$, and U. This change cannot be attributed to activity of other bacteria, as qPCR results indicated that only Acidimicrobiaceae bacteria A6 were present in all vials with live bacteria. Referring to FIG. 16, this change in U(VI) also cannot be attributed to sorption of U to nontronite or ingredients of the growth medium because the aqueous U(VI) concentrations remained essentially equivalent to total U concentrations in vials in which Acidimicrobiaceae bacteria A6 had been killed. The similarity between U(VI) and total U in the condition with autoclaved bacteria also demonstrates that no abiotic U reduction occurred. The difference between vials with dead and live Acidimicrobiaceae bacteria A6 indicate that Acidimicrobiaceae bacteria A6 can reduce aqueous U(VI) to U(IV) solids. It has previously been determined that *Shewanella oneidensis* MR-1 are also able to completely reduce U in the presence of nontronite (Zhang G X et al 2009, which is incorporated herein by reference as if fully set forth). *Shewanella oneidensis* MR-1 are only able to reduce U in the presence of AQDS; though this present study did not examine the effect of AQDS on U reduction by Acidimicrobiaceae bacteria A6, it is likely that they similarly require AQDS (Zhang G X et al 2009, which is incorporated).

In all vials except one, the total U measured by bicarbonate extraction decreased over 11 days. This change likely resulted from the slow incorporation of U into the structure of nontronite where it would be unaffected by the extraction.

Unexpectedly, Fe and U reduction occurred in vials without $NH_4^+$ for the live Acidimicrobiaceae bacteria A6 to oxidize. In these vials, the Fe(II) increased and U(VI) decreased more slowly and to a lesser extent over 12 days than they did in vials with $NH_4^+$. These results could indicate that the live Acidimicrobiaceae bacteria A6 area able to use a structural component of the nontronite as an electron donor rather than $NH_4^+$. Alternatively, biomass turnover and decomposition could provide the remaining live Acidimicrobiaceae bacteria A6 with $NH_4^+$. In this case, the lower proportion of live bacteria and the lower concentrations of $NH_4^+$ would explain the slower rates and smaller extent of Fe and U reduction.

EXAMPLE 21

Bioreduction of Cu(II) by Feammox

Figure 17A:
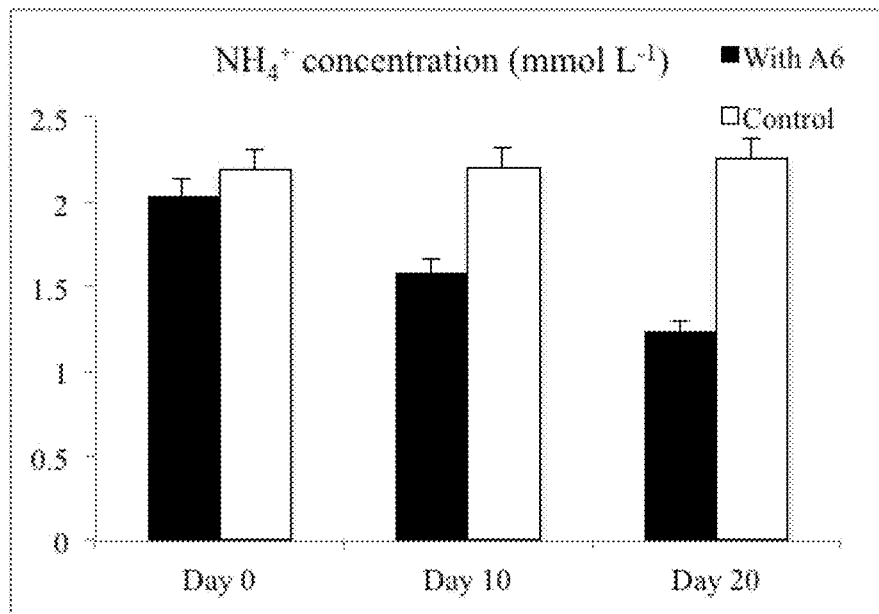
FIGS. 17A-17B illustrate oxidation of NH$_4^+$ (FIG. 17A) and bioreduction of Cu(II) (FIG. 17B) by Feammox. Filled bars are for results with A6, and open bars are controls.
Figure 17B:
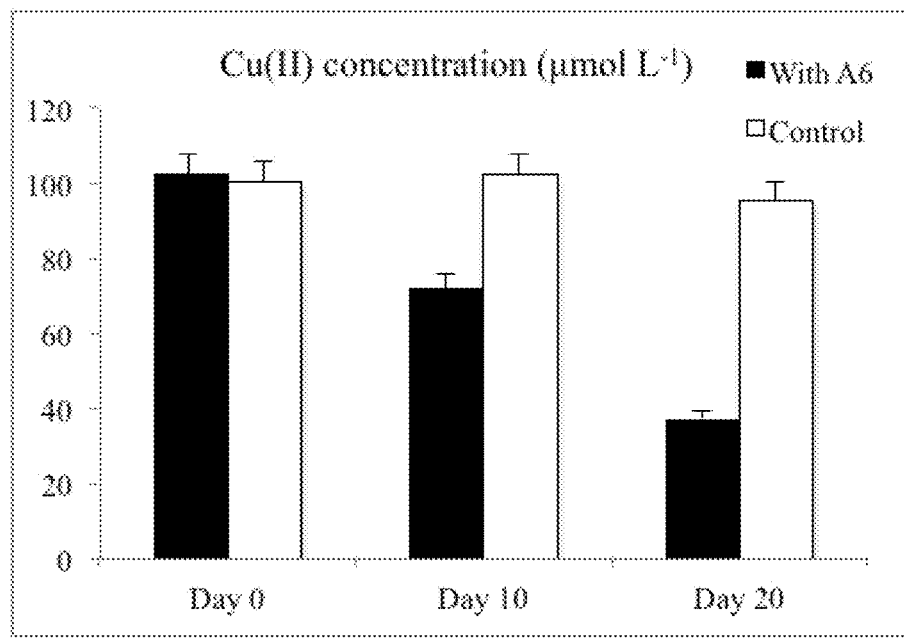

FIGS. 17A-17B illustrate oxidation of $NH_4^+$ (FIG. 17A) and reduction of Cu (II) (FIG. 17B) by Feammox. Around $10^4$ cell per ml of pure A6 were incubated in inorganic $NH_4^+$-Ferric iron liquid medium with 20 ppm Copper (II) chloride ($CuCl_2$) under anaerobic conditions for 40 days. Referring to FIG. 17B, 64.2% of Cu(II) was reduced and the total dissolved Cu [including Cu(II) and Cu(I)] decreased by 23.1% over the incubation period, while the concentrations of Cu(II) and Cu(I) remained constant for the autoclaved treatment.

After the incubation, the samples were aerated to reoxidize the reduced copper. This resulted in full recovery or the initial Cu(II).

EXAMPLE 22

Investigation of Selected Organic Contaminants Biodegradation by Feammox

Around $10^4$ cell per ml of pure A6 were incubated in inorganic $NH_4$—Ferric iron liquid medium with 1000 ppb Trichloroethylene (TCE)/1000 ppb tetrachloroethylene (PCE)/100 ppb benzene/100 ppb phenanthrene under anaerobic conditions for 40 days. Six 15-mL vials of incubations were conducted for each organic contaminant. The six vials were divided into three groups: two different control conditions and the experimental condition as shown in Table 3.

TABLE 3

Experimental and control conditions in selected organic contaminants biodegradation by Feammox

| | Experimental | Control 1: Enzyme Inhibited | Control 3: No $NH_4^+$ |
|---|---|---|---|
| $NH_4^+$, mM | 2.96 ± 0.12 | 2.97 ± 0.05 | 0.02 ± 0.01 |
| Initial total TCE/PCE/benzene/phenathrene, ppb | 1000/1000/100/100/ | 1000/1000/100/100/ | 1000/1000/100/100/ |
| $Na_2S$, μM | 0 | 50 | 0 |
| Acidimicrobiaceae bacteria A6 | Live | Live | Live |

Subsamples were taken on day 0, 12, 22, 30 and 37 under anoxic conditions. Samples for $NH_4^+$ analysis were filtered using 0.2 um nylon filters and stored at 4° C. until they were analyzed using a Dionex™ Ion Chromatograph ICS3000 with a CS-16 column, a CS-16 guard column, and a CERS 500 (4 mm) suppressor. TCE, PCE, benzene or phenathrene were measured with a Thermo Scientific Vanquish UHPLC system. FIGS. 18A-18D illustrate an effect of biodegradation of trichloroethylene (TCE) (FIG. 18A), tetrachloroethylene (PCE) (FIG. 18B), benzene (FIG. 18C) and phenanthrene (FIG. 18D) by Feammox. Around $10^4$ cell per ml of pure A6 were incubated in inorganic $NH_4^+$-Ferric iron liquid medium with 1000 ppb Trichloroethylene (TCE) (FIG. 18A), 1000 ppb tetrachloroethylene (PCE) (FIG. 18B), 100 ppb benzene (FIG. 18C), 100 ppb phenanthrene (FIG. 18D) under anaerobic conditions for 40 days.

Figure 18A:
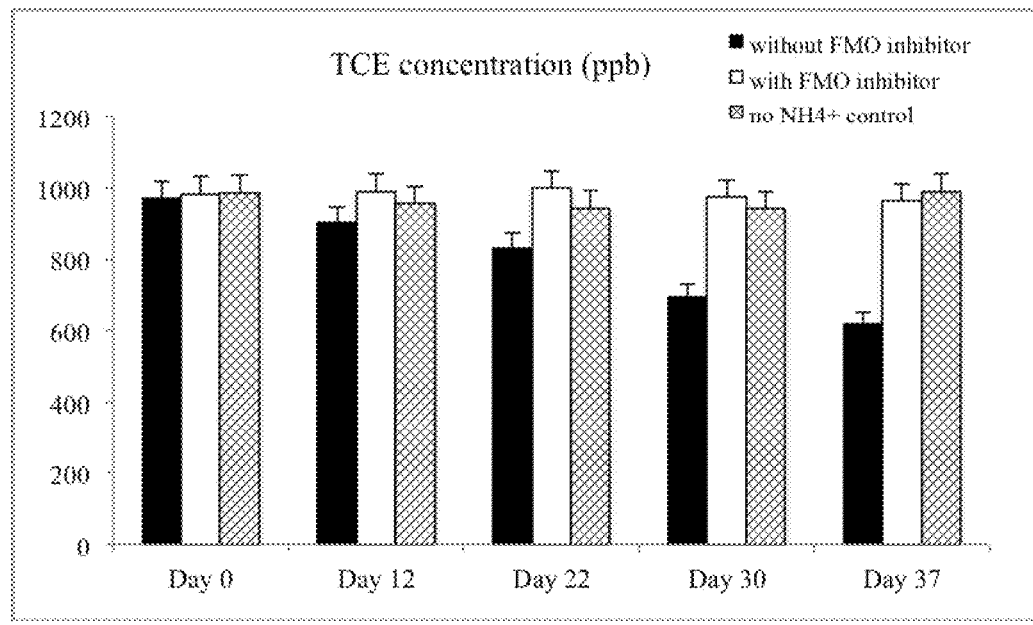
FIGS. 18A-18D illustrate an effect of biodegradation of trichloroethylene (TCE) (FIG. 18A), tetrachloroethylene (PCE) (FIG. 18B), benzene (FIG. 18C) and phenanthrene (FIG. 18D) by Feammox. Filled bars are for results without FMO inhibitor, open bars are for results with FMO inhibitor and crosshatched bars are no NH$_4^+$ controls.
Figure 18B:
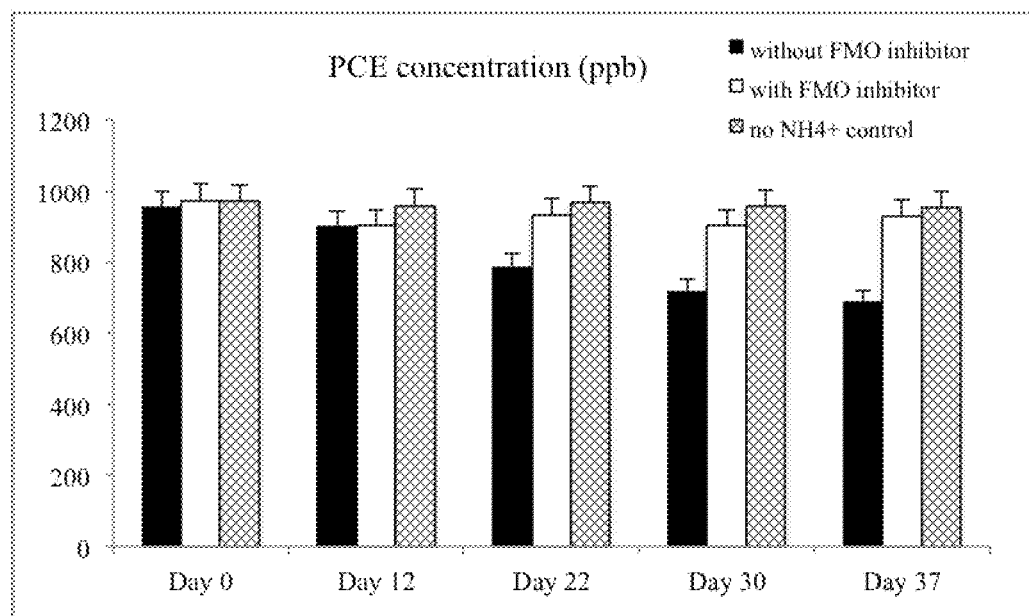
Figure 18C:
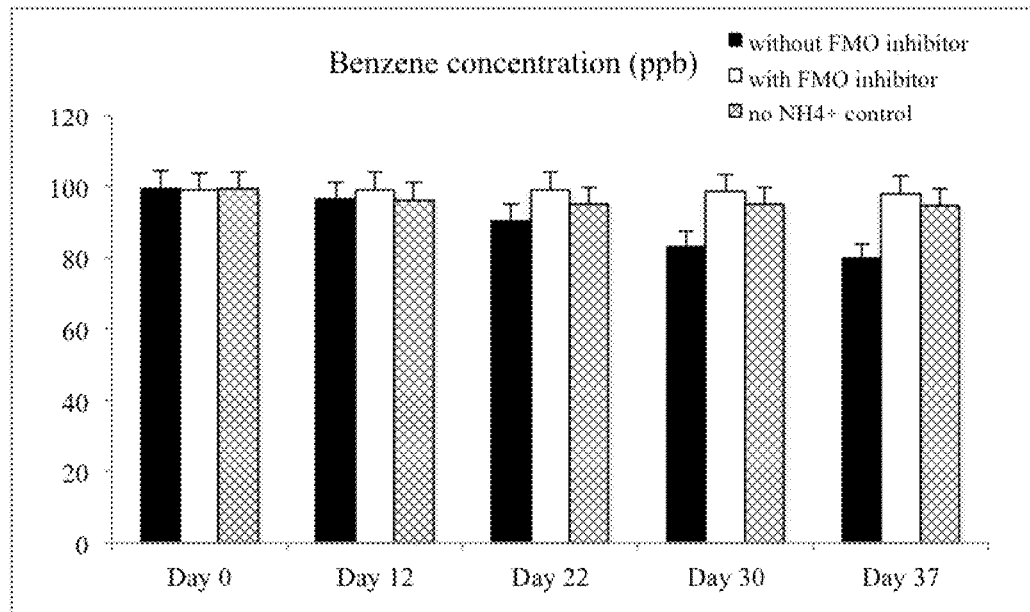
Figure 18D:
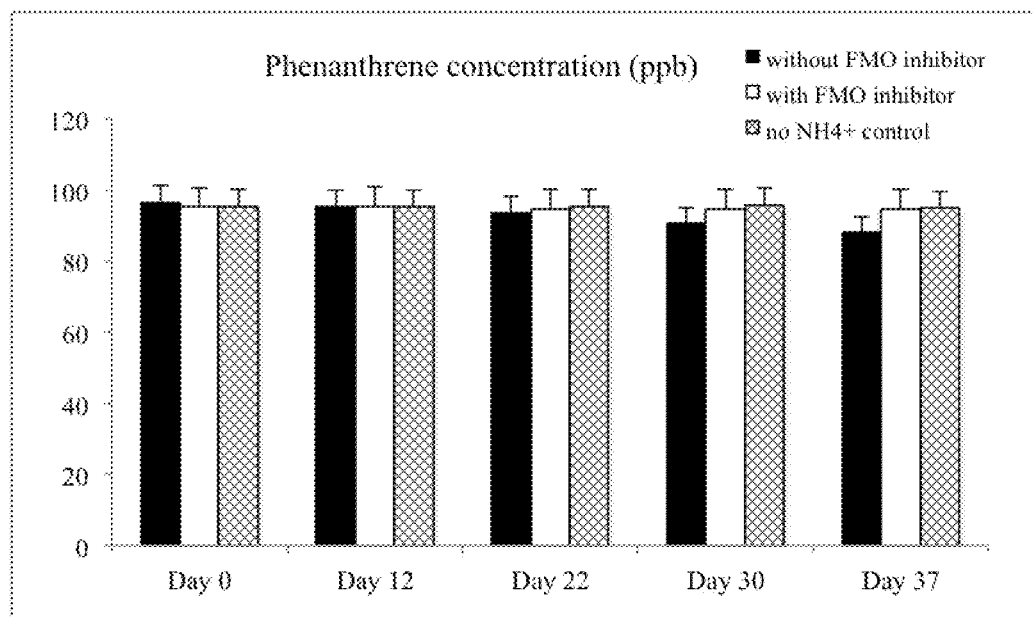

Referring to FIGS. 18A-18B, TCE, PCE, benzene and phenanthrene degradation were found in all Feammox active samples, but not in the samples that included Feammox enzyme inhibitor (sodium bisulfide) and samples without $NH_4^+$. It was observed that 36% of TCE, 28% of PCE, 20% of benzene and 8.8% of phenanthrene was degraded over an incubation period of approximately one month. $NH_4^+$ oxidation was not seen in any of the control conditions, which suggests that Acidimicrobiaceae bacteria A6 were not active in these conditions that also did not result in the degradation of the organics.

It should be noticed that all of the above are extremely recalcitrant compounds, especially in anaerobic environments. Higher degradation rates can be achieved by having larger bacterial numbers. The bacterial numbers for higher degradation may be $10^6$, $10^8$ or $10^{10}$ cells per ml of pure A6.

EXAMPLE 23

Characteristics of Feammox Acidimicrobiaceae Bacterium A6 and Enzyme Identification Feammox bacteria were isolated in inorganic $NH_4^+$-Ferric iron solid medium from wetland soils collected in New Jersey as described in Examples 2-17. The bacteria were cultured in liquid and solid media.

Inorganic $NH_4^+$-Ferric iron liquid medium contained the following components per liter: 177 mg $NH_4Cl$, 77.9 mg $(NH_4)_2SO_4$, 19.8 mg $NaHCO_3$, 71.0 mg $KHCO_3$, 9.00 mg $KH_2PO4$, 100 mg $MgSO_4.7H_2O$, and 60.0 mg $CaCl_2.2H_2O$. 3.37 g ferrihydrite, 18.42 mg antraquinone-2,6-disulfonate (AQDS) and 1 mL trace element solution and vitamin (ATCC®). Inorganic $NH_4^+$-Ferric iron solid medium was prepared with liquid medium and 0.8% agar, 0.2 mL 3.37 g $L^{-1}$ ferrihydrite was spread on the surface.

Figure 19A:
FIGS. 19A-19D illustrate A6 bacterial cultures and cells.
Figure 19B:
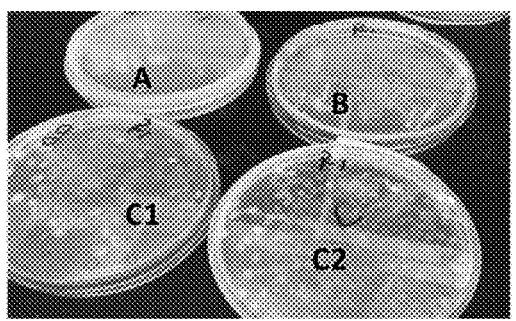
Figure 19C:
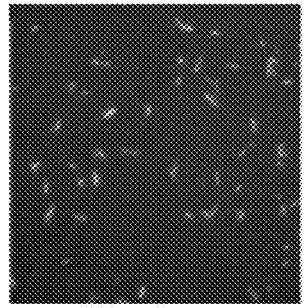
Figure 19D:
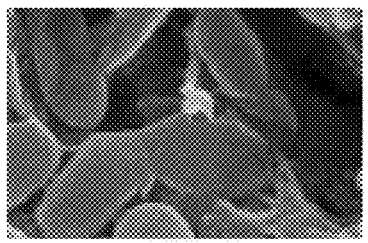

FIGS. 19A-19D illustrate A6 bacterial cultures and cells. FIG. 19A illustrates growth of the A6 bacterium in the liquid medium. Cultures of A6 became increasingly turbid and black-colored (due to accumulation of ferrous iron) during incubation. Culture doubling times of the A6 isolate were 10.2 days. FIG. 19B illustrates A6 growth on the solid inorganic $NH_4$+-ferric iron medium. Colonies of A6 are displayed with black spot (iron-encrusted) on the solid medium. FIGS. 19C-19D show rod-shaped A6 cells. The cells were 1.5-3 mm long by 0.5 mm wide. The A6 bacteria are gram-positive bacteria. On the solid medium, colonies with black spot (accumulation of ferrous iron) were collected and transferred to inorganic $NH_4^+$-Ferric iron liquid medium. Their Feammox activity was verified by the $NH_4^+$ oxidation and iron reduction rates. A strain of Actinobacteria was isolated and identified as Feammox bacteria, and named Feammox Acidimicrobiaceae bacterium A6. The pH optimum for growth of A6 was 4.5, but reasonable activity was detected from pH 2 to 7. Its temperature optimum was 25°

C., and a doubling time of 10.2 days. A $^{13}$C labeled COs amendment was conducted, and the $^{13}$C in cells of A6 increased from 1.80% to 10.3% after 14 days incubation. In a separate incubation, $^{15}$NH$_4$Cl was added with a final concentration of 0.5 mmol L$^{-1}$, and 0.133 mmol L$^{-1}$ of NO$_2^-$ was detected, while no $^{15}$NO$_3^-$ was produced.

The genome size and guanine-cytosine content of A6 are 3.3 mega base pairs (Mb) and 52%. The Feammox ammonium Monooxygenase (FMO) gene (SEQ ID NO: 8), was identified. FMO is considered to be the functional gene coding ammonium oxidation coupled to ferric iron reduction in A6.

Isolation, purification and cultivation of bacteria: Continuous flow membrane Feammox enrichment reactor Soil samples from wetland soils collected in New Jersey were inoculated into a continuous flow membrane reactor, which was operated under anaerobic conditions by constantly purging N$_2$ trough the reactor's headspace at a room temperature (25° C.), and with a 48 hour hydraulic retention time. FIG. 11 illustrates a scheme of a membrane reactor for NH$_4^+$ oxidation via Feammox. Referring to this figure, 1 refers to the feed solution, 2 refers to the feed pump, 3 refers to the membrane module, 4 refers to the floater connected to an electrical on/off switch, 5 refers to the ceramic diffuser, 6 refers to the N$_2$ supplier, 7 refers to the water bath, 8 refers to outflow, and 9 refers to the outflow pump. Inorganic NH$_4^+$-Ferric iron liquid medium contained the following components per liter: 177 mg NH$_4$Cl, 77.9 mg (NH$_4$)$_2$SO$_4$, 19.8 mg NaHCO$_3$, 71.0 mg KHCO$_3$, 9.00 mg KH$_2$PO4, 100 mg MgSO$_4$.7H$_2$O, and 60.0 mg CaCl$_2$.2H$_2$O. 3.37 g ferrihydrite, 18.42 mg AQDS and 1 mL trace element solution and vitamin (ATCC®). pH was controlled at around 4~5, and dissolve oxygen was <0.10 mg/L. Samples form the outflow were collected every two days, and sludge samples from reactor were collected and kept at $-20°$ C. for molecular biology analysis.

454 pyrosequencing was performed with samples collected from the membrane reactor after 150 days of reactor operation with Domain-specific primers, targeting the V3-V5 region of the 16S rDNA of bacteria were amplified following methods suggested by Pinto et al. 2012, PLoS One 7: 43093, which is incorporated herein by reference as if fully set forth. And the results were compared with samples from previous incubation on days 0, 30, 90, 160. Acidimicrobiaceae bacterium A6, which belongs to the Actinobacteria phylum, was the dominant species in the incubation experiments after 180 days of incubation (14.8% in terms of cell numbers) and increased in the membrane reactor after 150 days of operation (40.2% in terms of cell numbers).

Growth on solid media: Inorganic NH$_4^+$-Ferric iron solid media was prepared with liquid media and 0.8% agar, 0.2 mL 3.37 g L$^{-1}$ ferrihydrite was spread on the surface.

Figure 20:
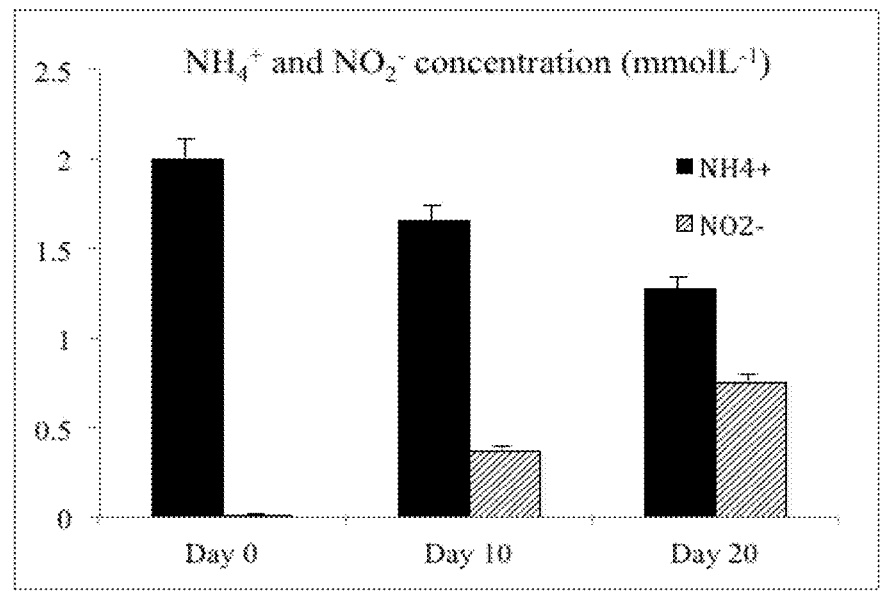
FIG. 20 illustrates anaerobic oxidation of ammonium by the A6 isolate. Filled bars are for results with NH$_4^+$ and stripped bars are results with NO$_2^-$.

On the solid medium, colonies with black spot (accumulation of ferrous iron) were collected and transferred to inorganic NH$_4^+$ Ferric iron liquid media. FIG. 20 illustrates anaerobic oxidation of ammonium by the A6 isolate. Referring to FIG. 20, bacterial cells were incubated for 20 days on the inorganic, NH$_4^+$-ferric iron media, pH 4.5. The A6 concentration was $10^5$ copies per mL. 0.738 mM of NH$_4^+$ was oxidized and 0.710 mM of NO$_2^-$ was produced. Still referring to FIG. 20, the Feammox activity of the bacterial cells was verified by the NH$_4^+$ oxidation and iron reduction rates. A strain of Actinobacteria was isolated and identified as Feammox bacteria, and named Feammox Acidimicrobiaceae bacterium A6. Referring to FIGS. 19C-19D, microscopic examination showed that cells were rod-shaped, 1.5-3 mm long by 0.5 mm wide, gram-positive.

Growth on liquid media: In ferric iron-containing liquid media, cultures of A6 became increasingly turbid and black-coloured (due to the accumulation of ferrous iron) during incubation. Microscopic examination showed that endospores were produced. The pH optimum for growth of isolate A6 were 4.5, and its temperature optimum was 25° C. Under optimum conditions of pH and temperature, culture doubling times of isolate A6 were 10.2 days.

Anaerobic oxidation of ammonium—ammonium oxidation rates

The A6 isolate was incubated for 20 days on the inorganic, NH$_4^+$ Ferric iron media, at a pH 4.5. The A6 bacterial concentration was $10^5$ copies per mL. FIG. 20 illustrates concentrations of NH$_4^+$ and NO$_2^-$ during anaerobic oxidation of ammonium. After incubation, 0.738 mM of NH$_4^+$ was oxidized and 0.710 mM of NO$_2^-$ was produced.

Figure 21:
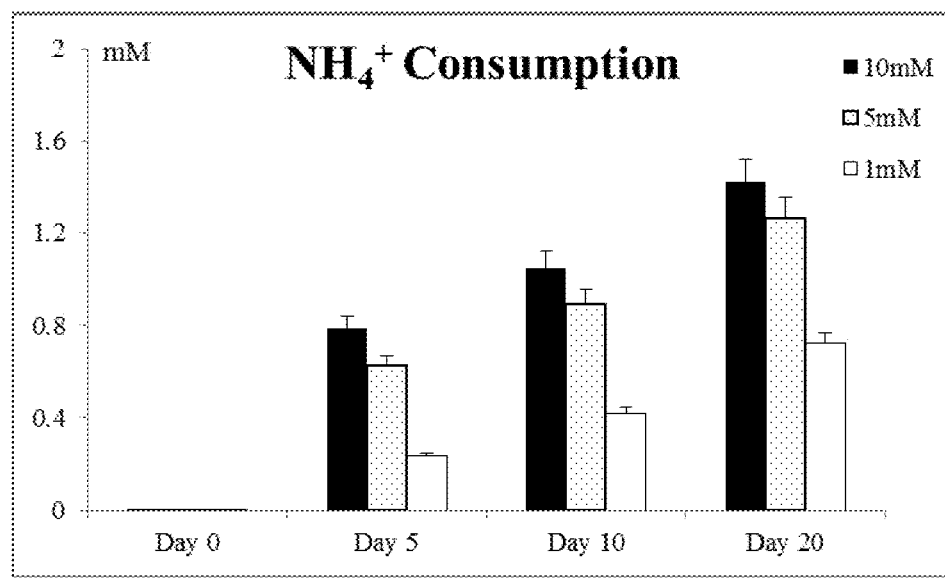
FIG. 21 illustrates an effect of NH$_4^+$ concentration on its consumption by A6. 10 mM NH$_4^+$ results are reported in the left filled bar of each of days 0, 5, 10 and 20 panels. 5 mM NH$_4^+$ are reported in the middle dotted bar of each of days 0, 5, 10 and 20 panels. 1 mM NH$_4^+$ is reported in the right open bar of each of days 0, 5, 10 and 20 panels.

Effect of NH$_4^+$ concentration on Feammox. FIG. 21 illustrates an effect of NH$_4^+$ concentration on its consumption by A6. Referring to this figure, the isolate A6 was incubated for 20 days in the inorganic NH$_4^+$-Ferric iron media, pH4.5. A6 included $10^5$ copies per mL. 10 mM ferrihydrite and three different amounts (10 mM, 5 mM, 1 mM) of NH$_4^+$ were added initially. Higher NH$_4^+$ consumption rates by Feammox were found for higher NH$_4^+$ concentration incubation.

$^{15}$N Isotope Incubation $^{15}$NH$_4$Cl was added with a final concentration of 0.5 mmol L$^{-1}$ and 0.133 mmol L$^{-1}$ of $^{15}$NO$_2^-$ was detected after 7 days incubation, while no $^{15}$NO$_3^-$ was produced. The data was summarized in Table 4.

TABLE 4

Summary of $^{15}$N isotope incubation

|  | $^{14}$N | $^{15}$N |
|---|---|---|
| D1-NH$_4^+$ | 0.892 | 0.108 |
| D1-NO$_2^-$ | 0.995 | 0.005 |
| D1-NO$_3^-$ | 0.995 | 0.005 |
| D7-NH$_4$+ | 0.847 | 0.153 |
| D7-NO$_2$- | 0.757 | 0.243 |
| D7-NO$_3$- | 0.992 | 0.008 |

|  | D1 | D7 |
|---|---|---|
| 15N—NH4+ | 0.5192 | 0.3862 |
| 15N—NO2- | 0.0001 | 0.1330 |
| 15N—NO3- | 0.0001 | 0.0001 |

The data confirmed that NO$_2^-$ is the main product of NH$_4^+$ oxidation in Feammox reaction.

Figure 22:
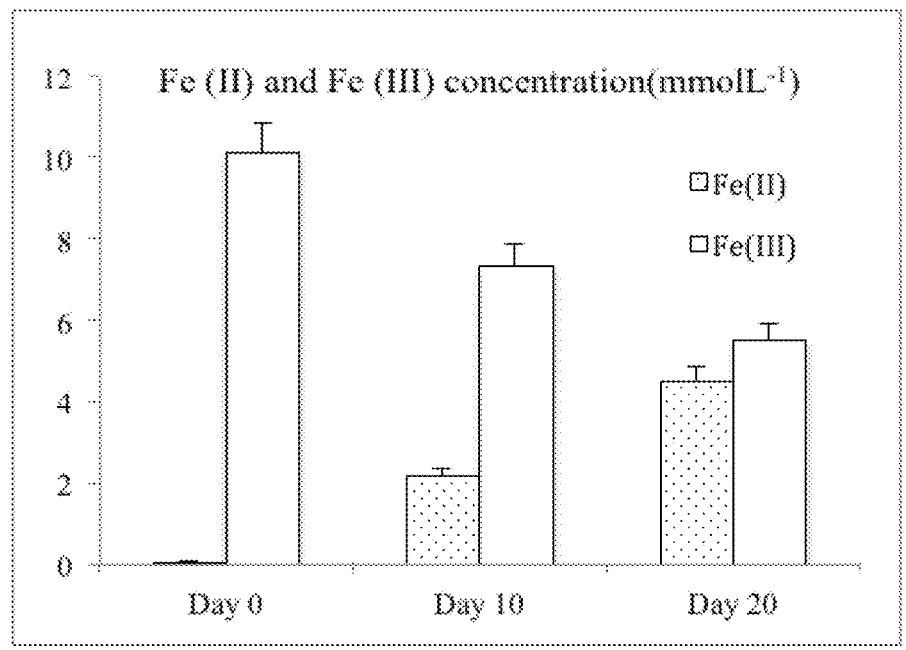
FIG. 22 illustrates iron reduction rates. Fe (II) results are reported in the left bar of each of the day 0, 10, and 20 panels. Fe(III) results are reported in the right bar of each of the days 0, 10, and 20 panels.

Reduction of ferric iron reduction rates: FIG. 22 illustrates iron reduction rates. The A6 cells were incubated for 20 days on the inorganic, NH$_4^+$-ferric iron medium, pH 4.5. The AG concentration was $10^5$ copies per mL. After incubation, 4.330 mM of NH$_4^+$ was oxidized, and 4.317 mM of Fe(II) was produced.

Figure 23:
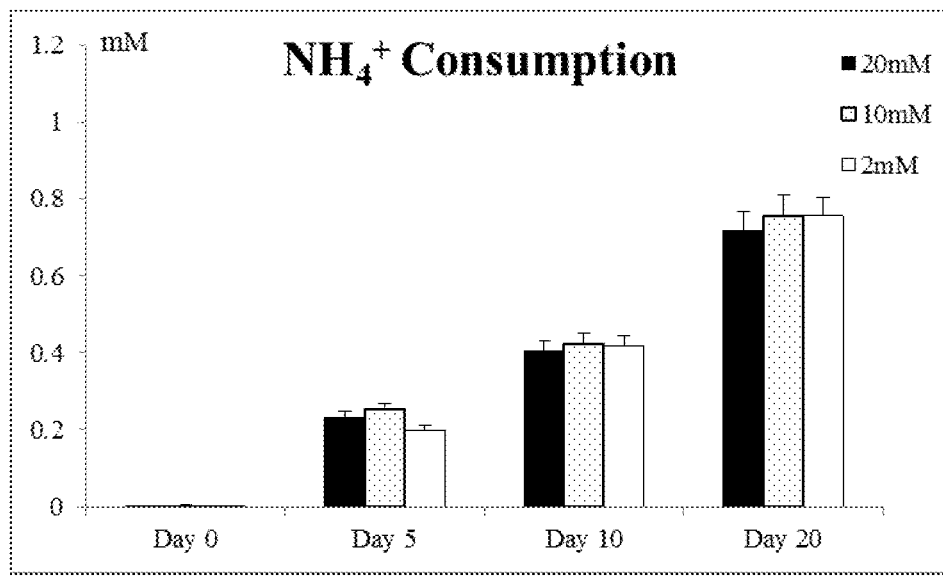
FIG. 23 illustrates an effect of iron concentration on Feammox. 20 mM NH$_4^+$ results are reported in the left filled bar of each of days 0, 5, 10 and 20 panels. 10 mM NH$_4^+$ results are reported in the middle dotted bar of each of days 0, 5, 10 and 20 panels. 2 mM NH$_4^+$ results are reported in the right open bar of each of days 0, 5, 10 and 20 panels.

Effect of iron concentration on Feammox: FIG. 23 illustrates an effect of iron concentration on Feammox. Referring to FIG. 23, the isolate A6 was incubated for 20 days in the inorganic NH$_4^+$-Ferric iron media, at pH4.5. A6 included $10^5$ copies per mL. 2 mM NH$_4^+$ and three different amounts (20 mM, 10 mM, 2 mM) of ferrihydrite were added initially. No significant different of NH$_4^+$ consumption by Feammox with different ferrihydrite amended during incubation was found. As long as there was sufficient iron included in the media, no effect of iron concentration on Feammox was observed.

Figure 25A:
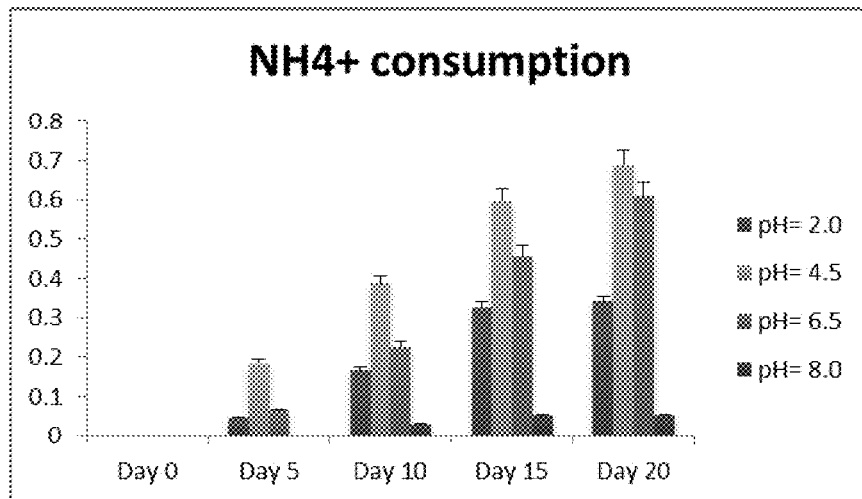
FIGS. 25A-25B illustrate determination of the effect of pH on NH$_4^+$ consumption (FIG. 25A) and bacterial growth (FIG. 25B). pH=2 results are reported in the far left bar of each of days 0, 5, 10, 15 and 20 panels. pH=4.5 results are reported in the left middle bar of each of days 0, 5, 10, 15 and 20 panels. pH=6.5 results are reported in the right middle bar of each of days 0, 5, 10, 15 and 20 panels. pH=8 results are reported in the far right bar of each of days 0, 5, 10, 15 and 20 panels.
Figure 25B:
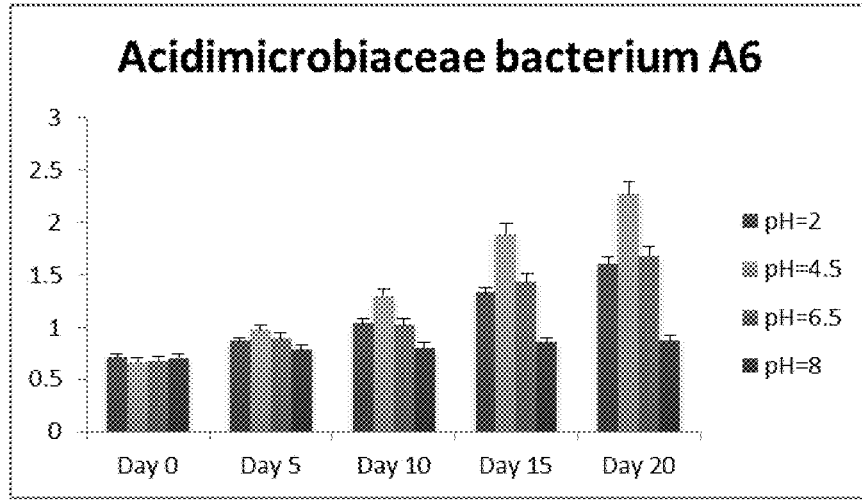

Determination of pH and temperature optima: Isolate A6 incubation for 20 Days under different pH gradient in inorganic, $NH_4^+$-Ferric iron media. A6 is 105 copies per mL. pH adjust to 2, 4.5, 6.5, 8.0 by HCl and NaOH. FIGS. 25A-25B illustrate determination of the effect of pH on $NH_4^+$ consumption (FIG. 25A) and bacterial growth (FIG. 25B). pH=2 results are reported in the far left bar of each of days 0, 5, 10, 15 and 20 panels. pH=4.5 results are reported in the left middle bar of each of days 0, 5, 10, 15 and 20 panels. pH=6.5 results are reported in the right middle bar of each of days 0, 5, 10, 15 and 20 panels. pH=8 results are reported in the far right bar of each of days 0, 5, 10, 15 and 20 panels. The pH optimum for growth of A6 was 4.5, but reasonable activity was detected from pH 2 to 7.

Figure 24:
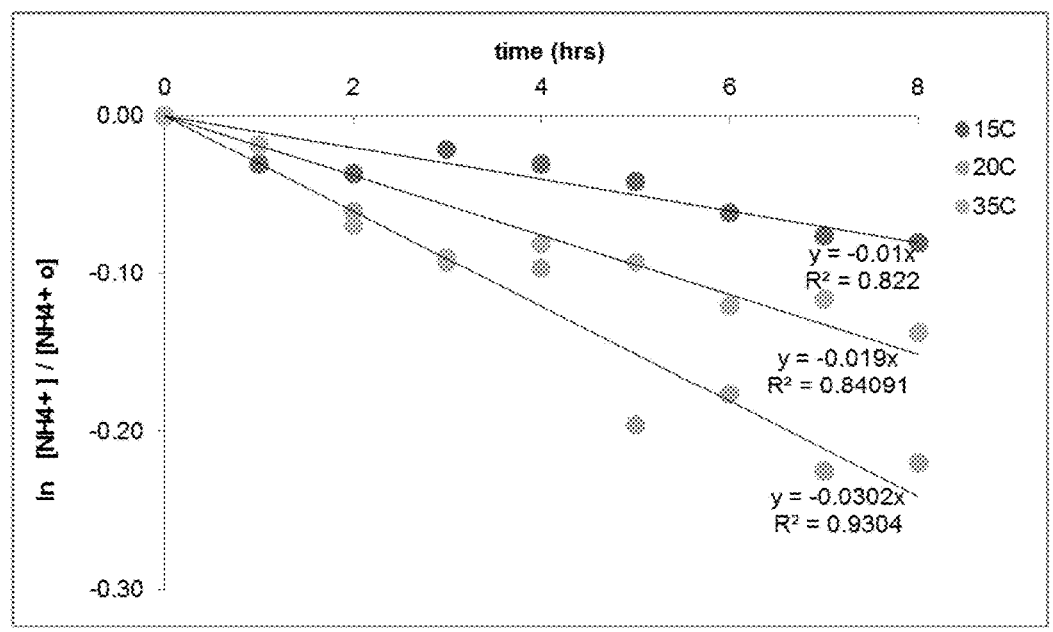
FIG. 24 illustrates the relative ammonium removal rate constants (k) by Acidimicrobiaceae-bacteria A6 at 15° C. (top line), 20° C. (middle line) and 35° C. (lower line).

Temperature gradient: FIG. 24 illustrates the relative ammonium removal rate constants (k) by Acidimicrobiaceae-bacteria A6 at 15° C., 20° C. and 35° C. Referring to this figure, the highest rate was measured at 20° C., k=0.03 $hr^{-1}$, followed by 35° C., k=0.019 $hr^{-1}$, and 15° C., k=0.01 $hr^{-1}$.

Utilization of organic substrates: Growth yields of isolate A6 have no growth difference in media containing glycerol, citric acid and glutamic acid with in control cultures $NaHCO_3$ added. The data shows that AG is an autotroph utilizing inorganic carbon but the presence of different organic carbons does not affect its growth.

It was observed that culturing of the isolate A6 in yeast extract media required one or more additional growth factors.

Heavy metal tolerance: This gram-positive isolate was able to grow in media containing elevated concentrations of the heavy metals tested. The A6 isolate was tested for the ability to grow in the media supplemented with 100 μM-100 mM of copper, 10-200 mM of zinc, 20-100 μM of uranium, 10-200 mM of ferric iron or 10-200 mM of ferrous iron. It was observed that the isolate A6 grew in 260 mM on ferric iron. However, addition of ferrous iron did not inhibit the bacterial growth. Growth also occurred in the presence of 100 mM, but not 200 mM, copper. It was also observed that 50 mM zinc inhibited growth. The A6 bacteria was growing in the presence of the tested concentrations of uranium but it was found that uranium was toxic to the bacterial cells at 200 μM.

Autotrophic growth and CO2 fixation—assimilation of $CO_2$ in cultures of isolate A6: A6 was able to grow in organic carbon-free liquid media. A $^{13}C$ labeled $CO_2$ amendment was conducted with a Thermo MAT 253™ stable isotope ratio mass spectrometer, and the $^{13}C$ in cells of A6 increased from 1.80% to 10.3% after 14 days incubation.

TABLE 5

Summary of assimilation of $CO_2$

| | Cell (with methanol wash) | | DNA | |
|---|---|---|---|---|
| | $^{12}C$ | $^{13}C$ | $^{12}C$ | $^{13}C$ |
| Day 0 | 98.2% | 1.80% | 98.9% | 1.10% |
| Day 14 | 89.7% | 10.3% | 82.0% | 18.0% |

Screening of RuBisCo (ribulose-1, 5-bisphosphate carboxylase/oxygenase) genes: RuBisCO genes were amplified from cell lysates of A6. Both cbbL and cbbM genes were successfully amplified.

Figure 26:
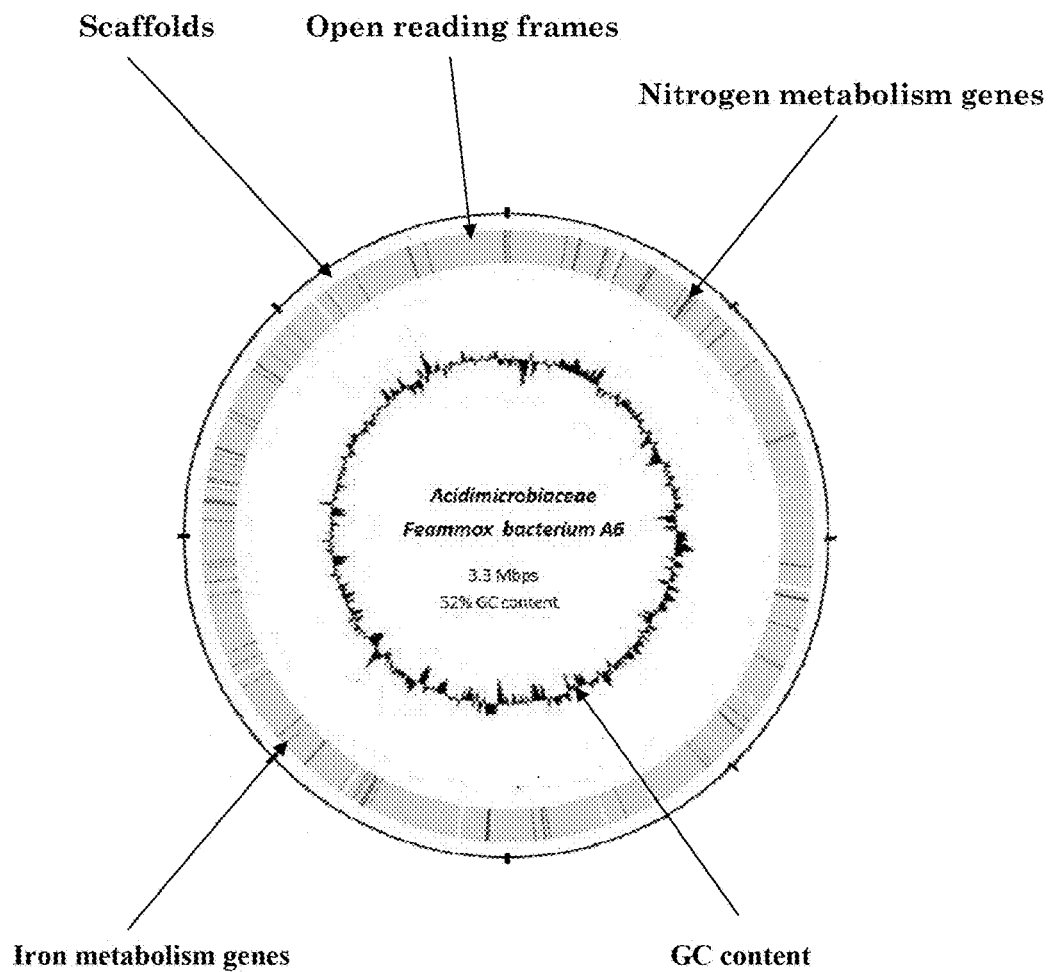
FIG. 26 illustrates a schematic representation of the genome of the Acidimicrobiaceae Feammox bacterium A6.

Full sequencing and functional gene-single-copy gene analysis: FIG. 26 illustrates a schematic representation of the genome of the Acidimicrobiaceae Feammox bacterium A6. The genome size and guanine-cytosine content of A6 are 3.3 mega base pairs (Mb) and 52%. Genotypic traits are summarized in Table 6.

TABLE 6

Genotypic traits

| Attribute | Value |
|---|---|
| Genome size (bp) | 3,106,468 |
| Plasmid size (bp) | 106,011 |
| DNA Coding region (bp) | 2,991,461 |
| DNA G + C content (bp) | 1,709,039 |
| RNA genes | 42 |
| rRNA operons | 2 |
| Protein-coding genes | 2032 |
| Pseudo genes | 58 |
| Genes with function prediction | 1579 |
| Genes assigned to COGs | 1392 |
| Genes assigned Pfam domains | 1497 |
| Genes with transmembrane helices | 538 |

Functional gene: The gene encoding Feammox ammonium Monooxygenase (FMO) having a sequence of SEQ ID NO: 8 was identified. The gene was located in the bacterial plasmid. The FMO is considered to be the functional gene coding ammonium oxidation coupling to ferric iron reduction in A6.

Figure 27:
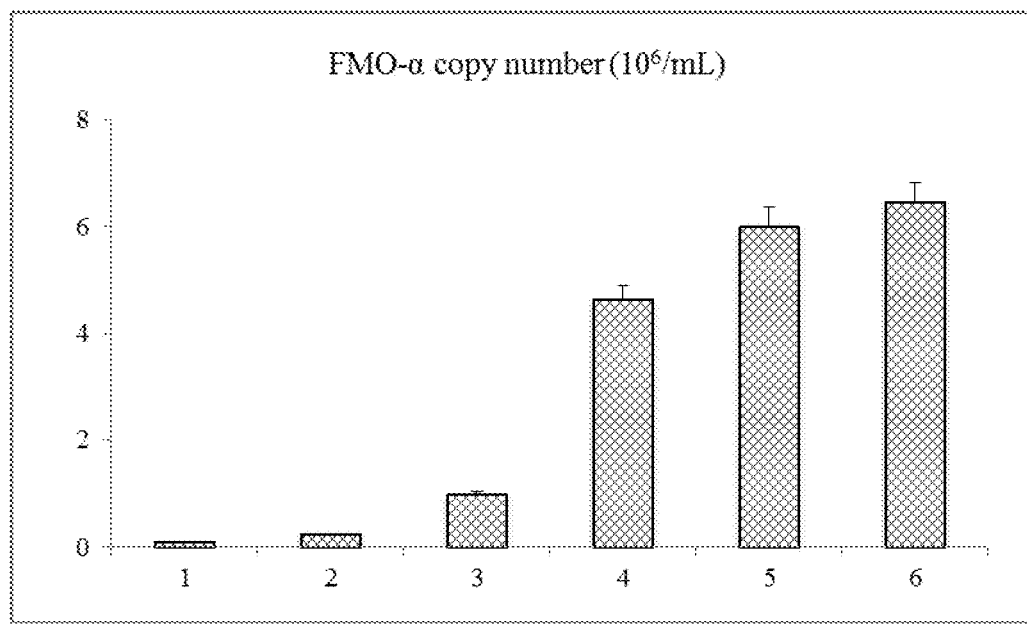
FIG. 27 illustrates the FMO activity.

FMO activity. FIG. 27 illustrates the FMO activity. Referring to FIG. 27, isolate A6 was incubated for 20 days under pH 4.5, in inorganic $NH_4^+$-Ferric iron media. Copy number of Feammox gene, FMO-a, was analyzed during the incubation which showed active Feammox reaction. It was observed that that FMO activity increased as total microbial as well as Acidimicrobiaceae Feammox bacterium A6 activity increased.

Figure 28:
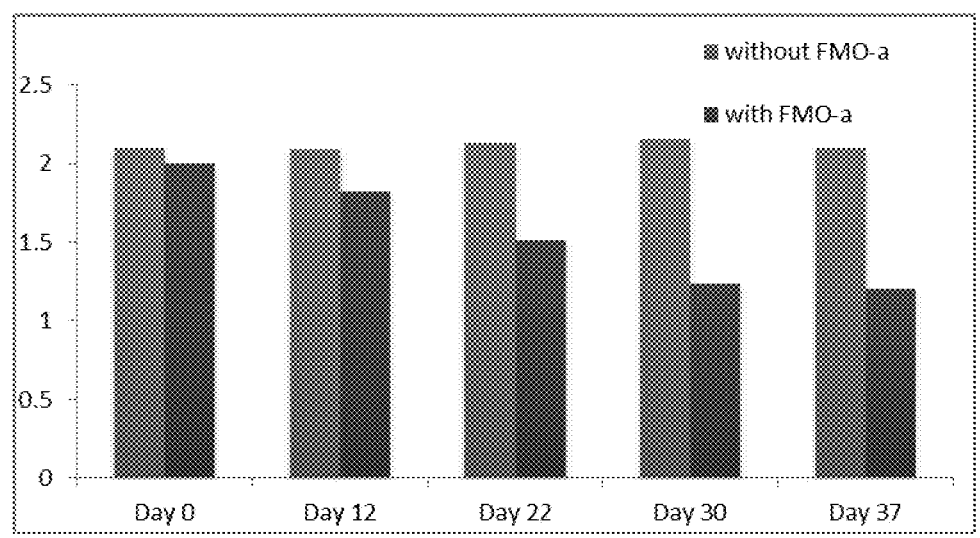
FIG. 28 illustrates oxidation of NH$_4^+$ by Acidimicrobiaceae bacterium A6 when the FMO activity in the presence (left bars for each of 0, 12, 22, 30 and 37 day panels) and absence (right bars for each of 0, 12, 22, 30 and 37 day panels) of a broad enzyme inhibitor (NaS).

FIG. 28 illustrates oxidation of $NH_4^+$ by Acidimicrobiaceae bacterium A6 and the FMO activity in the presence (without FMO-a) and absence (with FMO-a) of a broad enzyme inhibitor (NaS). Referring to FIG. 28, it was observed that the $NH_4^+$ oxidation rate decreased in the samples without FMO-a.

Phylogenetic analysis: According to the phylogenetic analysis, Acidimicrobiaceae bacterium A6), belonging to the Acidimicrobiaceae family, whose closest cultivated relative is *Ferrimicrobium acidiphilum* (with 92% identity) and *Acidimicrobium ferrooxidans* (with 90% identity).

EXAMPLE 24

Feammox Applications

Feammox process could be applied for waste water treatment for ammonium removal without the need to supply oxygen. Oxygen supply is the highest energy cost in waste treatment plants. The process may also be used in the design of engineered wetlands for nitrogen removal. That would be important in the agricultural and livestock industry. There might be many other applications.

Ammonium oxidation requires oxygen. Anammox process works with nitrite, but it requires high temperatures (around 82° F.). Since the bacterium was isolated at a New Jersey wetland, it is reasonable that it will function at lower temperatures. This is important for waste treatment, since in the winter waste water temperatures are around 40° F. Feammox may be applied for developing more temperature robust treatment processes that do not need aeration. Means to recycle iron and/or use scrap grounded up iron may be developed to be supplied for Feammox. The process similar to the one tested in incubation experiments will be utilized in a simple prototype reactor. Table 6 describes $NH_4^+$ removal using the reactor illustrated in FIG. 11 contrast Anammox and Feammox.

TABLE 7

Comparison of Feammmox and Anammox reactors

| | Feammox reactor | Anammox reactor | Conditions |
|---|---|---|---|
| Temperature | 20-25° C. | 28-35° C. | Feammox con work if T~15° C. |
| pH | 4.5-6 | cirumneutral | Feammox can work if pH ~2 |
| Aeration time | 0 h/day | Non or 1.5 h/day | Feammox require Fe(III) |
| Doubling time | 8-12 days | 10-12 days | Both are slow growing bacteria |
| $NH_4^+$ removal | 85% | 41% (no aeration) 72% (with aeration) | $NH_4^+$ inflow concentration 5 mM; Retention Time 48 h |

It was shown that the Feammox reactor is as efficient if not more than the anammox reactor. Finally, sludge was mixed from the Feammox and Anammox reactors, showing that a combined Feammox/Anammox mode is feasible and does not require partial aeration, which is required by Anammox to convert some $NH_4^+$ to $NO_2^-$, which in the combined process is done by Feammox. Operating conditions were different for the Feammox/Anammox reactor.

A combined Feammox/Anammox process results in less iron demand than a pure Feammox process. Anammox with 20% Feammox sludge may result in 70% $NH_4^+$ removal without aeration.

EXAMPLE 25

Feammox in Electrogenic Microbial Reactors

Electrogenic microbial reactors such as Microbial Fuel Cells (MFCs) and Microbial Electrolysis cells (MECs) are bioelectrochemical systems that extract energy from a substrate (Call and Logan 2011 *Biosen. Bioelectron.* 26(11): 4526-4531, which is incorporated herein by reference as if fully set forth). This process harvests electrons biologically, which are then transferred to the anode that functions as the terminal electron acceptor for the microorganisms in the system, and $H_2$ is produced at the anode. FIG. 29 illustrates a scheme of the electrogenic microbial reactor. Referring to FIG. 29, the reactor includes a vial, a graphite anode connected via titanium wire to the positive terminal of the power supply, a stainless steel cathode connected via stainless steel wire to the negative terminal of the power supply. MECs require a small potential applied from an external power source ($E_{AP}$>0.25 V), resulting in Hz production at the anode (Logan, Hamelers et al. 2006 *Environ. Sci. Technol.* 40(17):5181-5192; Call and Logan 2008 *Environ. Sci. Technol.* 42(9):3401-3406; Call and Logan 2011, all of which e incorporated by reference as if fully set forth). When the anode in a MFC or MEC works in place of a finite electron acceptor (i.e., Fe(III)), the bacterial growth is no longer limited by the consumption of that electron acceptor.

Some electrogenic iron reducing microorganisms; e.g., *Geobacter* sp., are capable of transferring the electrons to an anode instead of Fe(III) and grow in MECs (Logan 2009, which is incorporated herein by reference as if fully set forth). Thus, we have tested A6's ability to grow in small MECs has been tested. It was found that under constant mixing, and with a voltage input of 0.7V, MECs seeded with a pure culture of A6 to which 5 mM ammonium was added produced a current density (I) that increased from 0.02 A/m³ to up to ~36 A/m³, while the autoclaved control increased to only 1.3 A/m³ (Call and Logan 2011, which is incorporated herein by reference as if fully set forth). The A6 biomass increased from $10^4$ copies of DNA/ml to $9 \times 10^5$ over 14 days of operation. An electron shuttling compound, AQDS (Anthraquinone-2,6-disulfonate) had to be added to the solution, since unlike *Geobacter*, A6 does not seem to colonize the anode. When an electron shuttling compound like AQDS is added, the electron will be transferred from $NH_4^+$ to AQDS in solution and then to the anode. Hence, MECs and MFCs may be the ideal Feammox reactor configuration for $NH_4^+$ removal from wastewater via Feammox that solves the Fe(III) supply problem. Other configurations and materials can also be used to construct MECs as well as MFCs.

Although the equation in FIG. 29 shows that the solution pH should decrease while $NH_4^+$ is being oxidized, it was observed that pH increases. Our hypothesis is that this is due to the $CO_2$ consumption by A6, which is an autotroph. Hence, $CO_2$ control may be for the growth of a pure A6 culture. $CO_2$ addition should not be needed when organics are degraded simultaneously since $CO_2$ is produced during the biodegradation of organics.

The references cited throughout this application are incorporated for all purposes apparent herein and in the references themselves as if each reference was fully set forth. For the sake of presentation, specific ones of these references are cited at particular locations herein. A citation of a reference at a particular location indicates a manner(s) in which the teachings of the reference are incorporated. However, a citation of a reference at a particular location does not limit the manner in which all of the teachings of the cited reference are incorporated for all purposes.

Any single embodiment herein may be supplemented with one or more element from any one or more other embodiment herein.

It is understood, therefore, that this invention is not limited to the particular embodiments disclosed, but is intended to cover all modifications which are within the spirit and scope of the invention as defined by the appended claims; the above description; and/or shown in the attached drawings.

SEQUENCE LISTING

The patent contains a lengthy "Sequence Listing" section. A copy of the "Sequence Listing" is available in electronic form from the USPTO web site (http://seqdata.uspto.gov/?pageRequest=docDetail&DocID=US10479712B2). An electronic copy of the "Sequence Listing" will also be available from the USPTO upon request and payment of the fee set forth in 37 CFR 1.19(b)(3).

What is claimed is:

1. A composition comprising: an Acidimicrobiaceae Feammox bacterium A6 having Accession Deposit Number PTA-122488, a carrier and at least one of soil or water, wherein the bacterium is capable of oxidizing ammonium coupled with reduction of Fe(III) to Fe(II), the carrier comprises a medium for culturing the bacterium, the at least one of soil and water comprises an ammonium containing contaminant, and the water comprises any water adversely affected in quality by anthropogenic influence.

2. The composition of claim 1, wherein the ammonium containing contaminant is selected from the group consisting of: ammonium chloride, an industrial waste, an agricultural waste, a human municipal waste, fertilizers, domestic sewage, and industrial effluents.

3. The composition of claim 1 further comprising at least one more contaminant selected from the group consisting of: a halogenated organic contaminant and an inorganic contaminant.

4. The composition of claim 3 comprising the halogenated contaminant, and the halogenated organic contaminant comprises at least one compound selected from the group consisting of: perchloroethylene (PCE), trichloroethylene (TCP), trichloroethane, dichloroethane, vinyl chloride, polychlorinated biphenyls, fuel constituents, benzene, ethylbenzene, toluene, xylene, phenanthrene, methyl tent butyl ether, tertiary butyl alcohol, polyaromatic hydrocarbons, and ethylene dibromide.

5. The composition of claim 3 comprising the inorganic contaminant, wherein the inorganic contaminant is selected from the group consisting of: ferric iron, copper, lead, zinc, arsenic, chromium and silver.

6. The composition of claim 3 comprising the inorganic contaminant, and the inorganic contaminant comprises uranium.

7. The composition of claim 1 further comprising a source of ferric iron.

8. The composition of claim 7, wherein the source is selected from the group consisting of: a ferrihydrite, a goethite, a scrap iron, a nontronite, and an iron-rich clay.

9. The composition of claim 1, wherein the medium comprises an iron oxide and has an acidic pH.

10. The composition of claim 1 further comprising CO2.

11. The composition of claim 1, wherein the Acidimicrobiaceae Feammox bacterium A6 is at a concentration of at least 104 bacterial cells per milliliter of the composition.

12. A process for treating soil or water comprising mixing an Acidimicrobiaceae Feammox bacterium A6 having Accession Deposit Number PTA-122488 with at least one of the soil or water, wherein the bacterium is capable of oxidizing ammonium coupled with reduction of Fe(III) to Fe(II), the at least one of the soil or water comprises an ammonium containing contaminant, and the water is any water adversely affected in quality by anthropogenic influence.

13. The process of claim 12, wherein the ammonium containing contaminant is selected from the group consisting of: ammonium chloride, an industrial waste, an agricultural waste, or a human municipal waste, fertilizers, domestic sewage, and industrial effluents.

14. The process of claim 12 further comprising removing at least one more contaminant selected from the group consisting of: a halogenated organic contaminant and inorganic contaminant.

15. The process of claim 14, wherein the at least one more contaminant comprises the halogenated organic contaminant, which comprises at least one compound selected from the group consisting of: perchloroethylene (PCE), trichloroethylene (TCE), trichloroethane, dichloroethane, vinyl chloride, polychlorinated biphenyls, fuel constituents, benzene, ethylbenzene, toluene, xylene, phenanthrene, methyl tert butyl ether, tertiary butyl alcohol, polyaromatic hydrocarbons, and ethylene dibromide.

16. The process of claim 14, wherein the at least one or more contaminant comprises the inorganic contaminant, and the inorganic contaminant is selected from the group consisting of: ferric iron, copper, lead, zinc, arsenic, chromium and silver.

17. The process of claim 14, wherein the at least one or more contaminant comprises the inorganic contaminant, and the inorganic contaminant comprises uranium.

18. The process of claim 14 further comprising at least one of creating or maintaining an absence or low level of oxygen, establishing a temperature in a range from 4° C. to 35° C., or establishing a pH in a range from 2.0 to 7.5.

19. The process of claim 18 further comprising adding a source of ferric iron.

20. The process of claim 19, wherein the source of ferric iron is selected from the group consisting of: a ferrihydrite, a goethite, a scrap iron, a nontronite, and an iron-rich clay.

* * * * *